(12) United States Patent
Hueler et al.

(10) Patent No.: US 7,313,540 B1
(45) Date of Patent: Dec. 25, 2007

(54) ELECTRONIC COMMUNICATION SYSTEM AND METHOD FOR FACILITATING FINANCIAL TRANSACTION BIDDING AND REPORTING PROCESSES

(75) Inventors: Kelli Hustad Hueler, Eden Prairie, MN (US); Janet Jasin Quarberg, Excelsior, MN (US)

(73) Assignee: Hueler Companies, Eden Prairie, MN (US)

( * ) Notice: Subject to any disclaimer, the term of this patent is extended or adjusted under 35 U.S.C. 154(b) by 0 days.

(21) Appl. No.: 09/520,825

(22) Filed: Mar. 8, 2000

(51) Int. Cl.
*G06Q 40/00* (2006.01)

(52) U.S. Cl. .............. 705/36; 705/37; 705/52; 705/1; 705/4; 455/414.4; 719/318; 715/540; 340/307

(58) Field of Classification Search .......... 705/35, 705/36, 37, 39, 1, 4, 52; 370/400; 709/220; 395/201–204, 604; 713/176; 719/318; 715/540; 455/414.4; 340/3.7
See application file for complete search history.

(56) References Cited

U.S. PATENT DOCUMENTS

| | | | |
|---|---|---|---|
| 5,193,056 A | | 3/1993 | Boes |
| 5,666,553 A | * | 9/1997 | Crozier ................. 715/540 |
| 5,910,987 A | * | 6/1999 | Ginter et al. ........... 705/52 |
| 5,915,209 A | * | 6/1999 | Lawrence ............. 340/3.7 |
| 6,026,383 A | * | 2/2000 | Ausubel ................. 705/37 |
| 6,067,531 A | | 5/2000 | Hoyt et al. |
| 6,073,104 A | * | 6/2000 | Field ........................ 705/1 |
| 6,151,588 A | * | 11/2000 | Tozzoli et al. ........... 705/37 |
| 6,161,099 A | * | 12/2000 | Harrington et al. ..... 705/37 |
| 6,684,189 B1 | * | 1/2004 | Ryan et al. ............... 705/4 |
| 6,708,226 B2 | * | 3/2004 | Peters et al. ........... 719/318 |
| 6,873,841 B1 | * | 3/2005 | Sagar ................. 455/414.4 |

* cited by examiner

*Primary Examiner*—Jagdish N. Patel
*Assistant Examiner*—Harish T. Dass
(74) *Attorney, Agent, or Firm*—Hollingsworth & Funk, LLC

(57) ABSTRACT

A system and method for electronically communicating investment plan information between money managers and issuers of investment contracts to facilitate plan inquiry and plan bidding processes. An import specification is defined, identifying database format characteristics of investment plan information stored in a first database. Data fields are mapped from the first database to data fields in a second database to create a data import map, where the data fields in the second database are predefined data fields. Investment plan information is imported into the predefined data fields of the second database according to the import specification and data import map. The resulting imported information is transferred to a central database accessible by investment contract sellers who are authorized by the investment contract buyers to receive the investment plan information. The investment plan information is transferred from the central database to the authorized investment contract sellers upon request of the authorized investment contract sellers. A proposed investment contract may then be created using the investment plan information received via the central database.

10 Claims, 39 Drawing Sheets

Plan Name: ABC Employee Savings Plan

Plan Information | Contributions | [Demographics] | Investment Options | Loan Provisions | Guidelines | Returns | General | Data Release

| | |
|---|---|
| Eligible Employees ☑ Salaried Employees ☑ Non Salaried Employees | |
| Number of Eligible Employees | 2,000 |
| Number of Participating Employees | 1,600 |
| Annual Payroll of Eligibles $ | 26,000,000 |
| Number of Inactive Employees in Plan | 250 |
| Inactive Employee Balance in Stable Value Option $ | 850,000 |
| Total Pre Tax Balance in Stable Value Option $ | 100,000,000 |
| Total Post Tax Balance in Stable Value Option $ | 38,000,000 |

Description of Demographics: Number of inactives has increased over the last 24 months due to downsizing.

200

Buttons: New Contract, Notes, Internal Notes, Delete, Rename, Excel | Viewer, Word | Viewer, Return to Menu, Help

Plan Name: ABC Employee Savings Plan

Plan Information | Contributions | Demographics | [Investment Options] | Loan Provisions | Guidelines | Returns | General | Data Release

| | |
|---|---|
| Total number of investment options | 6 |
| Maximum % fixed income allowed in balanced or conservative life cycle fund | 40 |
| Is the Stable Value fund the fixed income component of the balanced or conservative life cycle fund? ☑ | |

Description of Options/Transfer: The stable value fund is a component of the life cyle funds.

210

*If yes, to describe or view an explanation of rebalancing frequency and methodology click on the Notes button at the right of the screen*

| | |
|---|---|
| Number of times per year allowed to reallocate future contributions | 365 |
| Number of times per year allowed to reallocate existing balances | 365 |
| Transfer Restriction Type | Wash |
| Restriction Period | 90 days |
| How is wait or wash monitored? | Not available |
| Provisions for unique transfers | None |

Buttons: New Contract, Notes, Internal Notes, Delete, Rename, Excel | Viewer, Word | Viewer, Return to Menu, Help

FIG. 13

Plan Name: ABC Employee Savings Plan — 170

Tabs: Plan Information | Contributions | Demographics | Investment Options | Loan Provisions | Guidelines | Returns | General | Data Release — 175

220

| Field | Value |
|---|---|
| Maximum number of loans outstanding per employee | 3 |
| Minimum loan amount $ | 150 |
| Are in service withdrawals allowed? | ✓ |
| Are there penalties for these withdrawals? | ☐ |

Description of Transfers/Loans: The loan rate is subject to change on an annual basis.

| Field | Value |
|---|---|
| Loan rate | Prime + 1% effective the beginning of the prior quarter. |
| Loan repayment options | Payroll deduction and lump sum repayment. |
| Loan repayment minimum term | 0 years |
| Loan repayment maximum term | 10 years |
| Loan repayment minimum (Residence) | 0 years |
| Loan repayment maximum (Residence) | 30 years |
| Total number of outstanding loans | 525 |
| Balance on outstanding loans from Stable Value option $ | 10,500,000 |
| Can participants select the fund option to withdrawal or repay loan? | ☐ |

Buttons: New Contract, Notes, Internal Notes, Delete, Rename, Excel Viewer, Word Viewer, Return to Menu, Help

Plan Name: ABC Employee Savings Plan — 170

Tabs: Plan Information | Contributions | Demographics | Investment Options | Loan Provisions | Guidelines | Returns | General | Data Release — 176

230

Minimum credit rating allowed at time of purchase: (for General Account products)
- Moody's: Aa2
- Standard and Poor's: AA+
- Duff and Phelps: AAA Minimum credit rating for wraps:
- Moody's: Aa3
- Standard and Poor's: AA+
- Duff and Phelps: AA+

Does the plan have a more extensive credit matrix? ✓

Description of Policies: Along with Moody's and Standard and Poor's rating, each issuer is thoroughly evaluated using our internal credit methodology.

| | Minimum | Maximum | Targeted |
|---|---|---|---|
| Per General Account Issuer | 0 % | 25 % | 15 % |
| Per Wrap Issuer | 0 % | 20 % | 10 % |
| In Minimum Credit Rating | 0 % | 30 % | 10 % |
| In Synthetics | 25 % | 65 % | 40 % |
| In Marketable Securities | 0 % | 20 % | 10 % |
| In Cash/Buffer | 5 % | 25 % | 10 % |
| Non-Benefit Responsive | 0 % | 0 % | 0 % |
| Maturing Quarterly | 5 % | 10 % | 3 % |
| Maturing Annually | 20 % | 30 % | 25 % |
| Constant Duration | 10 % | 30 % | 20 % |

Buttons: New Contract, Notes, Internal Notes, Delete, Rename, Excel Viewer, Word Viewer, Return to Menu, Help

Plan Name: ABC Employee Savings Plan — 170

Tabs: Plan Information | Contributions | Demographics | Investment Options | Loan Provisions | Guidelines | Returns | General | Data Release — 177

Historical Stable Value Returns — 240

| Date | Monthly Returns | Quarterly Returns | Annual Returns | WAM | Effective Duration | Modified Duration | Moody's | S & P |
|---|---|---|---|---|---|---|---|---|
| 01/31/98 | 0.5025 | 1.58 | 6.5 | 2.28 | 1.93 | | Aa | AA |
| 02/28/98 | 0.5114 | 1.59 | 6.58 | 2.11 | 1.76 | | Aa | AA |
| 03/31/98 | 0.5238 | 1.63 | 6.78 | 2.88 | 2.53 | | Aa | AA |
| 04/30/98 | 0.5075 | 1.57 | 6.47 | 2.13 | 1.78 | 1.88 | Aa | AA |
| 05/31/98 | 0.4982 | 1.57 | 6.1 | 2.9 | 2.55 | 2.65 | Aa | AA |
| 06/30/98 | 0.5062 | 1.61 | 6.41 | 2.51 | 2.16 | 2.26 | Aa | AA |
| 07/31/98 | 0.5124 | 1.57 | 6.18 | 2.28 | 1.93 | 2.03 | Aa | AA |
| 08/31/98 | 0.5083 | 1.54 | 6.43 | 1.85 | 1.5 | 1.6 | Aa | AA |
| 09/30/98 | 0.5174 | 1.34 | 5.32 | 1.38 | 1.03 | 1.13 | Aa | AA |
| 10/31/98 | 0.5066 | 1.49 | 6.25 | 2.22 | 1.87 | 1.97 | Aa | AA |
| 11/30/98 | 0.5325 | 1.51 | 6.2 | 2.18 | 1.83 | 1.93 | Aa | AA |
| 12/31/98 | 0.5398 | 1.55 | 6.48 | 2.05 | 1.7 | 1.8 | Aa | AA |
| 01/31/99 | 0.4987 | 1.53 | 6.38 | 2.35 | 2 | 2.1 | Aa | AA |

Buttons: New Contract | Notes | Internal Notes | Delete | Rename | Excel Viewer | Word Viewer | Return to Menu | Help

FIG. 17

Plan Name: ABC Employee Savings Plan — 170

Tabs: Plan Information | Contributions | Demographics | Investment Options | Loan Provisions | Guidelines | Returns | General | Data Release — 178

— 250

- Maximum maturity of any one contract: 7 years
- Targeted weighted average maturity of portfolio: 3 years
- Minimum number of placements per year: 1
- Targeted number of placements per year: 4
- Stable Value Portfolio Crediting Method: Blended Return
- Management Type: External Management
- Payment Method: Plan Hard Dollar
- Fee Basis: Percent of Assets
- Benefit Withdrawal Method: Buffer Fund, Pro Rata
- Description of Withdrawal Methodology: The fund maintains a minimum of 5% in a buffer fund which would be used prior to tapping any contracts for benefit withdrawals.

- Does the plan currently have non-benefit responsive contracts? ☐
- Has the plan ever accessed a contract for benefits? ☐
- Is the portfolio rate communicated in advance of elections? ☐

Buttons: New Contract | Notes | Internal Notes | Delete | Rename | Excel Viewer | Word Viewer | Return to Menu | Help

FIG. 42 — Import Data Checked (Screen 3 of 5) — 800

Toolbar: Landscape report of proposed import (810) | Portrait report of proposed import (812) | Previous Screen (804) | Field Help (806) | Help (808) | 0%

| Plan_name | Date | EE_Contrib | ER_Contrib | Transfers_In | Transfers_Out | Net_Loans | Disbursemen |
|---|---|---|---|---|---|---|---|
| ABC Employee Savings Plan | 03/31/97 | 355383 | 10679 | 31979 | 0 | 497167 | |
| ABC Employee Savings Plan | 04/30/97 | 292030 | 8760 | 29149 | 0 | 588874 | |
| ABC Employee Savings Plan | 05/31/97 | 295489 | 8864 | 29050 | 0 | 497475 | |
| ABC Employee Savings Plan | 06/30/97 | 699771 | 20993 | 60120 | 0 | 246601 | |
| ABC Employee Savings Plan | 07/31/97 | 655149 | 19854 | 59260 | 0 | 177614 | |
| ABC Employee Savings Plan | 08/31/97 | 629704 | 18891 | 59320 | 7845 | 205554 | |
| ABC Employee Savings Plan | 09/30/97 | 610707 | 18321 | 57713 | 0 | 199107 | |
| ABC Employee Savings Plan | 10/31/97 | 551686 | 16550 | 57406 | 0 | 286311 | |
| ABC Employee Savings Plan | 11/30/97 | 556652 | 16699 | 57164 | 6598 | 193552 | |
| ABC Employee Savings Plan | 12/31/97 | 209147 | 6274 | 24961 | 0 | 318327 | |
| ABC Employee Savings Plan | 01/31/98 | 203281 | 6098 | 25512 | 0 | 94566 | |
| ABC Employee Savings Plan | 02/28/98 | 483171 | 14495 | 23609 | 35650 | 0 | -120222 |
| ABC Employee Savings Plan | 03/31/98 | 272615 | 8178 | 25535 | 0 | 0 | -149469 |
| ABC Employee Savings Plan | 04/30/98 | 249913 | 7497 | 22625 | 0 | 0 | -63780 |
| ABC Employee Savings Plan | 05/31/98 | 252973 | 7589 | 142119 | 0 | 0 | -179322 |
| ABC Employee Savings Plan | 06/30/98 | 388695 | 11660 | 21671 | 0 | 0 | -73021 |
| ABC Employee Savings Plan | 07/31/98 | 246378 | 7391 | 22426 | 0 | 102494 | |
| ABC Employee Savings Plan | 08/31/98 | 233458 | 7003 | 24004 | 0 | 0 | -69902 |
| ABC Employee Savings Plan | 09/30/98 | 224362 | 6730 | 0 | 0 | 0 | -11017 |
| ABC Employee Savings Plan | 10/31/98 | 256366 | 7690 | 0 | 0 | 0 | -21939 |
| ABC Employee Savings Plan | 11/30/98 | 198115 | 5943 | 0 | 4578 | 209114 | |
| ABC Employee Savings Plan | 12/31/98 | 180601 | 5418 | 0 | 0 | 0 | -191549 |

FIG. 43 — Update Table (Screen 4 of 5) — 820

Toolbar: Print Log (824) | Update Actual Data (832) | Previous Screen (834) | Field Help (828) | Help (830) | Create Import Log (826) | 0%

Planned import: C:\Proj\TRACE\Data\ABC Cashflow.txt into: Cashflow on: 02/26/99

| Action | Plan_name | Date | EE_Contrib | ER_Contrib | Transfer |
|---|---|---|---|---|---|
| Replace | ABC Employee Savings Plan | 03/31/92 | 686730 | 9389 | 5 |
| Replace | ABC Employee Savings Plan | 04/30/92 | 544794 | 16343 | 4 |
| Replace | ABC Employee Savings Plan | 05/31/92 | 531950 | 15958 | 4 |
| Replace | ABC Employee Savings Plan | 06/30/92 | 640595 | 19217 | 5 |
| Replace | ABC Employee Savings Plan | 07/31/92 | 611314 | 18339 | 4 |
| Replace | ABC Employee Savings Plan | 08/31/92 | 553604 | 16608 | 5 |
| Replace | ABC Employee Savings Plan | 09/30/92 | 529075 | 15872 | 4 |
| Replace | ABC Employee Savings Plan | 10/31/92 | 490867 | 14726 | 4 |
| Replace | ABC Employee Savings Plan | 11/30/92 | 497023 | 14910 | 4 |
| Replace | ABC Employee Savings Plan | 12/31/92 | 502037 | 15061 | 5 |
| Replace | ABC Employee Savings Plan | 01/31/93 | 510517 | 15315 | 5 |
| Replace | ABC Employee Savings Plan | 02/28/93 | 521282 | 15638 | 5 |
| Replace | ABC Employee Savings Plan | 03/31/93 | 567652 | 17029 | 5 |
| Replace | ABC Employee Savings Plan | 04/30/93 | 557215 | 16716 | 5 |
| Replace | ABC Employee Savings Plan | 05/31/93 | 573031 | 17190 | 5 |
| Replace | ABC Employee Savings Plan | 06/30/93 | 619200 | 18576 | 5 |
| Replace | ABC Employee Savings Plan | 07/31/93 | 595057 | 17851 | 5 |
| Replace | ABC Employee Savings Plan | 08/31/93 | 622383 | 18671 | 5 |
| Replace | ABC Employee Savings Plan | 09/30/93 | 704554 | 21136 | 5 |
| Replace | ABC Employee Savings Plan | 10/31/93 | 548755 | 16462 | 5 |
| Replace | ABC Employee Savings Plan | 11/30/93 | 665940 | 19978 | 5 |
| Replace | ABC Employee Savings Plan | 12/31/93 | 524336 | 15730 | 5 |
| Replace | ABC Employee Savings Plan | 01/31/94 | 501847 | 15055 | 5 |
| Replace | ABC Employee Savings Plan | 02/28/94 | 969449 | 29083 | 5 |
| Replace | ABC Employee Savings Plan | 03/31/94 | 590626 | 17718 | 5 |
| Replace | ABC Employee Savings Plan | 04/30/94 | 575424 | 17262 | 5 |
| Replace | ABC Employee Savings Plan | 05/31/94 | 597629 | 17928 | 5 |
| Replace | ABC Employee Savings Plan | 06/30/94 | 532835 | 15985 | 5 |
| Replace | ABC Employee Savings Plan | 07/31/94 | 553531 | 16605 | 5 |

FIG. 43

| Plan_name | Date | EE_Contrib | ER_Contrib | Transfers_In | Transfers_Out | Net_Loans | Disburse |
|---|---|---|---|---|---|---|---|
| ABC Employee Savings Plan | 03/31/92 | 686730 | 9889 | 54847 | 0 | 0 | -28 |
| ABC Employee Savings Plan | 04/30/92 | 544794 | 16343 | 47948 | 0 | 45756 | |
| ABC Employee Savings Plan | 05/31/92 | 531950 | 15958 | 47344 | 5129 | 0 | |
| ABC Employee Savings Plan | 06/30/92 | 640595 | 19217 | 50630 | 0 | 0 | -2 |
| ABC Employee Savings Plan | 07/31/92 | 611314 | 18339 | 47765 | 0 | 0 | |
| ABC Employee Savings Plan | 08/31/92 | 553604 | 16608 | 52025 | 10985 | 31546 | |
| ABC Employee Savings Plan | 09/30/92 | 529075 | 15872 | 49649 | 0 | 106716 | |
| ABC Employee Savings Plan | 10/31/92 | 490867 | 14726 | 47046 | 0 | 101072 | |
| ABC Employee Savings Plan | 11/30/92 | 497023 | 14910 | 49061 | 45000 | 192961 | |
| ABC Employee Savings Plan | 12/31/92 | 502037 | 15061 | 50382 | 0 | 74350 | |
| ABC Employee Savings Plan | 01/31/93 | 510517 | 15315 | 51791 | 0 | 342576 | |
| ABC Employee Savings Plan | 02/28/93 | 521282 | 15638 | 52882 | 35990 | 100633 | |
| ABC Employee Savings Plan | 03/31/93 | 567652 | 17029 | 55363 | 0 | 176163 | |
| ABC Employee Savings Plan | 04/30/93 | 557215 | 16716 | 54555 | 0 | 355970 | |
| ABC Employee Savings Plan | 05/31/93 | 573031 | 17190 | 51075 | 5922 | 64539 | |
| ABC Employee Savings Plan | 06/30/93 | 619200 | 18576 | 55895 | 0 | 120846 | |
| ABC Employee Savings Plan | 07/31/93 | 595057 | 17851 | 56944 | 0 | 93889 | |
| ABC Employee Savings Plan | 08/31/93 | 622383 | 18671 | 56842 | 9874 | 0 | |
| ABC Employee Savings Plan | 09/30/93 | 704554 | 21136 | 53799 | 0 | 113876 | |
| ABC Employee Savings Plan | 10/31/93 | 548755 | 16462 | 55589 | 0 | 0 | |

FIG. 44

ELECTRONIC COMMUNICATION SYSTEM AND METHOD FOR FACILITATING FINANCIAL TRANSACTION BIDDING AND REPORTING PROCESSES

FIELD OF THE INVENTION

The present invention relates generally to financial transaction processing, and more particularly, to an electronic communication method and apparatus for facilitating financial transactions between money managers and issuers of investment contracts.

BACKGROUND OF THE INVENTION

The financial industry provides a multitude of investment options for investors to manage and grow their financial resources. The different types and vehicles of investment continues to increase. With all of the different options available, individual investors often turn to managed plans or otherwise seek professional investment advice to help simplify investment decisions. In the workplace, companies and employers often provide ways to allow employees to invest a portion of their income, such as through a 401 (k) program, which is an investment vehicle facilitated by the tax code.

Investments range from conservative, essentially no-risk interest accounts to highly-volatile and risky financial endeavors. When availing such investment options, companies typically aspire to provide multiple investment choices for both those who welcome risk where potential return is great, as well as for the risk-wary participants who have an aversion to a high risk of financial loss. For this reason, company sponsored investment plans typically provide options for a range of plan participants who fall within this range.

One type of investment option that is relatively conservative is the guaranteed investment contract or "GIC." Generally, a GIC is a debt instrument issued by an insurance company, often in a large denomination, and often bought for retirement plans. GICs are promises by insurance companies to repay principal plus a fixed interest rate by a specified date. The company that writes the contract, generally in insurance company or bank, promises the investor a certain interest rate over the life of the contract, which varies.

In recent years, the GIC market has been transformed from a single provider/single product environment to the greatly expanded multiproduct/provider stable value industry. The industry now offers a spectrum of new products and services provided by a variety of different issuers, including insurance companies, banks and fixed income money managers. In addition, third party intermediaries and professional money managers now have significant influence over investment selection and strategy. These third party intermediaries have substantially increased their purchase activity and dramatically improved the level of buyers sophistication.

Generally, a stable value fund is a type of low-risk investment fund that has proved to provide an appreciable return considering the virtually nonexistent risk of principal loss. While stable value funds used to invest only in GICs, now they also invest in government bonds and high-quality asset-backed securities and corporate bonds that offer the investor the ability to withdraw or transfer funds without market value risk (risk of principal loss as interest rates rise) or other penalty for premature withdrawal. An insurance policy or "wrapper" provides the stability, which is purchased from a bank or insurer, protects investor's principal, and locks in a return. The issuer of the investment contracts thus guarantees principal plus accumulated interest and an interest rate for a specified period of time.

Further diversification is achieved when contracts issued by various banks and insurers are pooled into larger funds. A stable value fund pools money of many investors, and uses it to buy a number of contracts from insurance companies or banks, i.e., the issuers. Under the terms of each contract, the issuer guarantees a regular rate of return for the length of the contract, and takes on two types of risk, namely investment risk and withdrawal risk. Investment risk is where the issuer invests the money in a portfolio of fixed income investments, such as government bonds or mortgages. If the returns on this investment are lower than what the contract issuer is paying you, the issuer still pays you the specified amount and takes the loss. If investment returns are higher, the issuer pockets the extra profit.

Withdrawal risk is determined based on the probability of the plan running short of liquid assets and needing to access a contract for a book value payment. At any point in time during the term of the contract, the value of the underlying assets may be above or below the book value, but the issuer always pays the plan book value. As a result, an issuer could make or lose money due to plan withdrawals. Therefore, it is very important to properly price that probability which requires careful and thorough analysis of the necessary underwriting data. The risk of a stable value contract can be judged by the rating held by the issuer; i.e., if it has a AAA rating, so does the contract.

As a result of this product diversity, the characteristics of stable value portfolios have also changed radically. The average portfolio today is much more complex in both structure and risk profile than its predecessor a decade ago. These complexities and high volumes of stable value transactions have caused inefficiencies in stable value portfolio management. Further, stable value managers (i.e., "buyers") or independent buyers traditionally communicated all of the underwriting data to issuers in hardcopy paper format, such as by facsimile or regular mail. Stable value issuers (i.e., "sellers") then had to re-enter this information into their internal system used for underwriting and pricing the contract that is being bid out.

Software has been used to assist in such transfers. TRACE software, developed by the assignee of the instant application, allowed managers to enter data at the site and transmit data electronically to the issuer in a uniform format. A stable value issuer also uses the software, but does not enter any data. Instead, the stable value manager electronically builds a file for the issuer, and transfers it to the issuer electronically. The stable value issuer retrieves the file and brings it into their software database.

While such a system provided assistance to both managers and issuers, these systems have certain limitations. For example, manual data entry at the managers site remained a time-consuming task, causing some managers to limit the frequency of updates, and other managers to avoid using the system. Further, the data was not updated frequently enough to satisfy issuers, as issuers want data updated continuously, and desire a broader market participation (i.e., more managers using such a system). The inability to automatically feed data into the database system was a significant barrier to efficacious communication between managers and issuers. Additionally, issuers who had already obtained the data could not introduce this data into their proprietary pricing or modeling systems due to incompatible data field formats.

Therefore, it would be desirable to increase the efficiency and productivity of financial transaction communications, such as the communication between plan managers and plan issuers in the stable value industry. The present invention provides an effective and secure manner of facilitating such communications, which is compatible with virtually any platform, is amenable to non-technical users, and includes features that overcome the aforementioned and other shortcomings of the prior art.

SUMMARY OF THE INVENTION

The present invention is directed to a system and method for electronically communicating investment plan information between money managers and issuers of investment contracts to facilitate plan inquiry and plan bidding processes.

In accordance with one embodiment of the present invention, a method for facilitating financial transactions between buyers and sellers of investment contracts is provided. An import specification is defined, which identifies database format characteristics of investment plan information stored in a first database. Data fields are mapped from the first database to data fields in a second database to create a data import map. The data fields in the second database are predefined data fields. The investment plan information is imported into the predefined data fields of the second database according to the import specification and data import map, and the resulting imported information is transferred to a central database accessible by investment contract sellers who are authorized by the investment contract buyers to receive the investment plan information. The investment plan information is transferred from the central database to the authorized investment contract sellers upon request of the authorized investment contract sellers. A proposed investment contract may then be created using the investment plan information received via the central database.

A more specific embodiment of the invention further includes defining an export specification identifying database format characteristics of an export file. Data fields from the investment plan information received by the investment contract sellers are mapped to a third database to create a data export map. The investment plan information received by the investment contract sellers is exported to the data fields of the export file pursuant to the export specification and data export map.

In accordance with another aspect of the invention, a transaction processing system for facilitating financial transactions between buyers and sellers of investment contracts is provided. The system includes a central database accessible by the investment contract buyers and the investment contract sellers. At least one computing device is provided at the manager/buyer's site that has storage, and a user interface to interface to the computing device. The user interface includes at least a display and a data entry interface. The computing device includes an import definition user interface for defining an import specification identifying database format characteristics of investment plan information stored in a first database accessible by the computing device. A data mapping user interface provides for mapping data fields from the first database to data fields in a second database accessible by the computing device to create a data import map. A data importation user interface is used to import the investment plan information into the predefined data fields of the second database according to the import specification and data import map. A user interface is also provided to allow the investment plan information to be transferred to the central database, along with seller identification information to identify the investment contract sellers who are authorized by the investment contract buyers to receive the investment plan information. The central database includes means for releasing the investment plan information to only the investment contract sellers identified by the investment contract buyers as authorized to receive the investment plan information.

In accordance with yet another aspect of the invention, a computer-readable medium having computer-executable instructions for facilitating financial transactions between buyers and sellers of investment contracts is provided. The computer-executable instructions perform steps including defining an import specification identifying database format characteristics of investment plan information stored in a first database. Data fields from the first database are mapped to data fields in a second database to create a data import map, where the data fields in the second database are predefined data fields. The investment plan information is imported into the predefined data fields of the second database according to the import specification and data import map. Investment contract sellers who are authorized by the investment contract buyers to receive the investment plan information are designated as authorized recipients, and the investment plan information is transferred to a central database. The investment plan information is transferred to the central database, and is released to the investment contract sellers identified by the investment contract buyers who are designated as authorized to receive the investment plan information.

The above summary of the present invention is not intended to describe each illustrated embodiment or implementation of the present invention. This is the purpose of the figures and the associated discussion which follows.

BRIEF DESCRIPTION OF THE DRAWINGS

FIG. 10 illustrates an exemplary user interface screen used to enter information associated with the particular plan in accordance with one embodiment of the invention.

FIG. 11 illustrates an exemplary user interface screen used to enter information related to contributions associated with the plan in accordance with one embodiment of the invention.

FIG. 12 illustrates an exemplary user interface screen used to enter information related to demographic information of the workforce allowed to contribute and enroll in the plan in accordance with one embodiment of the invention.

FIG. 13 illustrates an exemplary user interface screen used to enter investment option information in accordance with one embodiment of the invention.

FIG. 14 illustrates an exemplary user interface screen used to enter information relating to loan provisions in accordance with one embodiment of the invention.

FIG. 15 illustrates an exemplary user interface screen used to enter information pertaining to minimum, maximum and target guidelines in the areas of credit ratings, contract allocation and issuer percentages in accordance with one embodiment of the invention.

FIG. 16 illustrates an exemplary user interface screen for allowing information to be recorded pertaining to current and historical stable value returns in accordance with one embodiment of the invention.

FIG. 17 illustrates an exemplary user interface screen used to record general information pertaining to the withdrawal method, maximum maturity of any one contract, the minimum and targeted number of placements per year, contract provisions, and the like, in accordance with one embodiment of the invention.

FIG. 22 illustrates an exemplary user interface screen from which maturity/liquidity information may be entered in accordance with one embodiment of the invention.

FIG. 23 illustrates an exemplary user interface screen from which asset detail information may be entered in accordance with one embodiment of the invention.

FIG. 42 illustrates an exemplary user interface screen to display import data after verification that the import file information is in the correct import table format.

FIG. 43 illustrates an exemplary user interface screen from which a final confirmation of the import data and actions can be effected in accordance with one embodiment of the invention.

FIG. 44 illustrates an exemplary user interface screen from which the final data associated with import can be viewed in accordance with one embodiment of the invention.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention relates generally to financial transaction processing, and more particularly, to an electronic communication method and apparatus for facilitating financial transactions between money managers and issuers of investment contracts. Plan data may be uniformly collected, actively monitored and systematically analyzed in accordance with the invention. Data management utilities provide data interfacing and consistency in data transfer between various computing systems.

Figure 1:
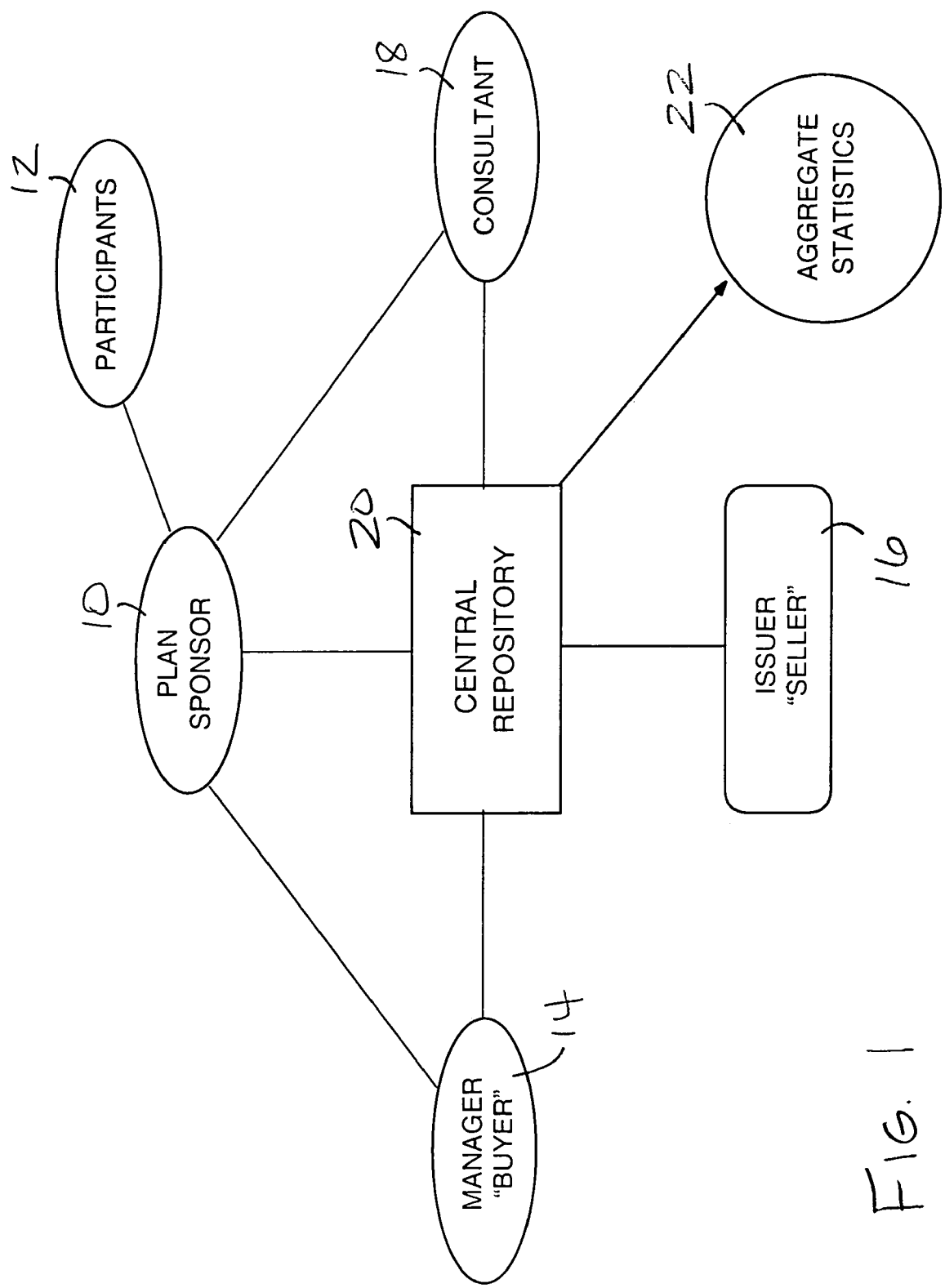
FIG. 1 illustrates a typical relationship between various participants in a stable value investment program in accordance with the present invention.

FIG. 1 illustrates a typical relationship between various participants in a stable value investment program. An individual company, such as the ABC Company, is referred to as a plan sponsor 10. Plan sponsors 10 are the "sponsors" of an investment scheme, such as a retirement plan, on behalf of its employees or participants 12 of the plan. A retirement plan is generally a tax-qualified plan under which the amount of the participant's benefit will vary dependent on the amount of employer and employee contributions made to the participant's account and the investment earnings credited thereon. Most defined contribution plans have participant-directed investment choices. The retirement plan typically includes various investment options of different types of funds, one of which may be a stable value fund.

The plan sponsor, such as ABC company, can either manage plan assets on its own, or it can retain the services of a professional investment manager 14. The investment manager 14 is a fiduciary who has the power to manage, acquire or dispose of certain plan assets. A stable value manager 14 therefore places and manages the stable value assets in a contribution plan and assumes the fiduciary responsibility for this management. Managers 14 are considered data providers to issuers 16, since managers 14 deliver all the necessary data, i.e., "plan information," for competitive contract rates to a wide range of contract issuers.

The stable value manager 14 may also be referred to as a "buyer," as it is the manager that assumes the responsibility for purchasing investment contracts and managing the portfolio of investments. The plan sponsor 10 may itself manage its portfolio directly, thus bypassing the need for a manager 14, and in this case the plan sponsor is considered an independent buyer. This may be the case where the plan sponsor is a large corporation that has established a retirement plan for its employees to use as a savings vehicle for retirement investing. A consultant 18 may be also retained by the company, which is an organization to provide professional advice to the corporate retirement plan by assisting individuals in charge of the plan with prudent investment decisions.

The managers, or buyers, purchase general account contracts and synthetic contracts from stable value issuers 16 in order to build a portfolio with the dollars employees have contributed. The stable value products are insurance-based products and must be underwritten like any other insurance product such as life, health and auto insurance. Managers 14 must supply the stable value issuers 16, also referred to as "sellers," with a significant amount of information on the characteristics of the company sponsored plan in order for the seller 16 to underwrite the risks that they are undertaking, so that a guaranteed rate of return on the contracts can be determined. This information, i.e., the plan information, includes general plan information such as contributions, company match rules and withdrawal provisions. The plan information also includes cash flow data on the stable value fund investment option that provides the inflows and outflows of all company employee dollars into this investment option, as well as other investment options offered and historical balances.

Once all the underwriting information is distributed from the buyer 14 to the seller 16, a manager/buyer 14 can request quotes for a specific plan. A manager will typically attempt to structure contract purchases in a predetermined dollar range on various maturity scenarios, and will collect bids from a number of different issuers/sellers 16. Upon receipt of all of the issuer bids, a manager begins the analysis of all bids and selects a winner. There is often some verbal dialog to negotiate the final rate, and when agreement is reached, a deal is typically memorialized on paper, usually via facsimile confirmation.

Managers 14 enter the plan information into a central database 20 via software to facilitate this process. The manager electronically builds a file for the issuer and transfers it to the issuers electronically. The stable value issuers 16 also have software to retrieve the file and bring it into its own database. The need to fax or mail reports is eliminated, and both the stable value managers and issuers have all of the data stored in an electronic database for easy access and analysis. From the central database 20, aggregate statistical information 22 can be generated for analysis by parties having access to the database.

Figure 2:
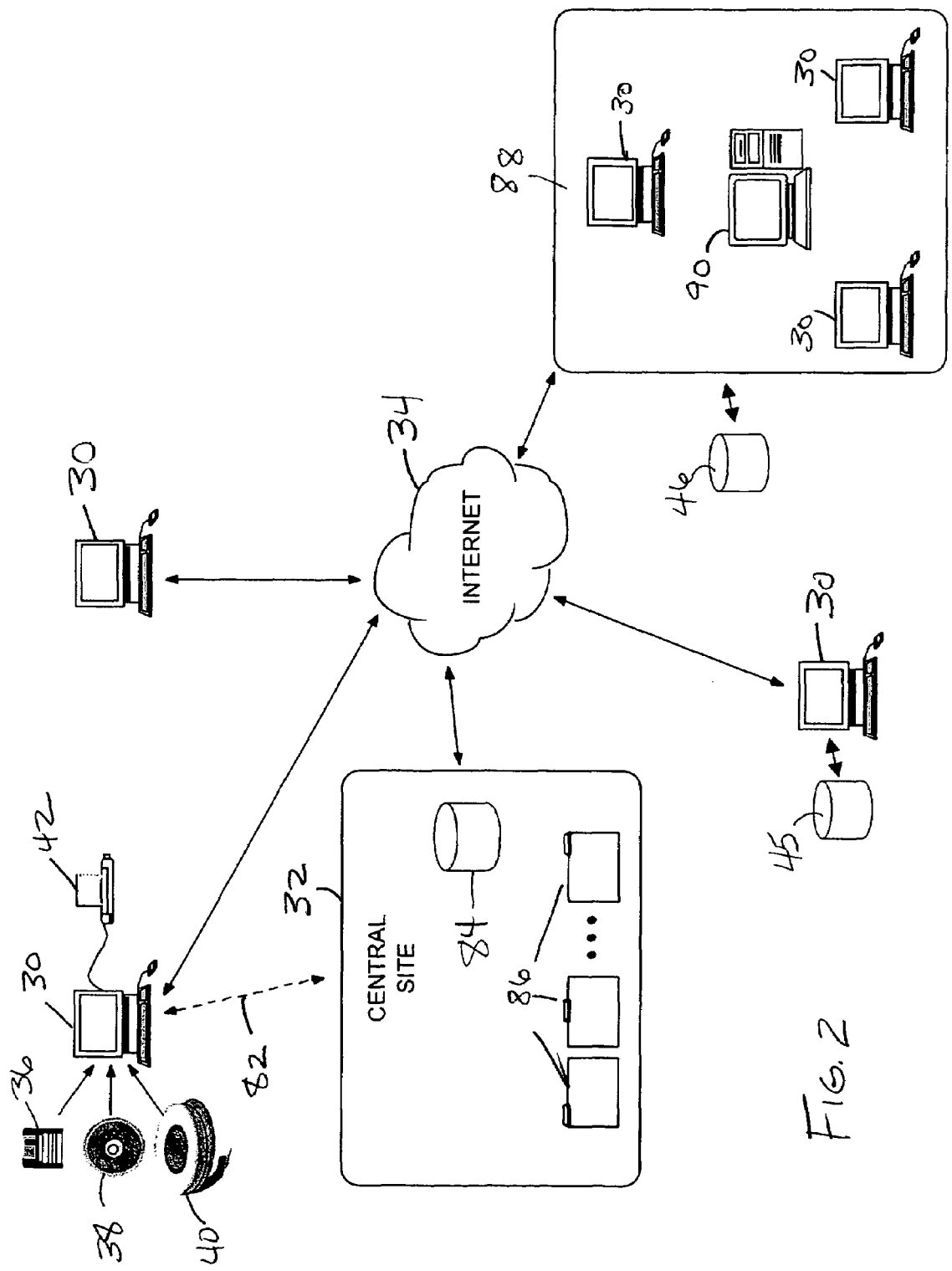
FIG. 2 is a system level diagram illustrating one manner of facilitating the electronic transfer of plan data between managers and issuers in accordance with one embodiment of the present invention.

FIG. 2 is a system level diagram illustrating one manner of facilitating the electronic transfer of plan data between managers and issuers in accordance with one embodiment of the present invention. One or more computing systems 30 can communicate with one another, and with the central site 32, via electronic transfer of information. This can be accomplished, for example, via the Internet 34. Each computing system 30 may include one or more various types of storage mediums to store program instructions that control the processing functions and actions taken by the computing system 30, such as diskette 36, CD-ROM 38, or tape 40. Reports and other documentation may be printed on printer 42.

Figure 3:
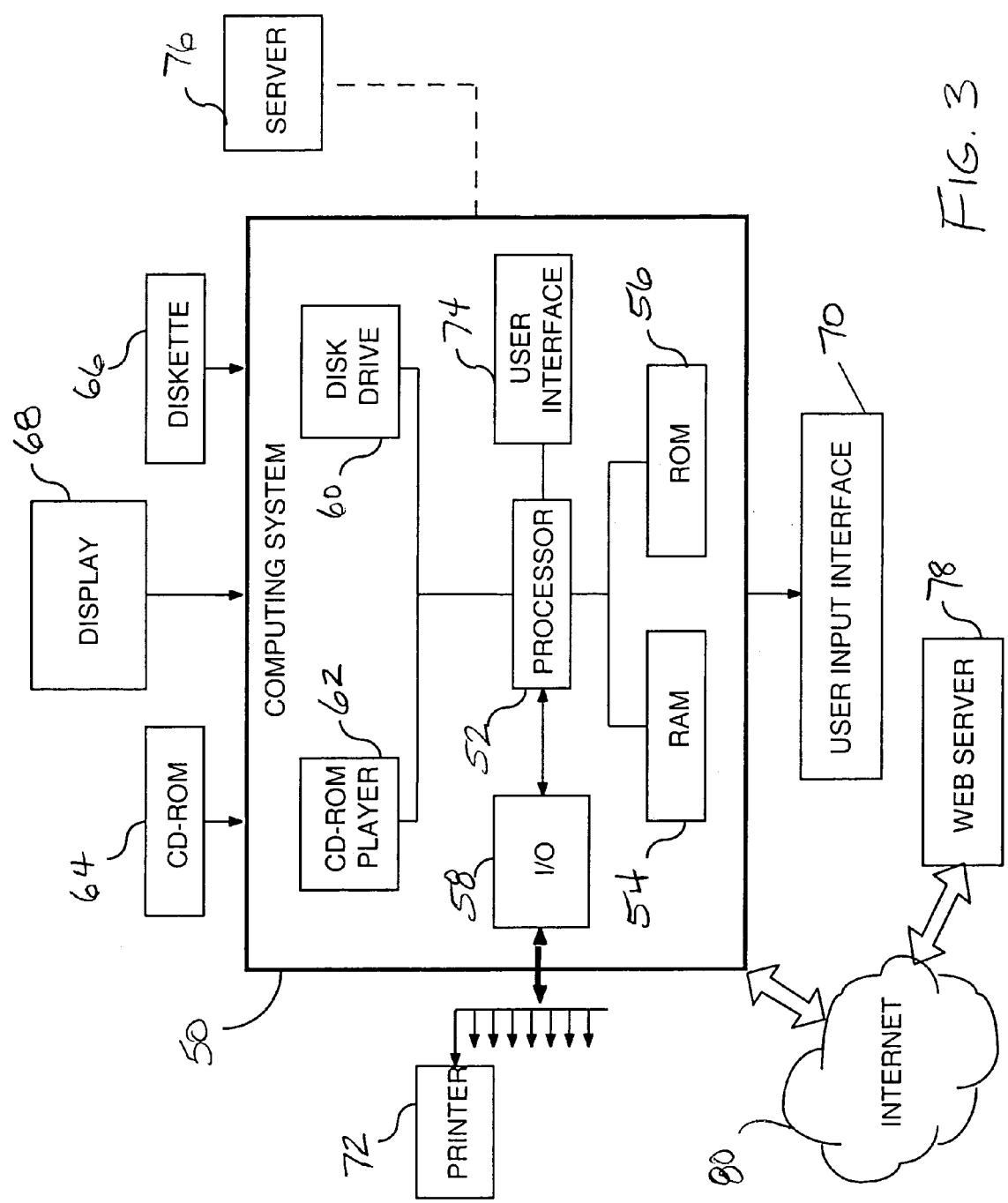
FIG. 3 is an illustration depicting the various components associated with a typical user computing system.

Each of the user computing systems 30 are suitable for performing the functions in accordance with the present invention. Referring now to FIG. 3, an illustration is provided that depicts the various components associated with such a user computing system 50. The computing system 50 typically includes a central processor (CPU) 52 coupled to random access memory (RAM) 54 and read-only memory (ROM) 56. The processor 52 communicates with other internal and external components through input/output (I/O) circuitry and bussing 58. The computing system 50 may also include one or more data storage devices, including hard and floppy disk drives 60 and a CD-ROM drive 62. In one embodiment, software containing application software, such as file management or command shell programs, may be stored and distributed on a CD-ROM 64, diskette 66, or other medium that may be inserted into, and read by, the CD-ROM drive 62 or the disk drive 60 respectively. The computing system 50 is also coupled to a display 68, a user input interface 70 such as a mouse and keyboard, and a printer 72. The user typically inputs and outputs information by interfacing with the computing system 50 through the user interface 74, which interacts with user input interface 70 and display 68. The computer may optionally be connected to network server 76 in a local network configuration. The computer may further be part of a larger network configuration as in a global area network (GAN) such as the Internet. In such a case, the computer accesses one or more web servers 78 via an internet 80.

Referring again to FIG. 2, the information communicated may be transferred via the Internet 34 to and from the central site 32 so that managers and issuers can transmit and receive data to and from one another. Optionally, a computing system 30 may have a direct electronic link to the central site 32, as depicted by dashed line 82. The central site 32 includes database storage 84, which may be physically and/or logically partitioned into individual folders 86 corresponding to issuers who are authorized to view, download, or otherwise process the data in its respective folder 86. Other computers 30 arranged in a network 88 via a server 90 may also be coupled to the central site 32, preferably via the Internet 34.

In one embodiment, managers and issuers may maintain large system databases, such as the databases 45 and 46. These databases typically store information for record keeping and tracking for many plans relating to various funds, of which stable value funds may be only a portion. The stored information relates to all information on individual participants in all of the various funds and plans available, and on the funds and plans themselves. In one embodiment of the invention, databases 45 and 46, or separate databases, are kept for information relating to the particular funds associated with the data to be transmitted between managers and issuers for purposes of conducting financial transactions for a particular fund group, such as stable value funds. As will be described more fully below, a subset of data may be exported from one database, such as database 45, and imported into another database, for ultimate transmission to central site 32 where the information is retained as depicted by database 84. Each computing system 30, 88 may maintain multiple databases, one of which includes the plan information relating to the present invention.

Figure 4:
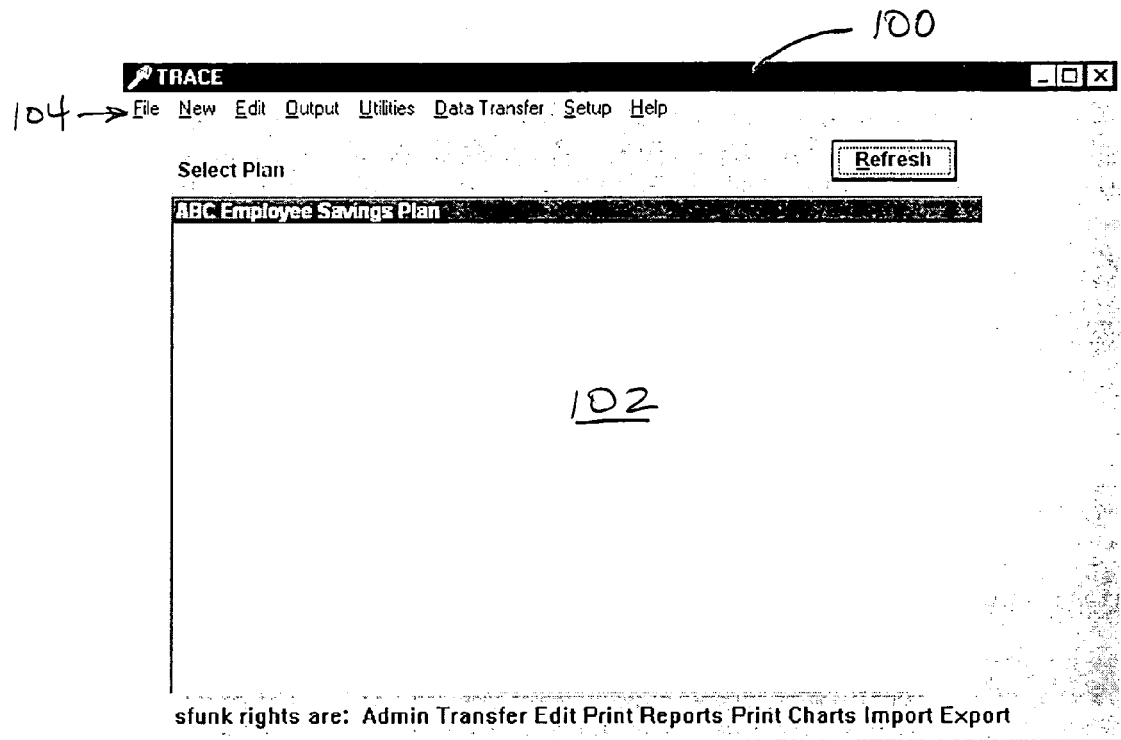
FIG. 4 illustrates one embodiment of a user interface for initiating access to the electronic communication system for facilitating financial transaction bidding and reporting processes.

FIG. 4 illustrates one embodiment of a user interface 100 for initiating access to the electronic communication system for facilitating financial transaction bidding and reporting processes. The user interface embodiment 100 of FIG. 4 is a computerized screen image allowing an interface for the user to access the system, referred to in this embodiment as the TRACE portfolio tracking and risk assessment system. The system provides a communication tool and comprehensive database system capable of use in the financial industry, and is particularly useful for the stable value industry. The system facilitates the electronic transfer of plan data between buyers and sellers in a standardized format, thereby reducing cumbersome administrative tasks and significantly improves the analytical capabilities for both Managers and Issuers. As seen from FIG. 4, plans currently existing in the system may be selected from the plan selection window 102. A menu bar 104 is provided to allow a wide variety of functions and tasks to be performed. In the present example, the menu bar 104 includes eight first tier menu items, including File, New, Edit, Output, Utilities, Data Transfer, Setup and Help.

Editing and Modifying Plan Information

Figure 5:
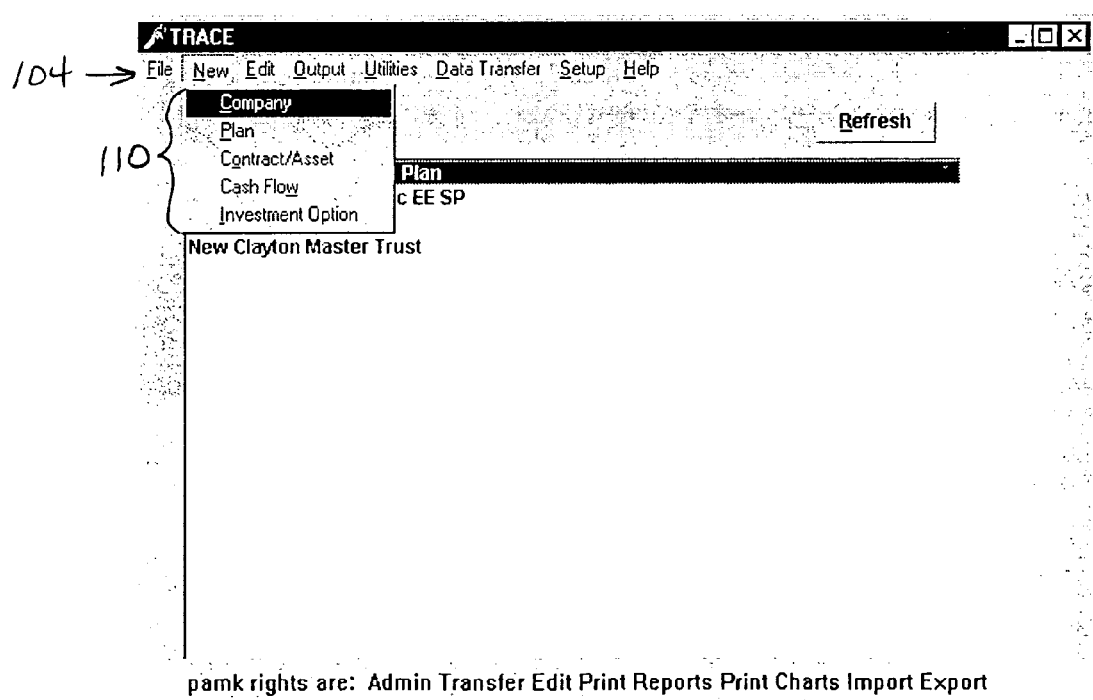
FIG. 5 illustrates an exemplary user interface screen for initiating entering of new plan information.

FIG. 5 illustrates one embodiment of second tier menu items 110 associated with the "New" menu item. In this embodiment, five second tier menu items are provided, including Company, Plan, Contact/Asset, Cash Flow and Investment Option. When a second tier menu item is selected (such as by using keystrokes, graphical pointer/selection, voice commands and the like), it may be highlighted, and will open a corresponding screen, window or other user interface.

Figure 6:
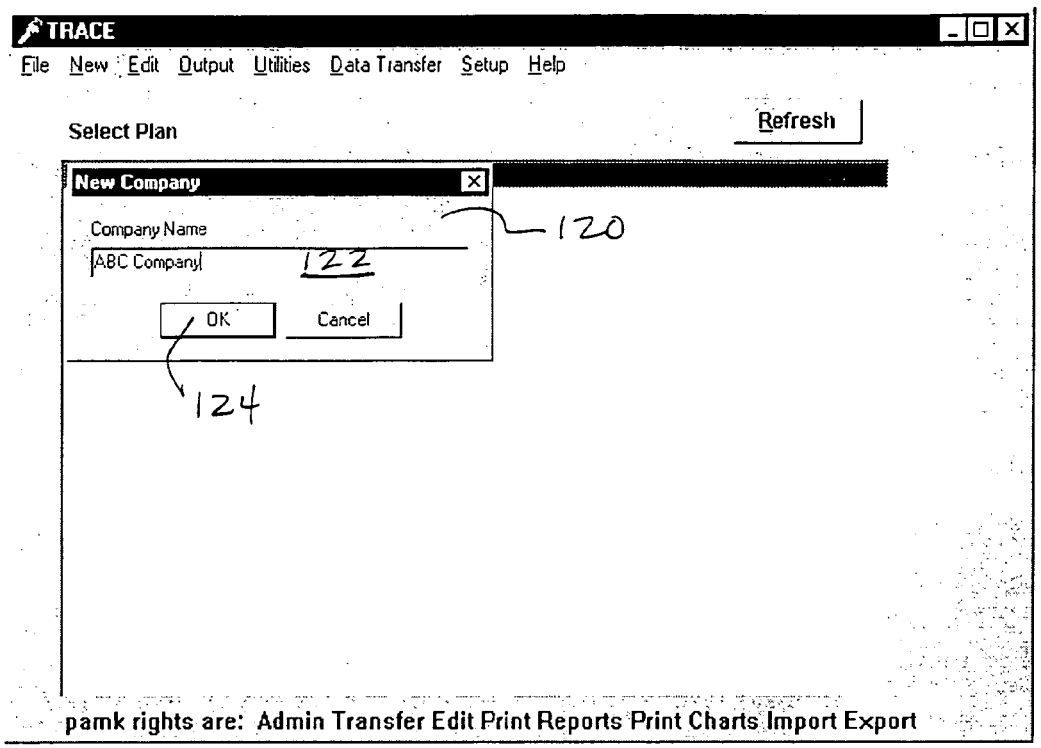
FIG. 6 depicts an exemplary user interface screen used to identify a new company in accordance with one embodiment of the invention.
Figure 7:
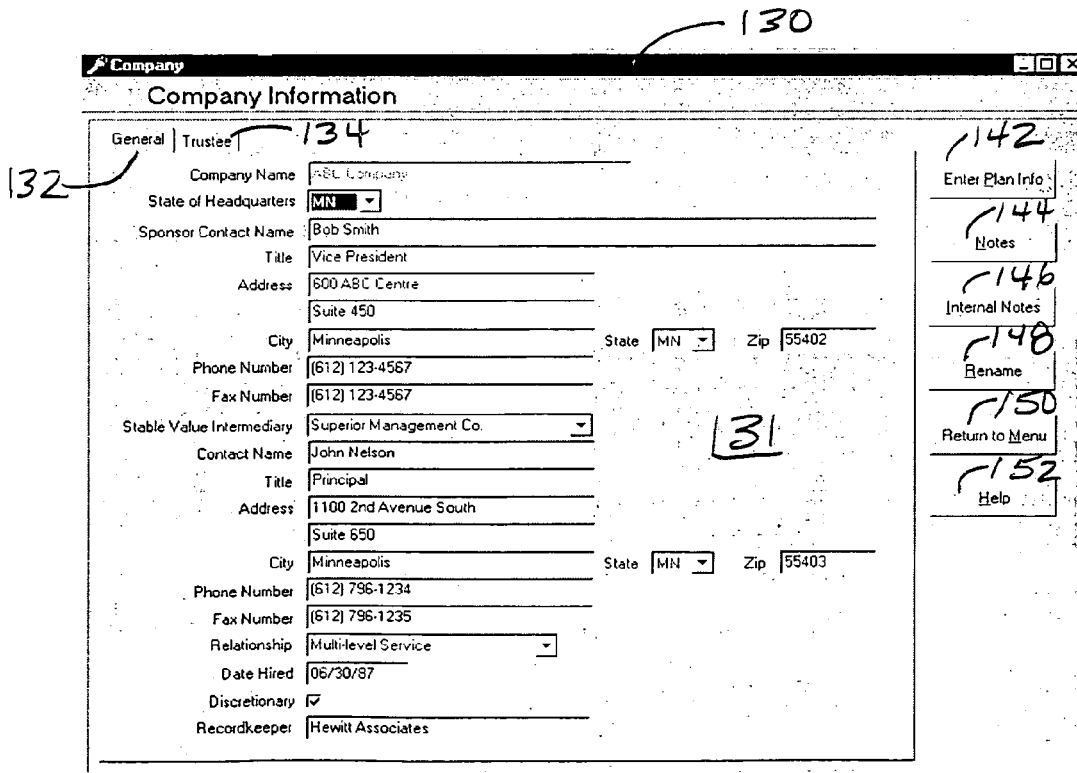
FIG. 7 illustrates an exemplary user interface screen for entering general company information relating to the plan sponsor in accordance with one embodiment of the invention.

FIG. 6 depicts a user interface window 120, referred to herein as the new company identification screen, that is used to identify a new company. A new company name is entered into the company name data field 122. When the company name has been submitted to the system, e.g., by clicking on the OK icon 124, a company screen 130 is provided as illustrated in FIG. 7, which includes a general information screen 131. The company screen facilitates gathering of information about the Plan Sponsor and the intermediaries used to service the Plan, such as the Stable Value Manager, consultant, trustee and record keeper. In one embodiment, the company screen 130 is divided into two tabs; General and Trustee.

Selection of the General tab 132 allows general information related to the company to be entered, and when selected, displays the general information screen 131. This information includes the company name, contacts and related information, and stable value intermediary names and addresses. Selection of the Trustee tab 134 makes the trustee window 140 of FIG. 8 open, which allows the user to enter information related to the trustee and ancillary contact/trustee. This information includes the trustee name, address and the ancillary name and address.

Figure 8:
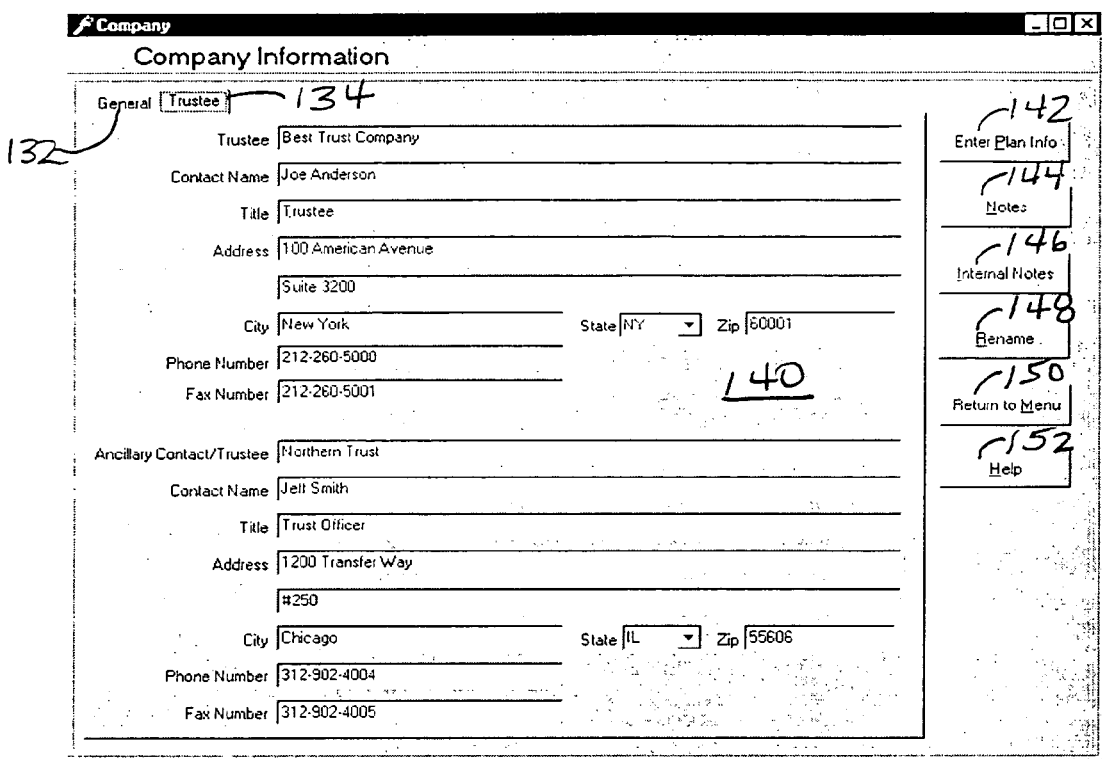
FIG. 8 illustrates an exemplary user interface screen for allowing the user to enter information related to the trustee and ancillary contact/trustee.

Associated with the General tab 132 and Trustee tab 134 are a number of function "buttons," which can be seen in both FIG. 7 and FIG. 8. All the buttons on the screen can be activated from either tab. From the company screen 130 a user can link the company information to Plan data by selecting the Enter Plan Info button 142. This is essentially a shortcut to allow the user to enter in a plan name and brings the user to a Plan screen without having to go back to the main menu, i.e., window 100 shown in FIG. 4. Plan information is general information related to the plan, such as the legal plan name, company name, Tax ID number and the type of contributions are used in the fund. Plan information is described in greater detail below.

Company-specific notes can be entered by activating the Notes button 144, and any information entered will be passed to the Issuer when a Manager builds transfer files. In one embodiment, the system provides a word processing application upon activation of the Notes button 144. This "note pad" is used to add special notes or clarifications to any field of data. When this button is re-activated, any previously saved information related to this company or Plan will appear, allowing the user to enter further clarifications and explanations.

Information specific to the company that is not to be transmitted to other people is entered by selecting the Internal Notes button 146. The internal notes function is analogous to the notes function, however the information written in internal notes is limited to internal use and is not shared with outside organizations. Managers may want to use internal notes to keep track of top Issuer bids or comments made about a company or a Plan. The details maintained in this section are not passed to Issuers. Issuers also have the ability to keep a special set of their own notes in their internal notes section. Issuers may want to keep track of bids given on this Plan, thoughts about the Plan or grade of the Plan. Only the entering site can print the information contained in this note pad when generating reports.

The Rename button 148 allows modification of the company name in the company table, and in all the Plans associated with the company. The Return to Menu button 150 returns the user to the main menu, which in this example is window 100 shown in FIG. 4. The Help button 152 activates the help program and brings the user to the topic containing information on the company screen 130.

Figure 9:
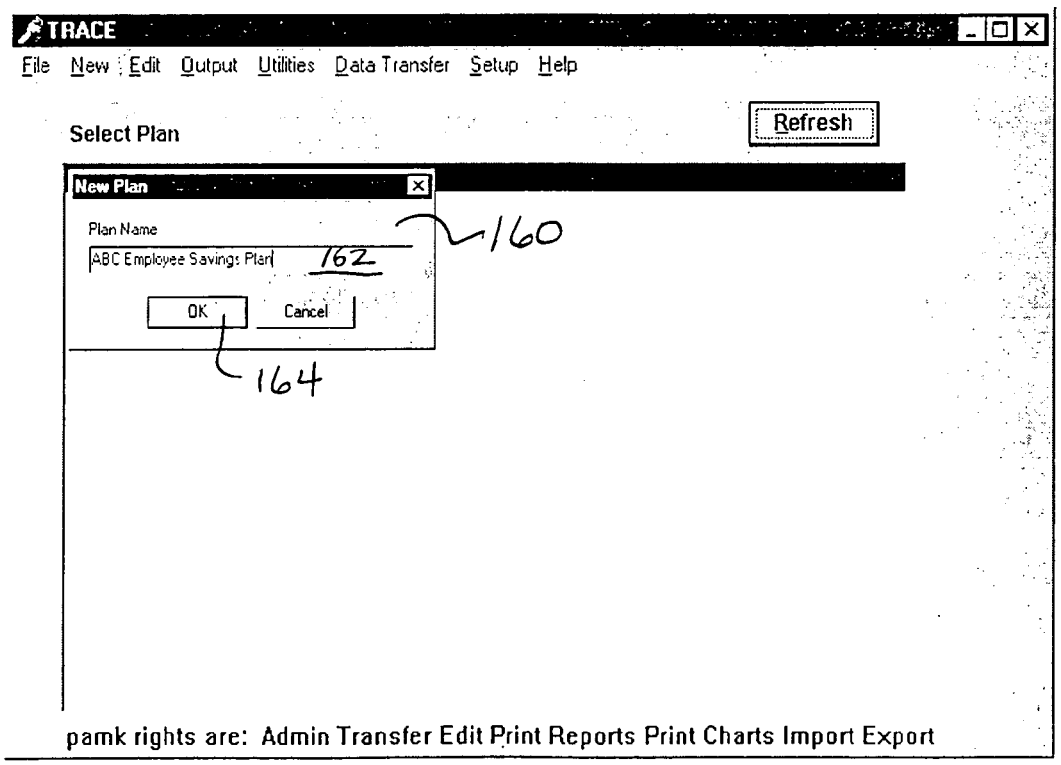
FIG. 9 depicts an exemplary user interface screen used to identify a new plan in accordance with one embodiment of the invention.
Figures 10, 11:
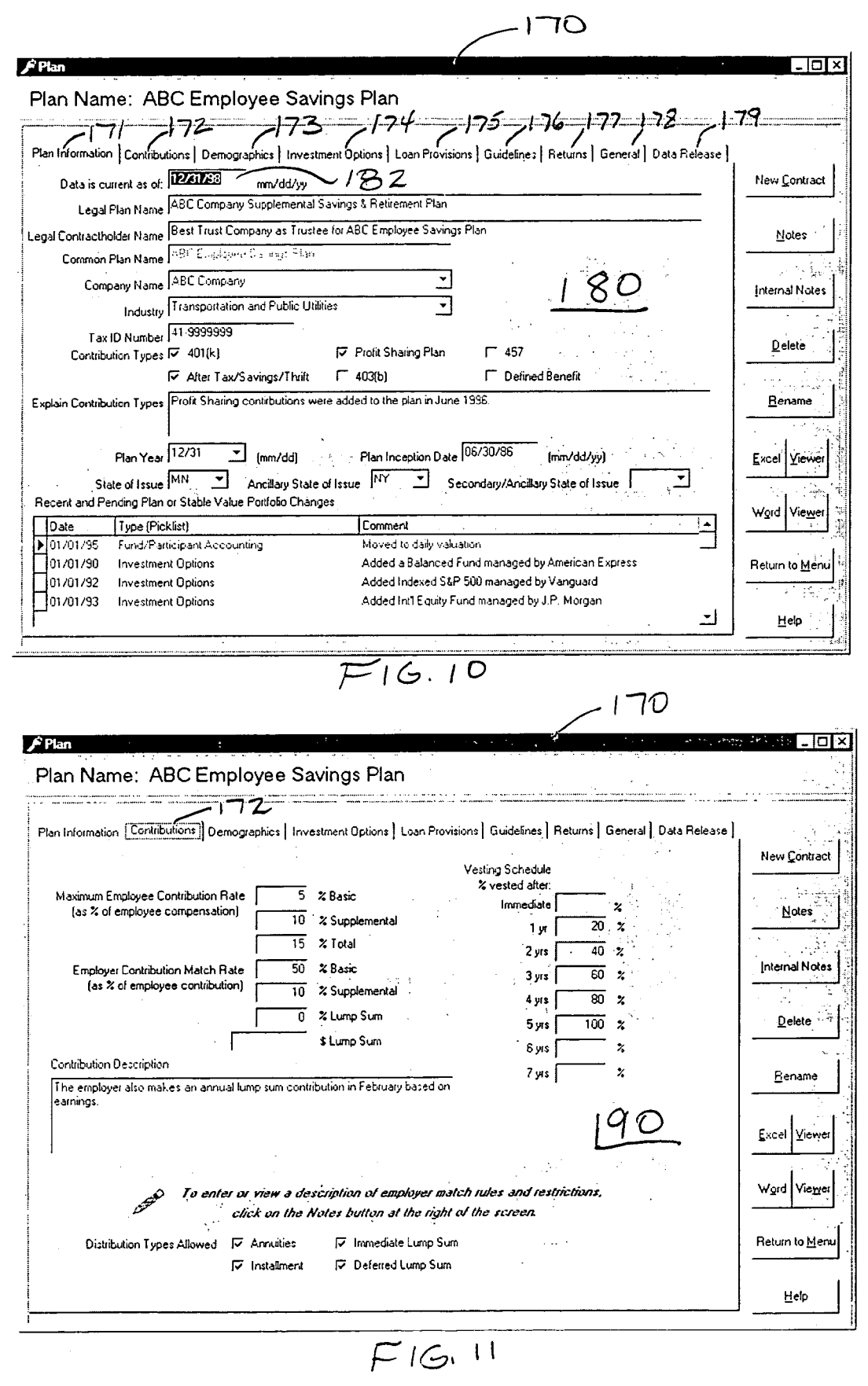

Selection of the second tier item "Plan" identified in FIG. 5 activates user interface window 160 shown in FIG. 9. This window, referred to herein as the new plan identification screen, is used to identify a new plan. A new plan name is entered into the plan name data field 162. When the plan name has been submitted to the system, e.g., by clicking on the OK icon 164, a plan screen 170 is provided as illustrated in FIG. 10. Managers/buyers can enter information associated with the particular plan via interface window 170, which can subsequently be viewed by a targeted issuer who will make a bid on that plan.

In one embodiment, the plan screen 170 is separated into nine categories, each under a separate tab. Each tab contains fields for data to be entered in order to create the "plan profile." In this embodiment, these tabs include tabs labeled Plan Information 171, Contributions 172, Demographics 173, Investment Options 174, Loan Provisions 175, Guidelines 176, Returns 177, General 178 and Data Release 179.

Selection of the Plan Information tab 171 provides the plan information screen 180. This screen is used to enter the general information related to the plan itself, such as the legal plan name, company name, tax ID number and the type of contributions used in the fund. Selection of the Contributions tab 172 provides the contributions screen 190 shown in FIG. 11. This screen is used to enter information related to the contribution rate for employees, the matching rate for employers, the vesting schedule, and the like. Selection of the Demographics tab 173 provides the demographics screen 200 shown in FIG. 12. This screen is used to enter demographic information of the workforce allowed to contribute and enroll in the plan. Some of the demographics included are the number of active, inactive, and eligible employees in the plan. Where the user selects the Investment Options tab 174, the investment options screen 210 shown in FIG. 13 is made available. This screen is used to record information related to the number of investment options in the plan, transfer policies on existing and future transfers along with transfer restrictions and types.

Selection of the Loan Provisions tab 175 provides the loan provision screen 220 shown in FIG. 14, which is used to record information regarding loans in the plan such as the number of loans allowed, maximum dollar amount of the loan, loan rate and repayment options and terms. Upon selection of the Guidelines tab 176, the guidelines screen 230 is provided as shown in FIG. 15. This screen allows entry of information pertaining to minimum, maximum and target guidelines in the areas of credit ratings, contract allocation and issuer percentages. Selecting the Returns tab 177 provides the returns screen 240 shown in FIG. 16. The returns screen 240 allows information to be recorded pertaining to current and historical stable value returns. Users can enter in monthly, quarterly and annual returns, along with other key portfolio characteristics including the weighted average maturity (WAM), effective duration, modified duration, and average Moody's and S & P ratings. Users are not required to enter in all return values. If necessary, a memo field (not shown) can be used to enter a note for each date with return information entered.

Figure 18:
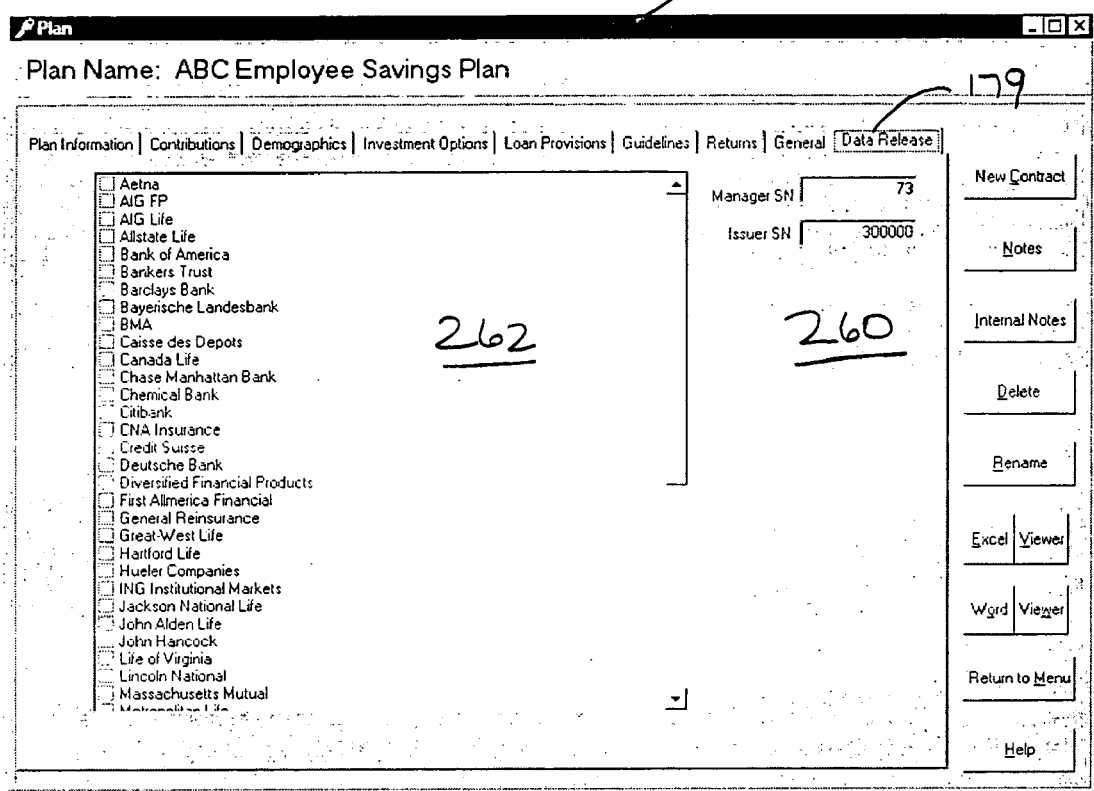
FIG. 18 illustrates an exemplary user interface screen from which an identification of issuers approved to receive the plan is provided in accordance with one embodiment of the invention.

The General tab 178 can be selected to provide the general screen 250 shown in FIG. 17. This screen may be used to record information pertaining to the withdrawal method, maximum maturity of any one contract, the minimum and targeted number of placements per year, contract provisions, and the like. Selection of the Data Release tab 179 provides the data release screen 260 shown in FIG. 18. The data release screen is used by managers to identify, by plan, the issuers approved to receive data. To release data to a particular Issuer, the box next to the Issuer's name is checked in the issuer list data field 262. In one embodiment, permission must be given separately for each plan. This step is completed once for each plan, and changed only if modification of the list of issuers approved for data release is desired. In one embodiment, the permissions are not transferred to issuers when they retrieve and decrypt plans.

Figure 19:
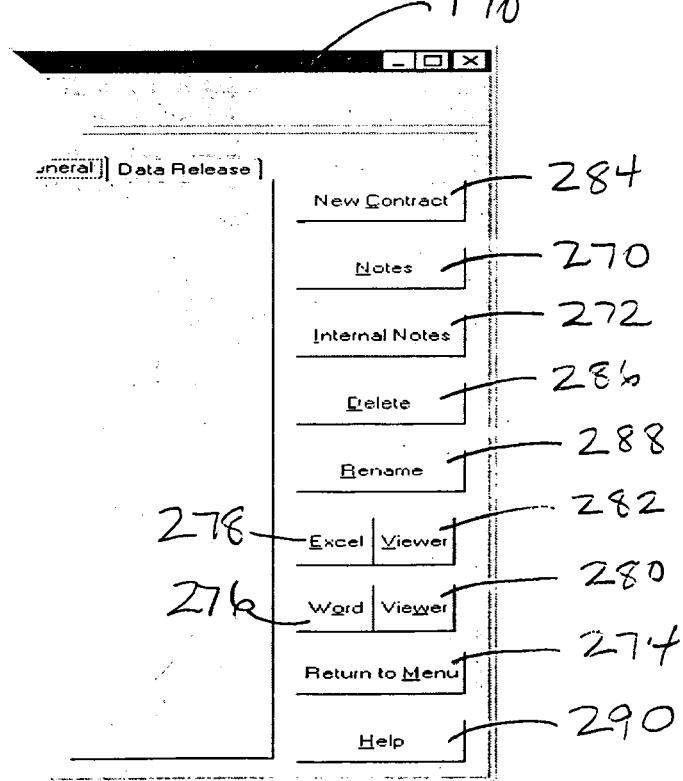
FIG. 19 depicts a partial view of an exemplary user interface screen associated with the entry of plan information wherein one or more plurality of function buttons may be selected in accordance with one embodiment of the invention.

Referring now to FIG. 19, a partial view of the plan screen 170 shown in FIGS. 10-18 is illustrated. A plurality of function buttons associated with the plan screen 170 are shown in FIG. 19. All the buttons on the screen can be activated from any of the tabs associated with the plan screen 170. The buttons labeled Notes 270, Internal Notes 272 and Return to Main Menu 274 are analogous to the Notes button 144, Internal Notes button 146 and Return to Main Menu button 150 described in connection with FIGS. 7 and 8. However, the Notes button 270 more particularly brings up a notes screen used to retain important Plan information. Entries made using this button will be passed from manager to issuer. The Internal Notes button 272 allows the managers to store important plan information that should not be passed from managers to issuers. Issuers can use this feature to type important private information related to the plan that will not be eliminated when information is received from Managers.

From the plan screen 170, the information entered via the Notes button 270 and/or Internal Notes button 272, as well as information entered via the Word (i.e., Microsoft® Word word processing program) button 276 and/or Excel (i.e., Microsoft® Excel spreadsheet program) button 278 are unique to the Plan. The information entered into the Notes, Word and Excel buttons will be included with the Plan when files are transmitted, while internal notes entered via the Internal Notes button 272 will not be included in the file or transmitted to Issuers. The Word button 276 allows the user to create a new Microsoft® Word document, or view an existing Word document, for the plan. Information entered into this feature will be sent along with the plan information when files are built. The Word Viewer button 280 allows Managers and Issuers to have different versions of the Microsoft® Word program. If a document was created in a version different from the version in which the user is attempting to view the document, the user may use the Viewer button 280 to view the document. Managers can use the viewer to verify that the information being sent to the issuers can be viewed correctly. Similarly, the Excel button 278 allows the user to create a new Microsoft® Excel spreadsheet, or view an existing Excel spreadsheet, for the plan. Information entered into this feature will be sent along with the plan information when files are built. The Excel Viewer button 282 allows managers and issuers to have different versions of the Microsoft® Excel program and view spreadsheets created in varying versions. If a spreadsheet was created in a version different than the version in which user is attempting to view the spreadsheet, the user may use the Viewer button 282 to view the spreadsheet. Managers can use the viewer to verify that the information being sent to the issuers can be viewed correctly. Other word processing or spreadsheet programs could alternatively be used in accordance with the principles of the present invention.

From the plan screen 170 a user can access the New Contract button 284, which allows the user to enter in a new contract name and brings the user to a contract screen without having to go back to the main menu, i.e., window 100 shown in FIG. 4. Activation of the Delete button 286 deletes the plan and all records associated with the plan that the user currently has open. The Rename button 288 changes the plan name in all the records associated with the plan that the user currently has open. Finally, the Help button 290 activates the help program, and brings the user to the topic containing information on the plan screen.

Figure 20:
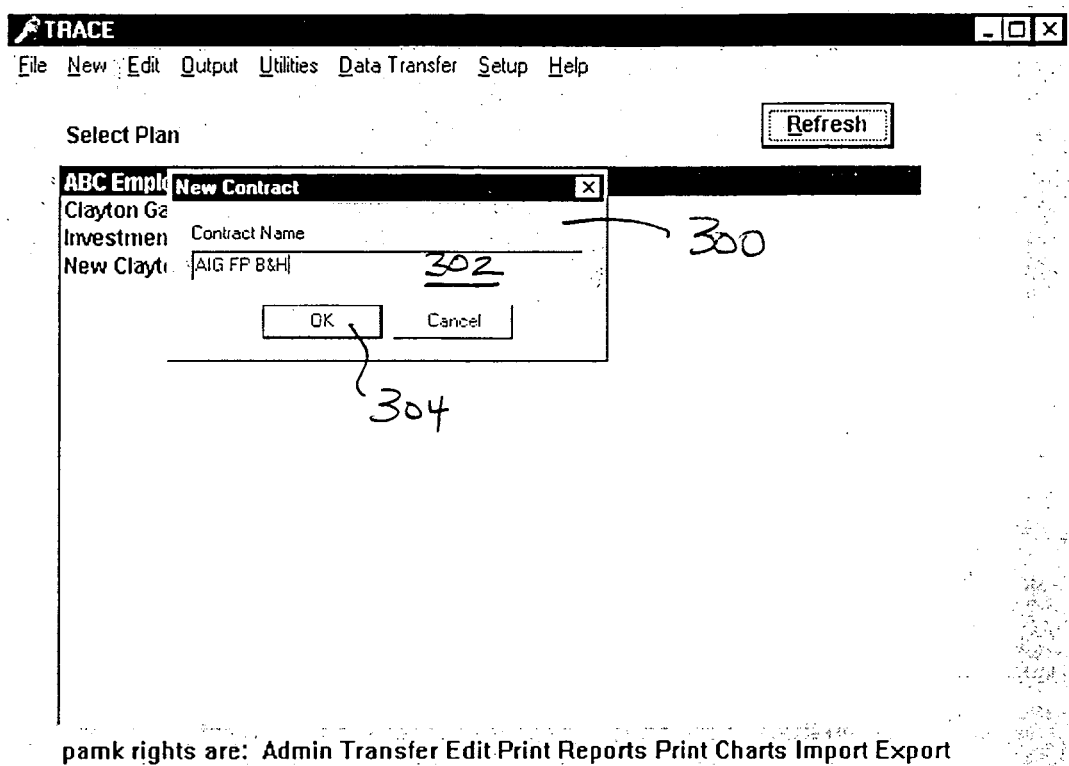
FIG. 20 illustrates an exemplary user interface screen used to identify a new contract name in accordance with one embodiment of the invention.
Figure 21:
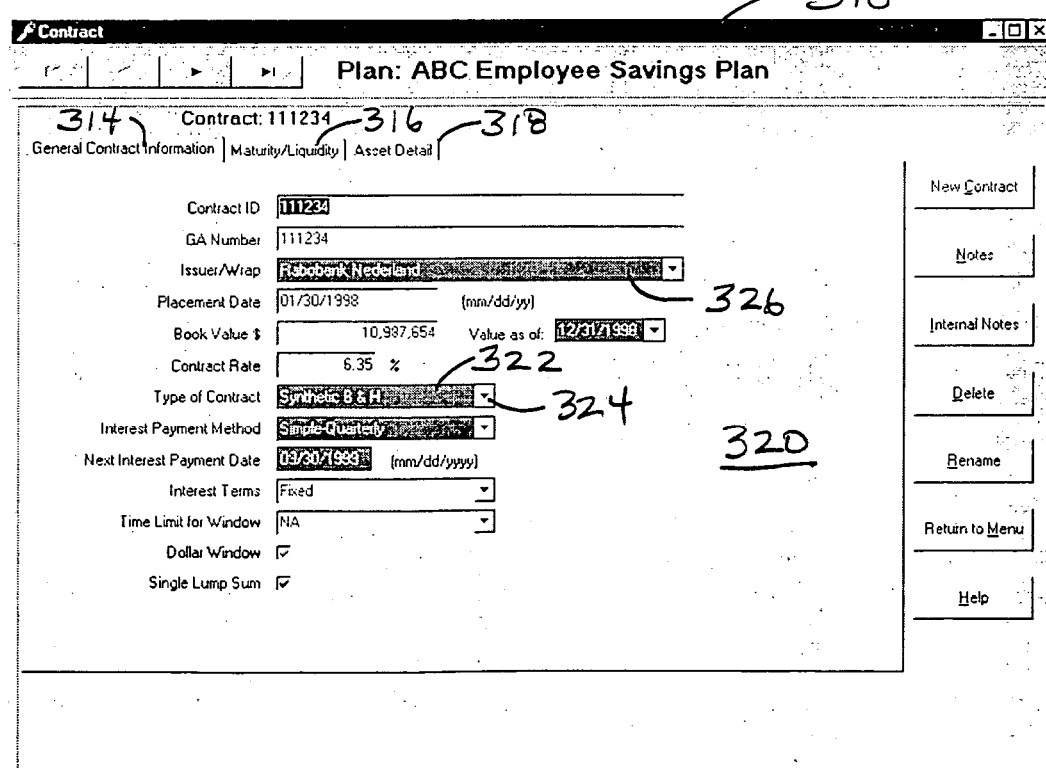
FIG. 21 illustrates an exemplary user interface screen from which general contract information may be entered in accordance with one embodiment of the invention.

Selection of the second tier item "Contract/Asset" identified in FIG. 5 activates user interface window 300 shown in FIG. 20. This window, referred to herein as the new contract identification screen, is used to identify a new contract. A new contract name is entered into the contract name data field 302. When the contract name has been submitted to the system, e.g., by clicking on the OK icon 304, a contract screen 310 is provided as illustrated in FIG. 21. A new contract may also be initiated by selecting the New Contract button 312.

In one embodiment, the contract screen 310 is divided into three tabs, including the General Contract Information tab 314, the Maturity/Liquidity tab 316, and the Asset Detail tab 318. Selection of the General Contract Information tab 314 provides the general contract information screen 320 shown in FIG. 21, which is used to record general information related to the contract. This type of general contract information can be seen in FIG. 21, and includes the contract identification number, issuer/wrap, book value, contract rate, and value as of date. Predetermined ones of these fields may be used for reporting purposes.

The Type of Contract data field 322 allows for a contract type to be selected from a pick list. Multiple contract types are listed, depending on the available types of contracts. These contracts may include BICs (Bank Investment Contract), cash or equivalents contracts, GIC floaters, GIC general accounts, GIC pooled funds, GIC separate accounts, market value, synthetic floaters, synthetic-managed evergreen, synthetic-managed fixed, and synthetic-buy and hold contract types. These are merely representative examples of the types of contracts that can be entered into the Type of Contract data field 322. In one embodiment, the data field 322 provides a plurality of selectable contract types that can be selected from a pick list, as seen by the pick list icon 324.

Figures 22, 23:
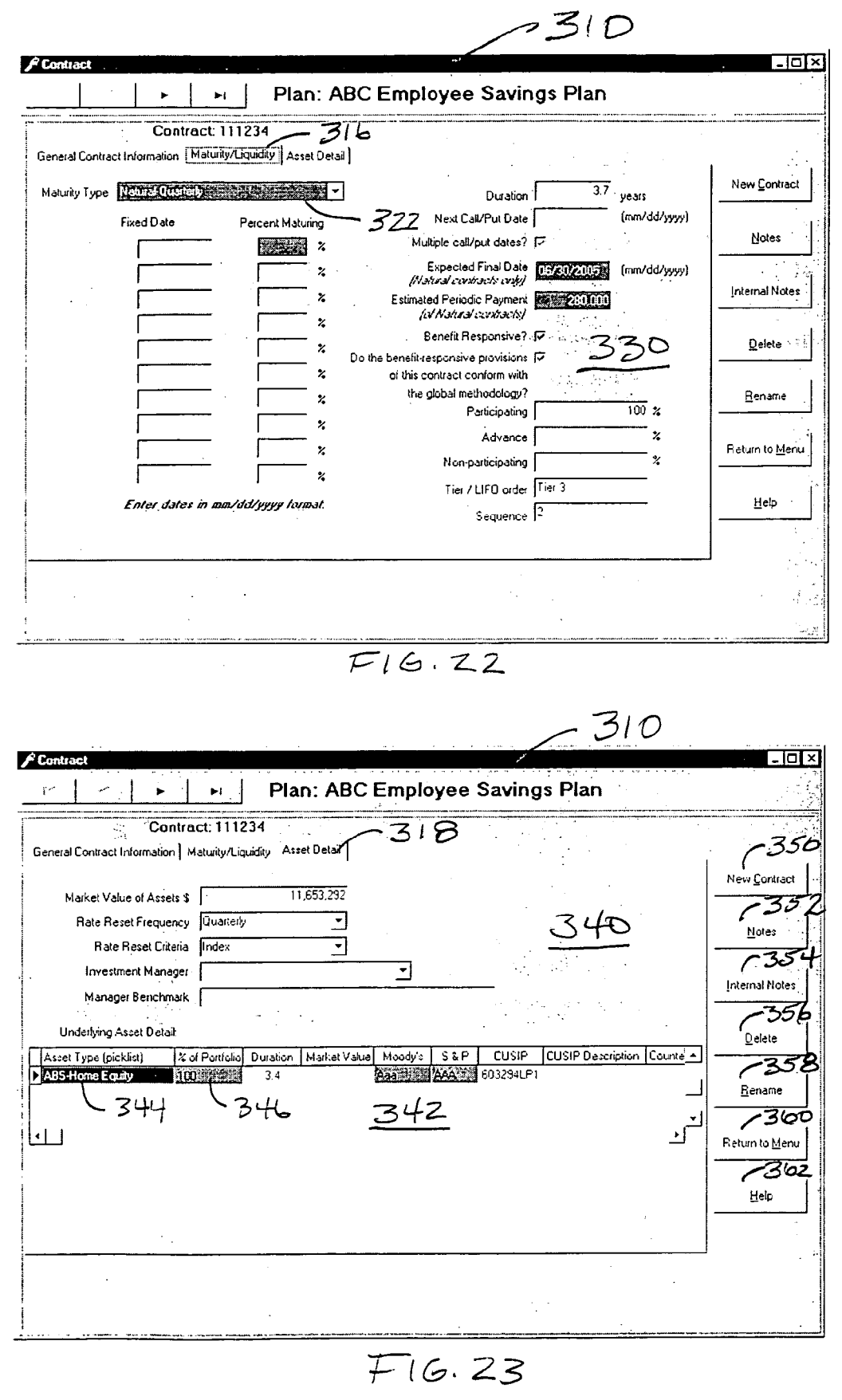

Selection of the Maturity/Liquidity tab 316 provides the maturity/liquidity information screen 330 shown in FIG. 22, which is used to record the maturity type and other related information. The maturity type field 332 addresses how a contract matures. For example, a constant duration maturity type is where a pool of assets is managed on an ongoing basis, and the contract has no intended maturity date but rather a duration "band" within which the assets are managed. In one embodiment, the maturity type pick list field includes multiple choices, including constant duration, fixed-single, fixed-multiple, natural-monthly, natural-quarterly, natural-semiannual and natural-annual maturity types. Any maturity type can be included in the maturity type field 332, which in one embodiment is configured as a pick list.

Selection of the Asset Detail tab 318 provides the asset detail screen 340 shown in FIG. 23. The contract screen 310 includes a separate Underlying Asset Detail table 342 for entering the underlying asset groups supporting the synthetic contracts held in the portfolio. To enter information in this table, an asset type is selected from the Asset Type pick list 344. The system can calculate an average credit rating of underlying assets for synthetic contracts and print this rating in a portfolio holdings report based on the percentages entered in the "% of portfolio" column 346.

Associated with contract screen 310 are a number of function buttons, which can be seen in FIGS. 21, 22 and 23. The New Contract button 350 allows the user to enter in a new contract for the plan without having to go back to the main menu as shown in FIG. 20. The Notes button 352, Internal Notes button 354, Delete button 356, Rename button 358, Return to Menu button 360 and Help button 362 are analogous to those previously described.

Figures 24, 25:
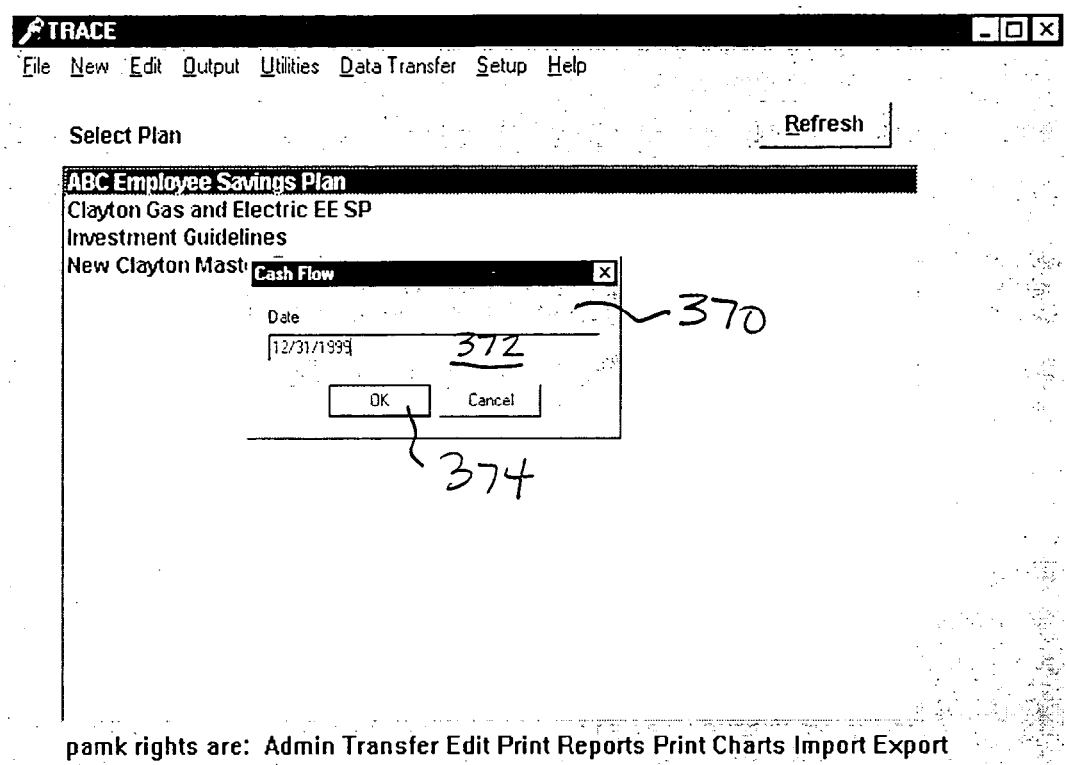
FIG. 24 illustrates an exemplary user interface screen used to input a desired cash flow date to view cash flow corresponding to a certain period in accordance with one embodiment of the invention.
FIG. 25 illustrates an exemplary user interface screen from which cash flow information may be entered in accordance with one embodiment of the invention.

Selection of the second tier item "Cash Flow" identified in FIG. 5 activates user interface window 370 shown in FIG. 24. This window, referred to herein as the cash flow screen, is used to input a desired date in the cash flow date field 372 to view cash flow. When the date has been submitted to the system, e.g., by clicking on the OK icon 374, a cash flow screen 380 is provided as illustrated in FIG. 25. This will allow cash flow information to be entered from this date for the cash flow history intended to be entered. Cash flow history, such as for three or more years of cash flow, is entered into the cash flow data table 382. The cash flow memo field 384 may be used to store footnotes explaining fluctuations in cash flows, e.g., due to large, unusual items or to explain how cash flow are summed. The Return to Menu button 386 and Help button 388 are analogous to those previously described.

Figure 26:
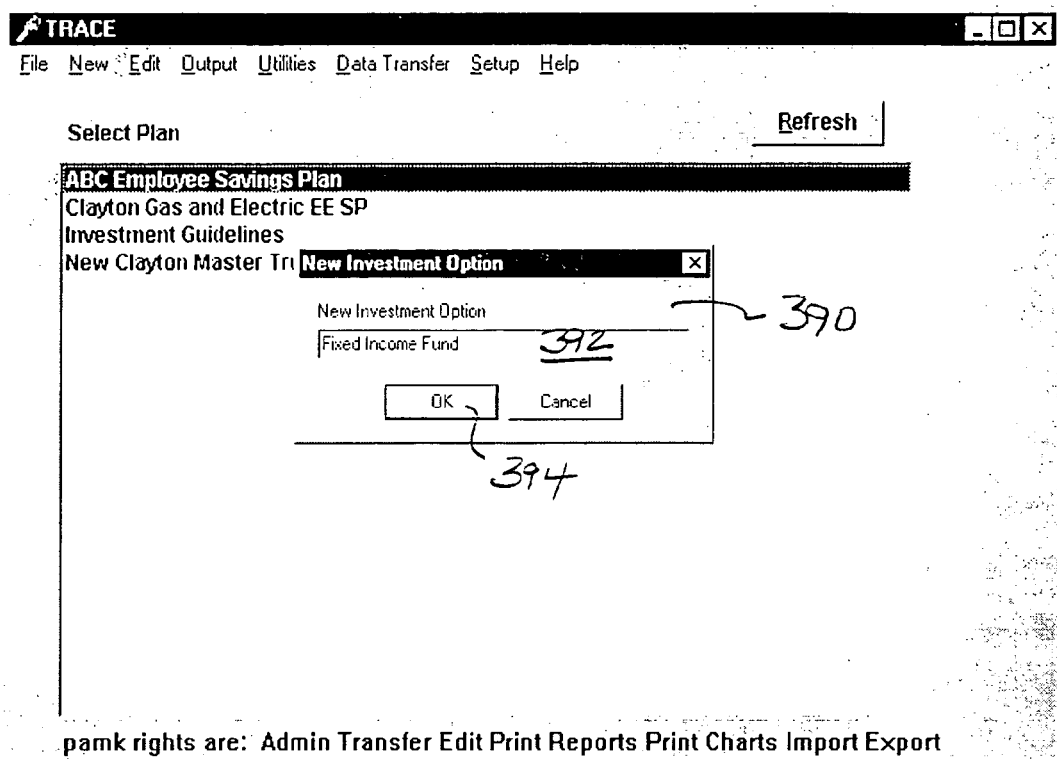
FIG. 26 illustrates an exemplary user interface screen from which a new investment option name may be entered in accordance with one embodiment of the invention.
Figure 27:
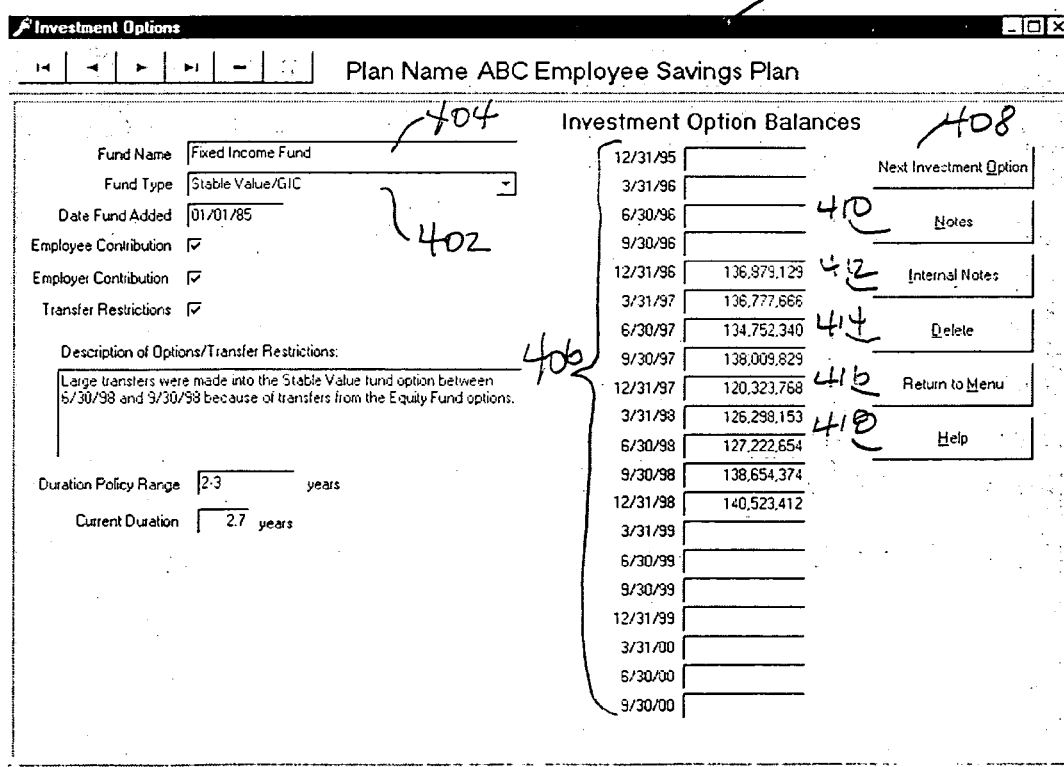
FIG. 27 illustrates an exemplary user interface screen wherein various investment options may be selected in accordance with one embodiment of the invention.

Selection of the second tier item "Investment Option" identified in FIG. 5 activates user interface window 390 shown in FIG. 26. This window, referred to as the investment option screen, is used to create a new investment option (or alternatively to identify an existing investment option) by entering a name for the new investment option in the investment option data field 392. When the investment option has been submitted to the system, e.g., by clicking on the OK icon 394, an investment options screen 400 is provided as illustrated in FIG. 27. This screen 400 is used to record investment options for the plan as well as quarterly balances transfer restrictions, duration of the fund, and the like. For example, the fund type may be selected from a predetermined list in the fund type data field 402 (a "pick list" in this example), where the fund types may include such funds as "S & P 500", "Stable Value/GIC", and the like. The fund name data field 404 allows a user to input a unique name of the fund option as it is described to participants in the written plan materials. In the invest option balances data fields 406, the total value for all invested assets for the particular investment are entered, which can then be tracked to monitor inter-fund transfer trends.

Associated with the investment options screen 400 are a number of function buttons, including the Next Investment Option button 408. This graphical button allows users to enter multiple investment options for a plan without requiring the user to return to the main menu. When this button is activated, the user will be prompted to enter in an investment option name. After the new investment option name is entered, a blank Investment Options screen 400 will appear. The Notes button 410, Internal Notes button 412, Delete button 414, Return to Menu button 416 and Help button 418 are analogous to those previously described.

Referring briefly to FIG. 5, the menu bar 104 also includes first tier menu item "Edit." In one embodiment, the second tier items associated with the Edit menu item correspond to those of the "New" menu item shown in FIG. 5. This allows the company screen 130 (see e.g., FIG. 7), the plan screen 170 (see e.g., FIG. 10), the contract screen 310 (see e.g., FIG. 21), the cash flow screen 380 (see e.g., FIG. 25) and the investment options screen 400 (see e.g., FIG. 27) to be modified as the user desires.

Generating Reports and Graphs

Figure 28:
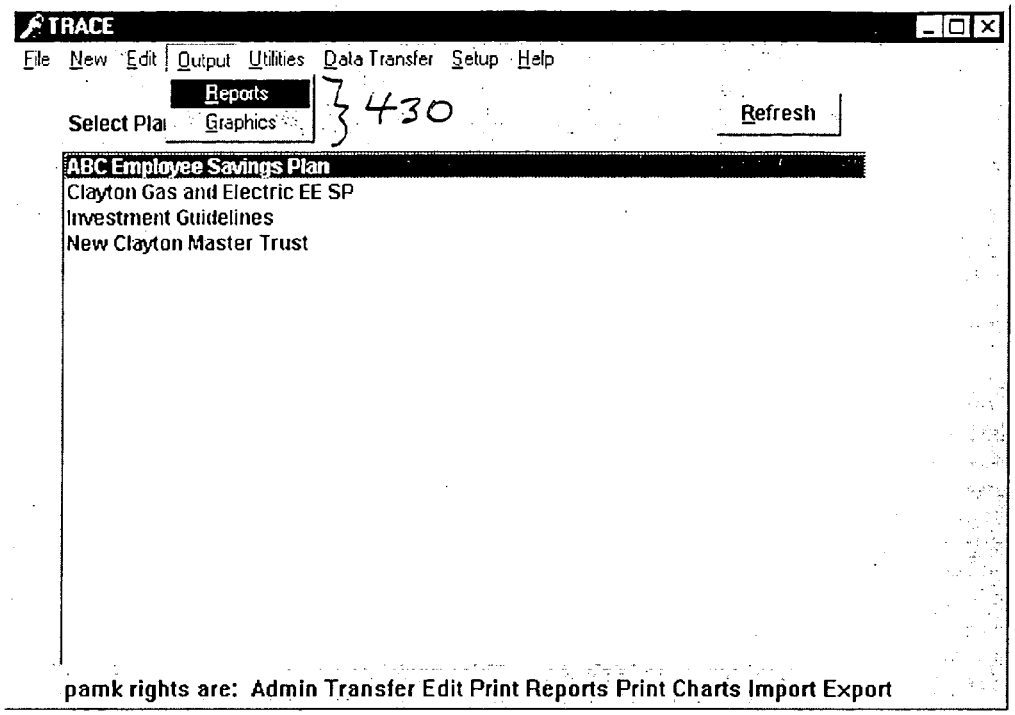
FIG. 28 illustrates an exemplary user interface screen from which reports and graphs may be initiated in accordance with one embodiment of the invention.

Also illustrated in FIG. 5 is the first tier menu item "Output" shown on the menu bar 104. Two second tier menu items 430 are shown in FIG. 28, including the "Reports" and "Graphics" menu items. Selection of the second tier item "Reports" activates the reporting screen 440 shown in FIG. 29. One or more companies can be selected from the company report selection field 442. Users have the option to preview, print or fax the reports generated for a company or group of companies using the Preview button 444, Print button 446 and Fax Reports button 448 respectively. Previewing allows the user to preview the reports before printing, for example, to verify that the correct reports and/or company was selected to print and to verify the accuracy of information. Various preview options may also be used, such as zooming capabilities which are implemented in one embodiment of the invention.

The Print button 446 allows the user to print reports directly to the printer without viewing the information. In one embodiment, companies are listed in alphabetical order by company name in the company report selection field 442. If a company has multiple plans associated with it, all of the selected reports for these plans will print when selecting the company that the plans are attached to.

Faxing reports via the Fax Reports button 448 allows the user to fax reports and attachments directly from the system. In one embodiment, the faxing program works in connection with Win Fax Pro faxing software, commercially available from Symantec, and may alternatively be used with other fax software programs that allow reports to be sent via facsimile.

Figure 29:
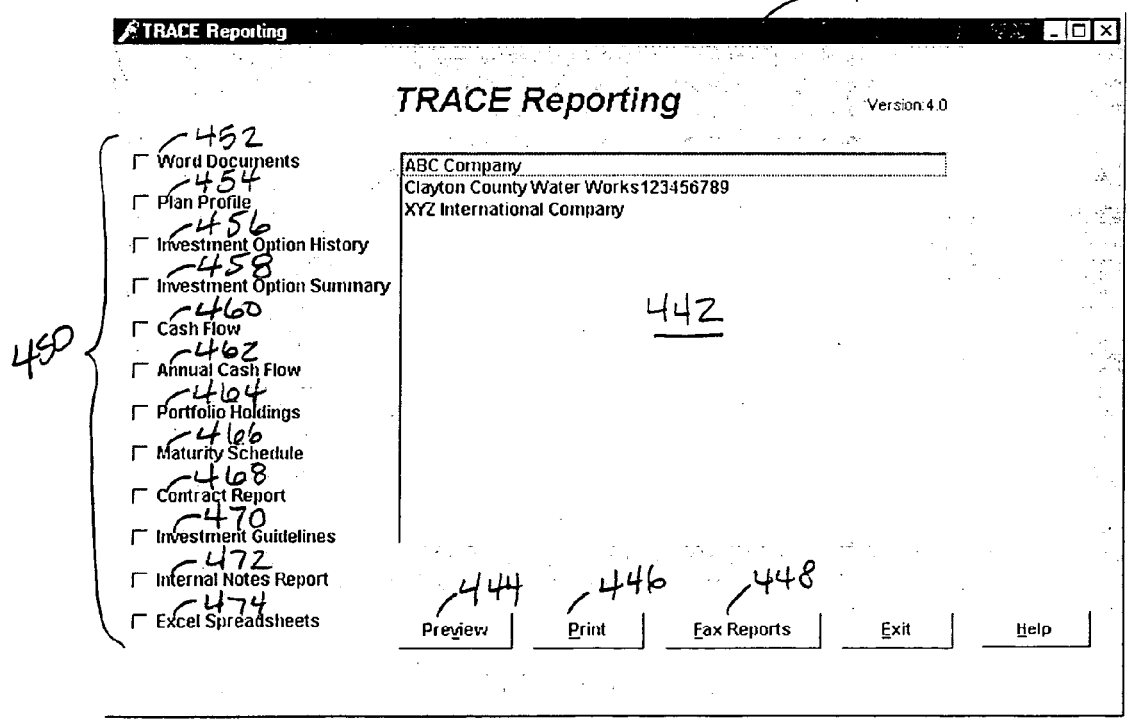
FIG. 29 illustrates an exemplary user interface screen wherein various reporting options may be selected in accordance with one embodiment of the invention.

The reporting screen 440 includes multiple automated report choices, shown in FIG. 29 along the report selection bar 450. These report choices include printing all information that is typed into a word processing document for a plan, shown in this example as the "Word Documents" selection 452. The "Plan Profile" selection 454 is a written text document outlining predetermined plan information. The Investment Option Summary selection 456 is a history of the investment options beginning with the period in the "current as of date" field 182 from the plan information screen 170 (see FIG. 10). The Investment Option Summary selection 458 provides a list of the investment options currently offered by the plan. In one embodiment, the report lists nine quarter balances beginning with the period that is entered into the "current as of date" field 182 of the plan information screen 170 (see FIG. 10) and prints the next eight consecutive quarters. The cash flow selection 460 provides a detailed history of the cash flow for the stable value fund. The Annual Cash Flow selection 462 provides a history of the cash flow by year for the stable value fund. The Portfolio Holdings selection 464 is a list of all contracts and underlying assets held in the portfolio. The Maturity Schedule selection 466 provides a report list of contracts in the stable value fund showing the principal and interest amount that matures on a yearly basis. The Contract Report selection 468 provides a report of all information entered for each contract for a particular plan. The Investment Guidelines selection 470 is a report that compares the minimum, maximum and target plan policies. The Internal Notes Report selection 472 provides a report of all information entered into the company and plan "internal notes" button. Finally, the Excel Spreadsheets selection 474 prints all information that is typed into a Microsoft® Excel spreadsheet.

Figure 30:
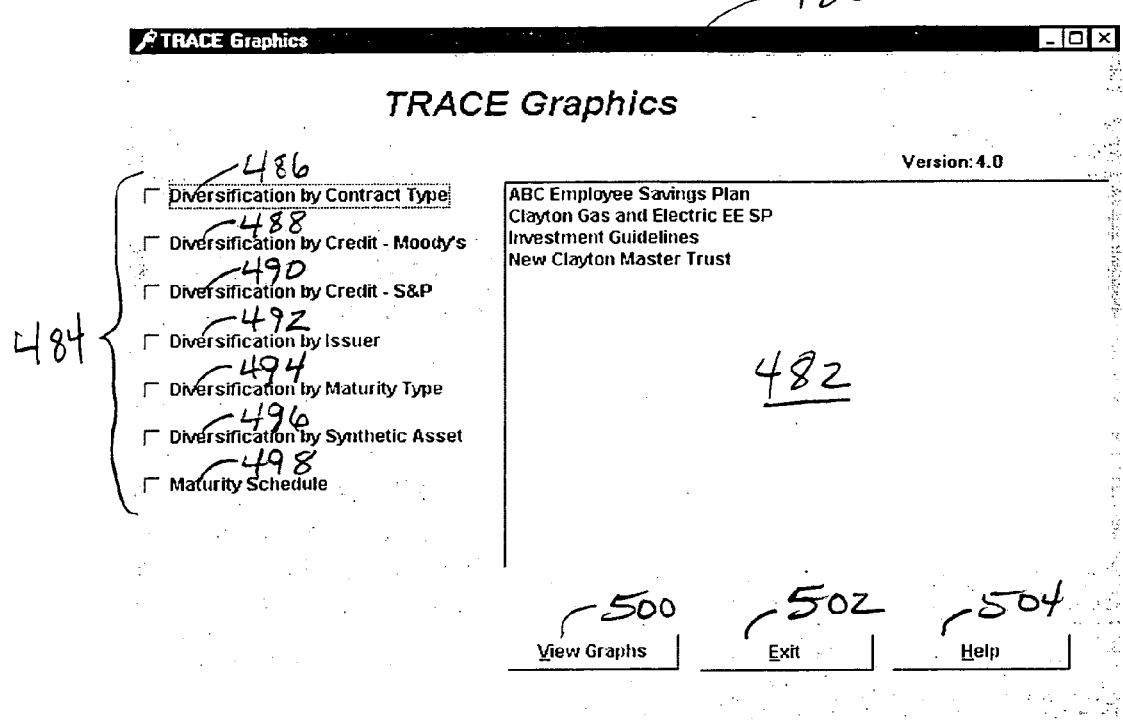
FIG. 30 illustrates an exemplary user interface screen wherein various graph options may be selected in accordance with one embodiment of the invention.

Selection of the second tier item "Graphics" shown in FIG. 28 activates the graphics screen 480 shown in FIG. 30. The graphics screen 480 provides users with a user interface to allow plan data to be summarized quickly and efficiently. In one embodiment, the plans in the system are listed in alphabetical order by plan name in the plan selection field 482.

The graphics screen 480 includes multiple graph choices, shown in FIG. 30 along the graph selection bar 484. These graph choices include the Diversification by Contract Type selection 486, which provides a 3-dimensional pie chart of the plan's allocation to various contract product types, such as traditional GICs, synthetics, cash, or market value contracts. The Diversification by Credit—Moody's selection 488 and Diversification by Credit—S&P selection 490 respectively provides Moody or S&P credit 3-dimensional pie charts of the dollar-weighted exposure to each credit level as defined respectively by Moody and S&P. Contract ratings are determined by the credit rating of issuers of traditional contracts and the average credit rating of the underlying assets of synthetic contracts. Cash and contracts that do have a rating entered are not included in the overall statistics. The Diversification by Issuer selection 492 provides a 3-dimensional pie chart subtotaling the dollar-weighted allocation to each issuer in the plan according to the issuer chosen from the issuer pick list 326 on the contract screen 310 of FIG. 21. The Diversification by Maturity Type selection 494 provides a 3-dimensional pie chart of the portfolio's dollar-weighted allocation to various maturity types as identified during contract data entry. The Diversification by Synthetic Assets selection 496 provides a 3-dimensional pie chart of the underlying assets of synthetic contracts held in the portfolio as identified in the Underlying Asset Detail table 342 of FIG. 23. Finally, the Maturity Schedule selection 498 provides a 3-dimensional stacked bar chart of future maturity values of contracts coming due from the plan as of the date forward for the next predetermined number of years, such as ten years.

Selection of the View Graphs button 500 on the graphics screen 480 displays the graphs selected for the company or companies selected. The Exit button 502 and the Help button 504 are analogous to those previously described.

Utilities

Figure 31:
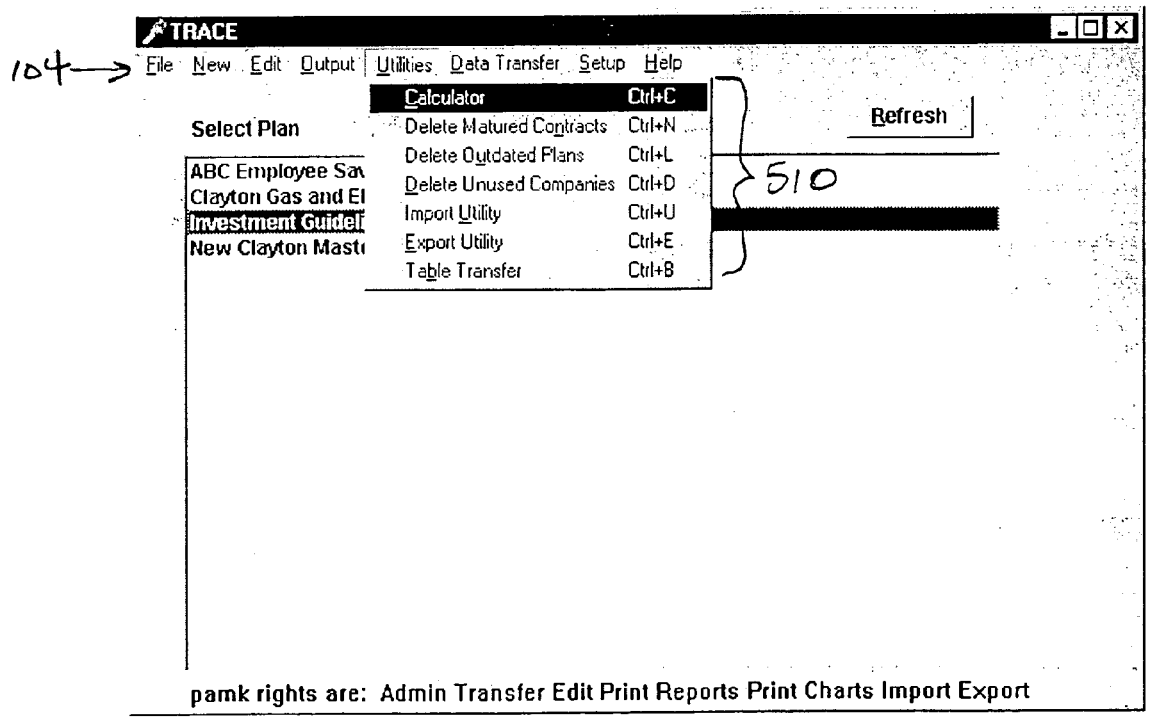
FIG. 31 illustrates an exemplary user interface screen from which a plurality of utilities may be initiated in accordance with one embodiment of the invention.

Another first tier menu item shown in FIG. 5 is the "Utilities" menu item on the menu bar 104. Seven second tier menu items 510 are shown in FIG. 31, including the "Calculator", "Delete Matured Contracts", "Delete Outdated Plans", "Delete Unused Companies", "Import Utility", "Export Utility" and "Table Transfer" menu items. Selection of the second tier item "Calculator" activates an on-screen calculator.

Figure 32:
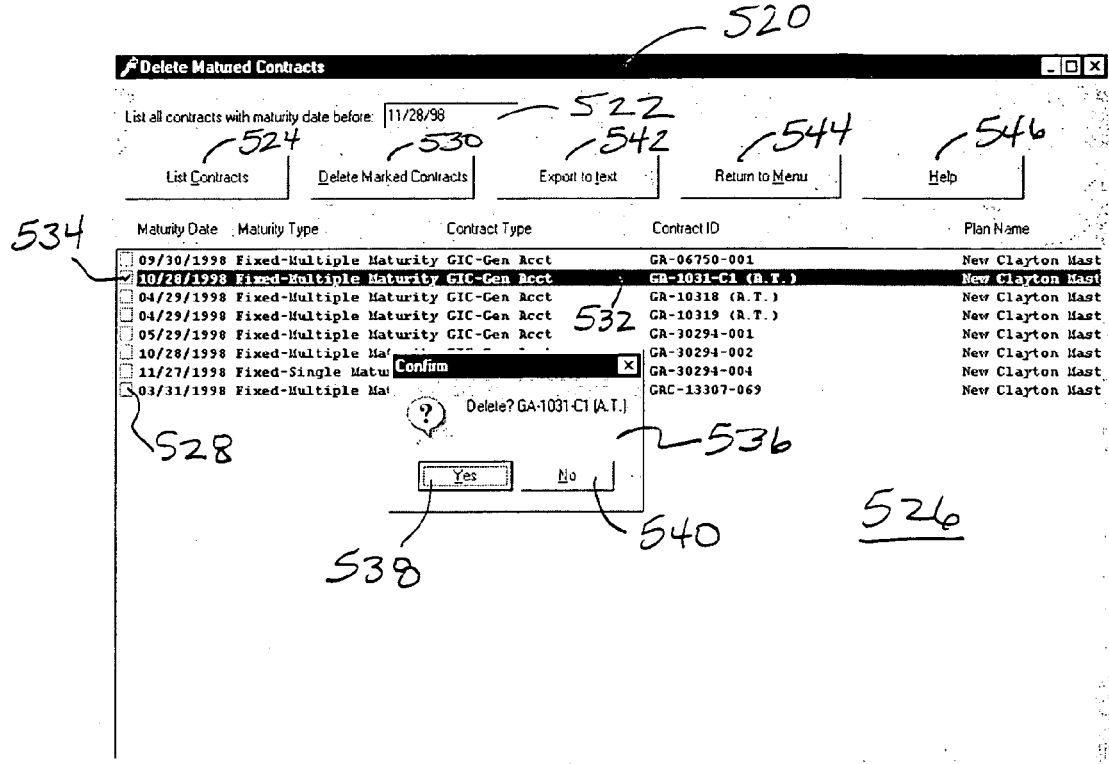
FIG. 32 illustrates an exemplary user interface screen from which matured contracts may be deleted in accordance with one embodiment of the invention.

The second tier menu item "Delete Matured Contracts" is used to delete matured contracts. Upon selection of the Delete Matured Contracts menu item, a delete matured contracts screen 520 is presented as shown in FIG. 32. The user enters a date into the maturity date field 522, and selects the "List Contracts" button 524, which in response lists all contracts having a maturity date prior to the date entered into the maturity date field 522. This is determined through a comparison of the date entered in the maturity date field 522 and the "current as of date" field 182 from the plan information screen 170 (see FIG. 10). All contracts that have a date in field 182 in the plan information screen 170 of FIG. 10 that is prior to the date entered into the maturity date field 522 of FIG. 32 are listed in the matured contracts data field 526. Associated with each of the listed contracts in the matured contracts data field 526 is a selection box, such as selection box 528. A particular contract can be designated for deletion by selecting or "marking" its corresponding selection box (e.g., by clicking on the selection box). Any number of the listed contracts in the matured contracts data field 526 may be selected for deletion. When the contracts to be deleted have been appropriately marked via their respective selection boxes, the Delete Marked Contracts button 530 is selected, thereby causing the marked contracts to be deleted.

FIG. 32 illustrates an instance where one of the contracts has been selected for deletion. In this example, the contract 532 is highlighted and its respective selection box 534 has been marked with a "checkmark." When the Delete Marked Contracts button 530 is activated (i.e., by clicking on it), a delete contracts confirmation screen 536 is provided, which allows the user the option of deleting the designated contract 532 by selecting the Yes button 538, or retaining the contract if it was inadvertently or erroneously marked for deletion by selecting the No button 540.

Activation of the Export to Text button 542 associated with the delete matured contracts screen 520 allows users to copy the information on the screen to a predetermined text file (e.g., "contract.txt") for storage in the system data directory. The user can open this file in a program (e.g., Microsoft® Excel) to view the contracts that appeared on the screen. This allows the user to view the information and decide what contracts they wish to delete in an easy to read format. The Return to Menu button 544 and Help button 546 are analogous to those previously described.

Figure 33:
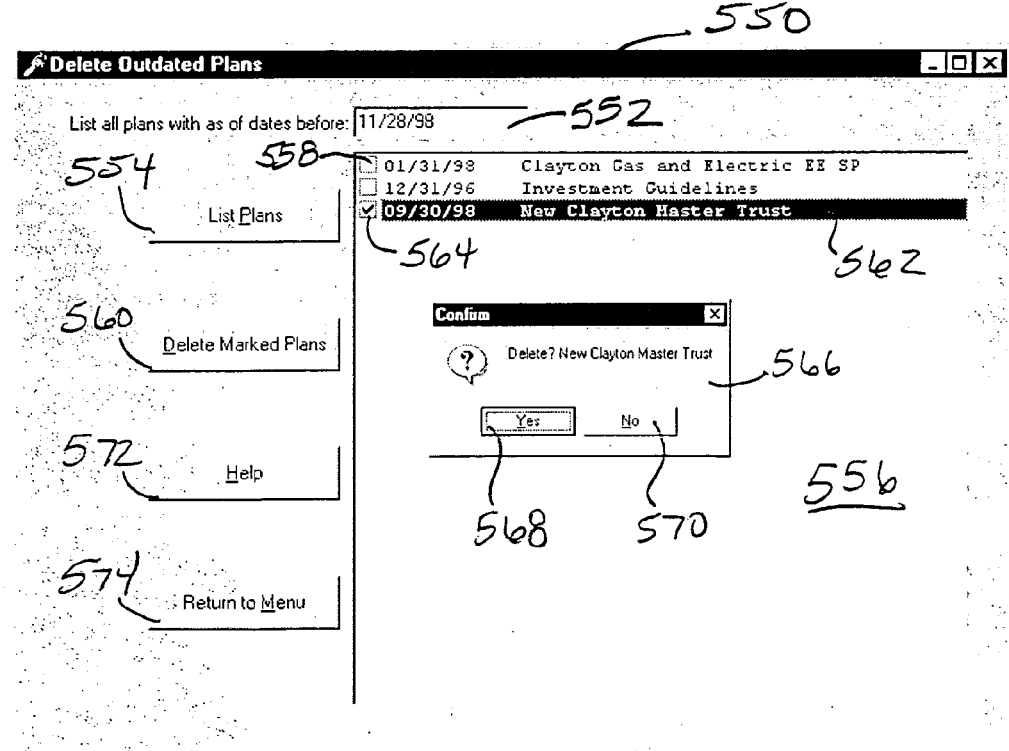
FIG. 33 illustrates an exemplary user interface screen from which outdated plans may be deleted in accordance with one embodiment of the invention.

A second tier menu item referred to as "Delete Outdated Plans" shown in FIG. 31 is used to delete outdated plans. Upon selection of the Delete Outdated Plans menu item, a delete outdated plan screen 550 is presented as shown in FIG. 33. The user enters a date into the plan date field 552, and selects the "List Plans" button 554, which in response lists all plans having an associated date prior to the date entered into the plan date field 552. This is determined through a comparison of the date entered in the plan date field 552 and the "current as of date" field 182 from the plan information screen 170 (see FIG. 10). All plans that have a date in field 182 in the plan information screen 170 of FIG. 10 that is prior to the date entered into the plan date field 552 of FIG. 33 are listed in the plan data field 556. Associated with each of the listed plans in the plan data field 556 is a selection box, such as selection box 558. A particular plan can be designated for deletion by selecting or "marking" its corresponding selection box (e.g., by clicking on the selection box). Any number of the listed plans in the plan data field 556 may be selected for deletion. When the plans to be deleted have been appropriately marked via their respective selection boxes, the Delete Marked Plans button 560 is selected, thereby causing the marked plans to be deleted.

FIG. 33 illustrates an instance where one of the plans has been selected for deletion. In this example, the plan 562 is highlighted and its respective selection box 564 has been marked with a "checkmark." When the Delete Marked Plans button 560 is activated (i.e., by clicking on it), a delete plans confirmation screen 566 is provided, which allows the user the option of deleting the designated plan 562 by selecting the Yes button 568, or retaining the plan if it was inadvertently or erroneously marked for deletion by selecting the No button 570. The Help button 572 and the Return to Menu button 574 are analogous to those previously described.

Figure 34:
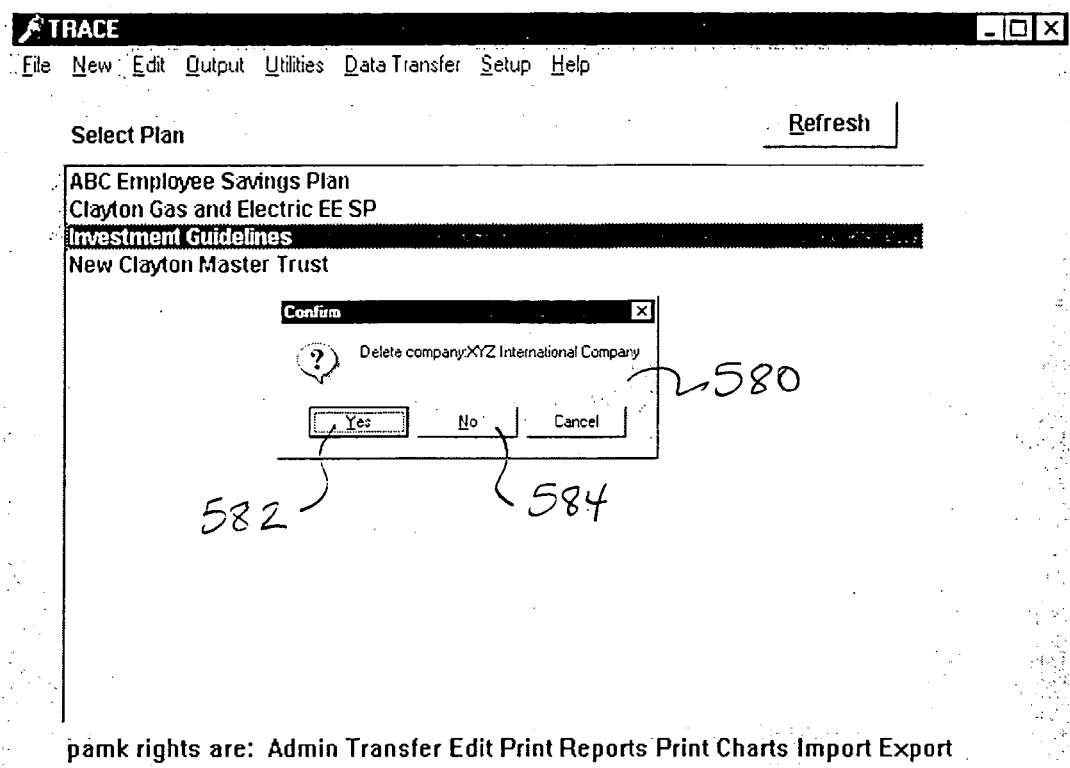
FIG. 34 illustrates an exemplary user interface screen providing a confirmation option for deleting one or more of the plans identified for deletion in accordance with one embodiment of the invention.

The second tier menu item "Delete Unused Companies" shown in FIG. 31 is used to delete companies no longer associated with any plan. In one embodiment, a company can be deleted only after all of its corresponding plans, contracts, cash flows and investment options have been deleted. When the Delete Unused Companies menu item is selected from the second tier menu items in FIG. 31, a company no longer associated with any plan is identified by the system, and a delete company confirmation screen 580 is presented with the name of the identified company as shown in FIG. 34. The delete company confirmation screen 580 allows the user the option of deleting the identified company by selecting the Yes button 582, or retaining the plan by selecting the No button 584. If additional companies which are no longer associated with any plan exist, they will be presented on a subsequently presented delete company confirmation screen 580 with the name of the next company identified as no longer being associated with a plan. In this manner, the user is allowed to scroll through each of the "unused" companies, and make a decision whether or not to delete the currently displayed company from the database.

Managers are provided with software enabling use of the system of the present invention. However, managers typically store information for record keeping and tracking for many plans relating to various funds, of which stable value funds may be only a portion. The stored information relates to all information on individual participants in all of the various funds and plans available, and on the funds and plans themselves. So managers may perform record keeping and other functions at a participant level as well as custodian/trustee functions at the plan level on all of the various people and plans in their main system. Certain plans and funds, such as those relating to the stable value portion of the manager's business, may only represent a portion of the entire business, and therefore only a subset of the information stored in their main system is relevant to the bidding process relating to the system of the present invention.

The problem is that the segment of the manager's business that does pertain to a subset of their business, such as stable value funds, needs to have access to the subset of data relating to that business segment. The data must be extracted from the manager's entire set of data so that the proper information can be provided to issuers in order to allow issuers to submit bids. Traditionally, managers were forced to move specific data from the entire set of data into spreadsheets, manipulate the data as desired, and generate printed copies of the information required for issuers for underwriting. The import tool of the present invention provides a manner for automatically importing all of the requisite data from a manager's main system into the system of the present invention, which conveniently allows data mapping between the manager's main system and the system of the present invention. Once mapped from the main system to the system of the present invention, the data, in the appropriate format, can be electronically transferred (e.g., via FTP) to the designated issuers.

The export utility of the present invention provides similar benefits. For example, managers can use the export tool where specific reports on certain data is desired. For example, if the manager wanted to determine the cashflows on all stable value plans, certain information can be exported into other applications for custom data manipulation, analyzation and reporting. Another example might be where a manager wanted to determine the total value of all contracts with one particular issuer. Managers can also enter new plan information in the database system of the invention, and export the information so that it can be pulled into their main database system.

The issuer is also benefited by the export tool of the present invention. Issuers can export data into their pricing models, to perform risk assessment, and the like. The export tool allows issuers to export information from the database system of the present invention, and perform a custom analysis that assists in the performing risk assessment and developing pricing models.

The import and export utilities are described more fully below.

Utilities: Import Utility

Figure 35:
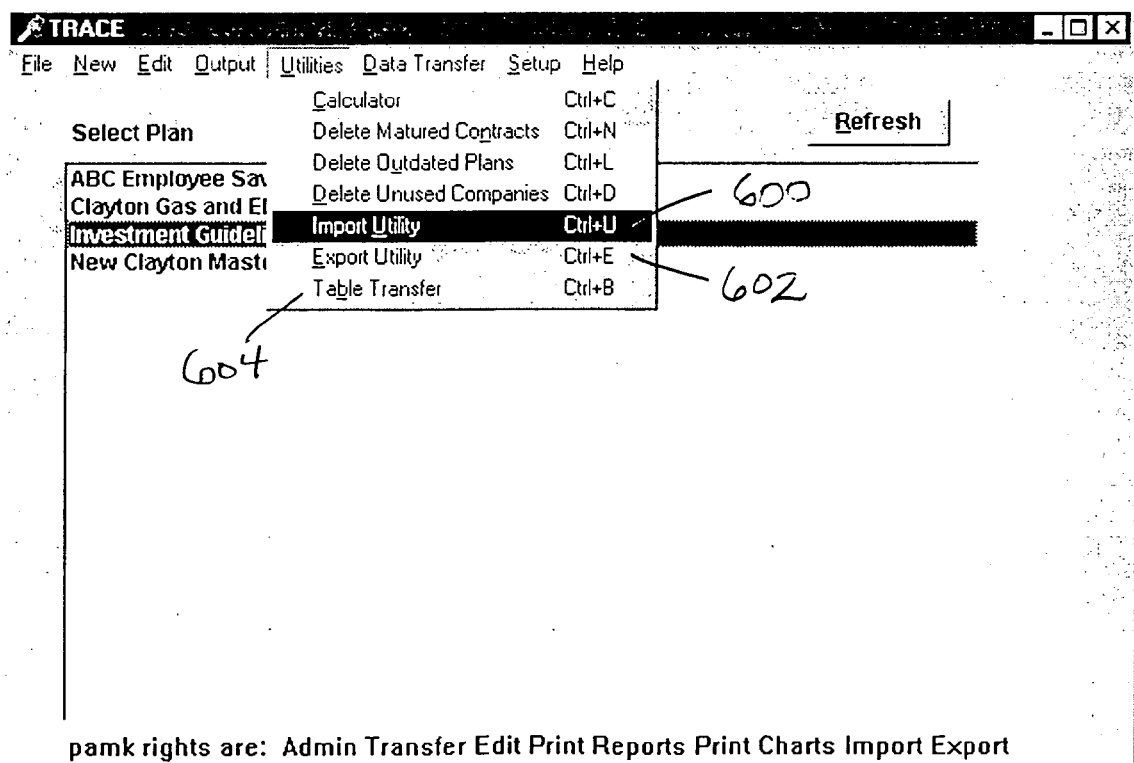
FIG. 35 illustrates an exemplary user interface screen from which an import utility may be initiated in accordance with one embodiment of the invention.

The second tier menu item labeled "Import Utility" 600 shown in FIG. 35 can be selected to activate an import utility, giving users the ability to easily map and import data into the system from a wide array of electronic formats. In one embodiment of the invention, there are five major user input screens associated with the import function, which the user progresses through during the import process, including the import specifications, view import text, import data checked, update table and view final data screens. Selection of the Import Utility menu item 600 produces the first import user interface, shown in FIG. 36 as the Import Specifications screen 610.

The import specifications screen 610 allows the user to define the import by either creating a new import specification or loading an existing specification. An import specification links the import field 612 of the import table 614 to the system table 616 for consistent import of data. The user can define the import once and save the specification to use for future imports which eases the process of importing.

An import specification file stores predetermined information, including characteristics of the import file, location of the import file, import file fields, system field names pairings, and the table that the data is being imported into. The import system saves specification files in a predetermined default directory, unless otherwise directed. In one embodiment, all import specification files have a common filename extension (e.g., *.ini).

Figure 37:
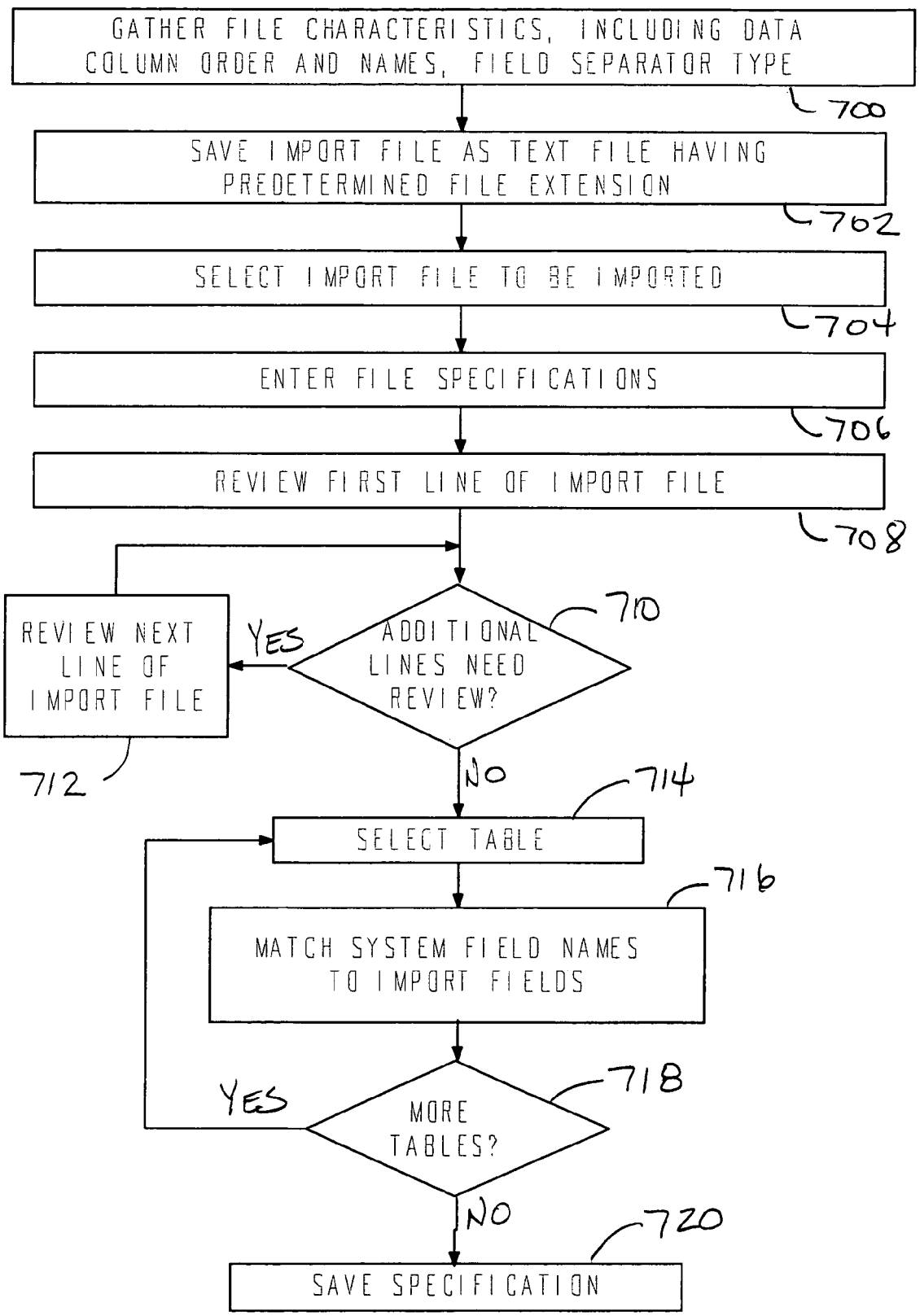
FIG. 37 is a flow diagram illustrating one embodiment of the creation of a new import specification.

FIG. 37 is a flow diagram illustrating one embodiment of the creation of a new import specification. File characteristics are first gathered as illustrated at operation 700. In one embodiment, ASCII text files are available for import. The user determines the order of the data columns, the type of field separator that was used to create the ASCII text file, and the names of the data columns. The text file is then saved 702 as the import file, preferably in a manner such that all such import text files have a common extension (e.g., *.txt). Files to be imported are more easily located when saved with such a common extension.

Figure 36:
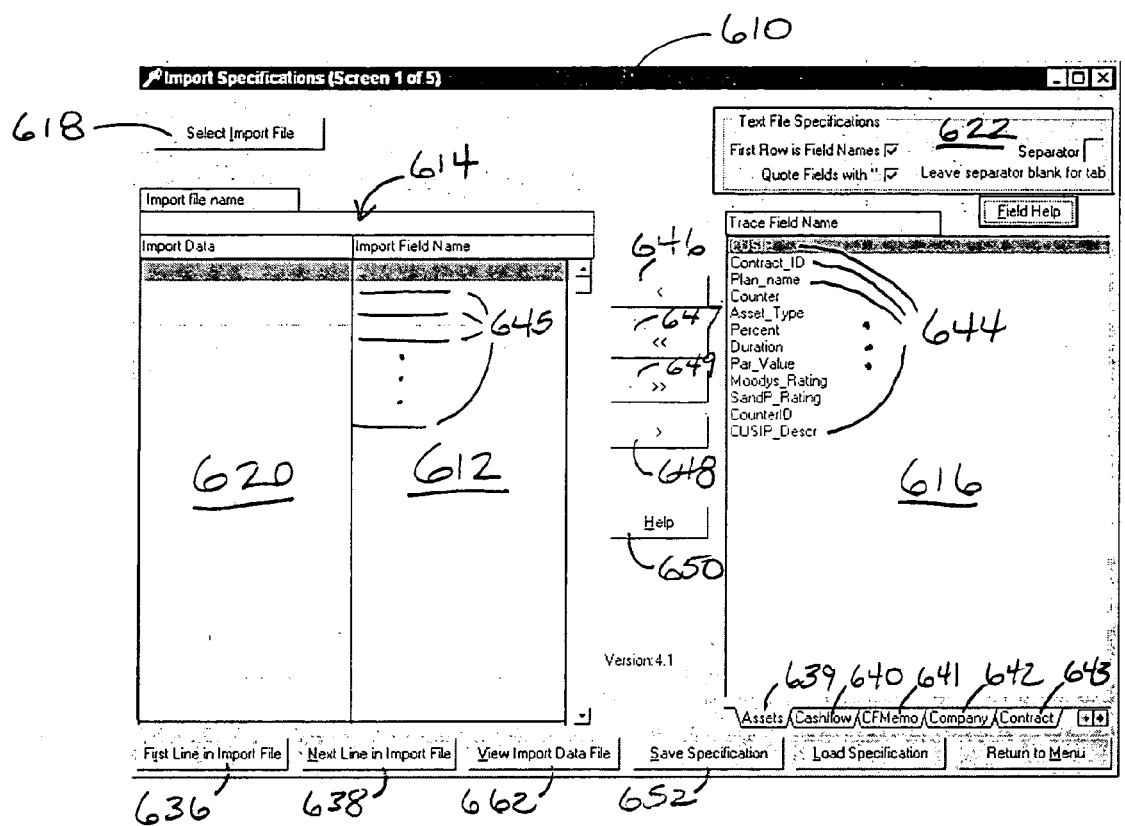
FIG. 36 illustrates an exemplary user interface screen from which the user can define the import characteristics to effect an import function in accordance with one embodiment of the invention.

Referring to both FIGS. 36 and 37, the next operation involves selecting an import file to be imported as seen at operation 704. In one embodiment, this is accomplished by clicking on the Select Import File button 618 on the import specifications screen 610 of FIG. 36. When the Select Import File button 618 is selected, a "Save As" dialog box will appear, and in one embodiment will display all files of a predetermined file type(s) (e.g., *.txt) which are saved in a predetermined import file directory. Alternatively, the appropriate import file may be located by browsing through the directory tree. The import file in which importing is desired is selected. The first row of data in the import file will be displayed in the "Import Data" column 620 on the left side of the import table 614.

Figure 38:
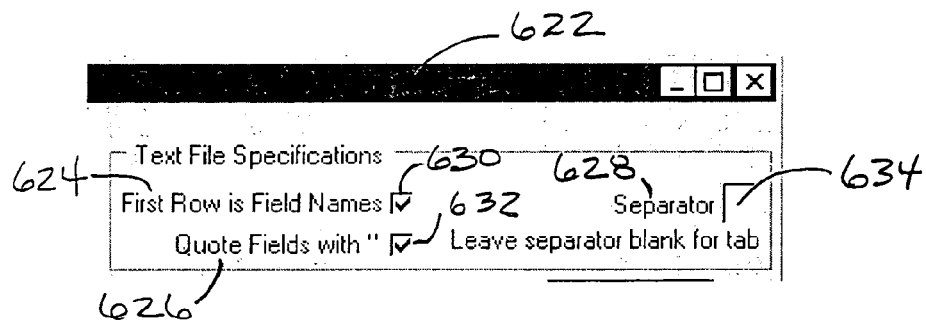
FIG. 38 illustrates an exemplary user interface screen from which file specifications for the data import may be entered in accordance with one embodiment of the invention.

The file specifications are then entered as depicted at operation 706 of FIG. 37. File specifications identify certain characteristics of the import file, such as whether the first row of the import file includes a field name, whether the text strings in the import file are delimited with quotation marks, and what character separates the data in the import file. File specifications are entered on the import specifications screen 610 at the text file specifications box 622 shown in FIG. 36, and are shown more clearly in FIG. 38. Referring to FIG. 38, the text file specifications box 622 includes three selection fields, shown as First Row is Field Names field 624, Quote Fields with " field 626 and the separator field 628. For the First Row is Field Names field 624, the box 630 is checked if the first row of the import file consists of field names—otherwise it is not selected (i.e., left "unchecked"). The Quote Fields with " field 626 is checked in box 632 if the text strings in the import file is delimited with quotation marks, and is otherwise not checked. A separator character is entered into the separator box 634 of the Separator field 628 depending on what character in the import file is used to separate the data (e.g., tabs, commas, semicolons, etc.).

After the file specifications have been entered, the first line of the import file is reviewed as shown at operation 708 of FIG. 37. By reviewing the first line of the import file, the settings in the text file specifications box 622 can be confirmed as correct. Review of the first line of the import file can be accomplished by selecting the First Line in Import File button 636 shown in FIG. 36, which presents a text box showing the first line of text (not shown). If additional lines of the import file need to be reviewed to confirm correct text file specifications as determined at decision operation 710 of FIG. 37, the next line of the import file is reviewed 712, and the process continues until no more lines of the import file need to be reviewed as determined at decision operation 710. Additional lines of the import file may be reviewed by selecting the Next Line in Import File button 638 shown in FIG. 36.

When the text file specifications have been verified, a table is selected for importing at operation 714. This is accomplished via the import specifications screen 610 using the tabs at the bottom of the system table 616 of the import specifications screen 610. In the illustrated embodiment, five selectable table choices are provided, including the Assets tab 639, Cashflow tab 640, CFMemo tab 641, Company tab 642 and Contract tab 643.

For each tab, the system field names 644 of the system table 616 are matched to import data using the import field 612 as shown at operation 716. The system field names in the system table 616 of FIG. 36 are asset names corresponding to the Assets tab 639. The system field names 644 are matched with the appropriate import data by selecting one or more system field names from system field 616, and positioning them in the proper order in the import field 612 to map the import data in import data field 620 to the appropriate system field name 645. This is accomplished by moving system field names 644 from the system table 616 list to the import field names 645 of the import field 612. The single arrow button 646 is selected to move a highlighted system field name 644 from the system table 616 to an import field name 645 in the import field 612. The double arrow button 647 is selected to move all of the system field names 644 from the system table 616 to the import field 612 at one time. Similarly, the single arrow button 648 and the double arrow button 649 can be used to remove items from the import field 612 by moving them back to the system table 616. The Field Help button 650 can be selected when matching fields, as it displays a grid containing the system field name and the system screen label. This can be used to clarify any questions when mapping field names of the import file to corresponding system field names.

A similar process is performed for each of the tabs 639, 640, 641, 642, 643 associated with the system table 616, as shown by decision operation 718 of FIG. 37, where it is determined whether or not more tables exist. For example, if the Assets tab 639 is selected and the system field names 644 are matched to the import data via import field names 645, then the Cashflow table, CFMemo table, Company table and Contract tables associated with tabs 640, 641, 642 and 643 still need to be matched. Where more tables need to be matched as determined at operation 718, another table is selected 714 and matched 716 until no more tables require matching as determined at operation 718.

Where no more tables need to be matched, the specification is saved 720, which can be accomplished on the import specification screen 610 via the Save Specification button 652. This saves the specification for use in future imports. In one embodiment, the specification will include the system table in which the information is being imported into, the import file field separator, an indication of whether the import file contains quotes, an indication of whether the first row of the import file is a field name, the complete path and filename of the import file, and the system fields used in the import and location of the file with respect to the import file.

Figures 39, 40:
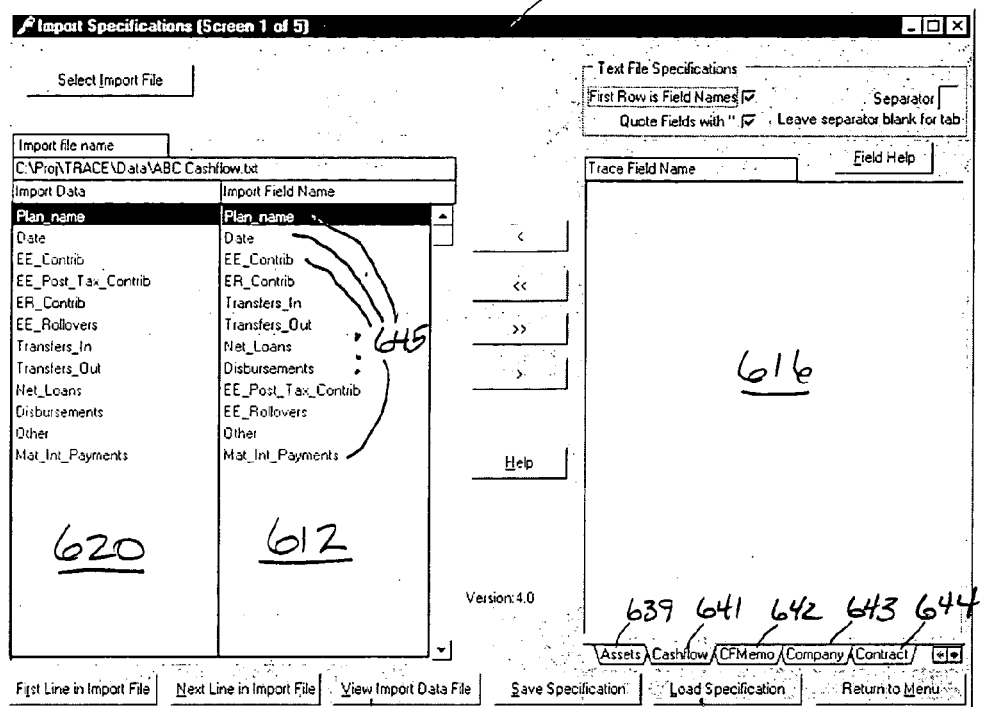
FIG. 39 illustrates an example of how the system field names of the system table are mapped to import data using import field names of the import field in accordance with one embodiment of the invention.
FIG. 40 illustrates an exemplary user interface screen from with the import text may be viewed in accordance with one embodiment of the invention.

FIG. 39 illustrates an example of how the system field names 644 of the system table 616 are mapped to import data using import field names 645 of the import field 612. In this example, the system field names in the system table 616 associated with the Cashflow tab 640 have been mapped into the import field 612 to correspond to the import data in the import data field 620. The import data associated with the import data headings in the import data field 620 will then be associated with the import field names 645 identified in the import field 612, and thus will be associated with the corresponding system field names.

The Load Specification button 660 on the import specifications screen 610 allows previously saved file specifications to be used at any time to ensure consistent import or export of data. Activation of this button 660 initiates a search of a predefined directory(ies) for file specifications having a predetermined one or more file extensions (e.g., *.ini). The Load Specifications button 660 also provides an option to browse other directories outside of the predefined directory (ies) to locate a saved file specification.

After the specifications have been mapped and verified, the View Import Data File button 662 can be selected to continue with the import process. Selection of the View Import Data File button 662 brings the user to a second import user interface, shown in FIG. 40 as the View Import Text screen 750. As can be seen, the import field names from the import field 612 of FIG. 39 are listed in row 752 of the View Import Text screen 750 in FIG. 40. The imported data is then listed in its appropriate column.

The user views the import file on the View Import Text screen 750 in a spreadsheet-like format, and the system validates the data in the import file. In order to check for field format inconsistencies, the Check Data button 754 is selected. This causes the import file to be compared against the import field 612. If the system detects an invalid data element, the system displays an error message and places the cursor in the cell containing the invalid data. Users are allowed to edit the import data via the View Import Text screen 750, although the data in the original import file will not be modified. If the original file contains duplicate records, a key violation will occur, and the user will be required to exit the import program and delete the duplicate record in the original import file.

Figure 41:
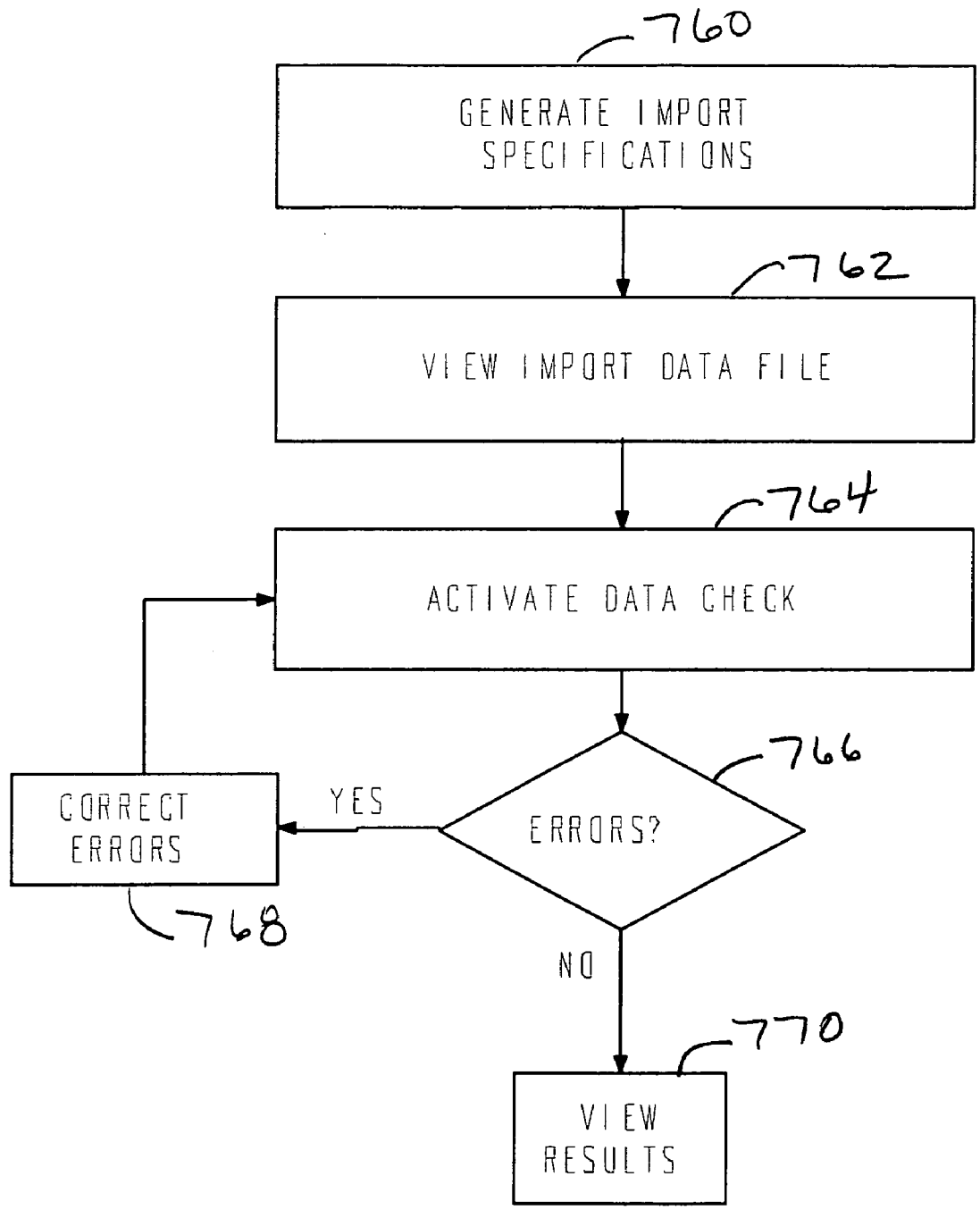
FIG. 41 is a flow diagram illustrating one manner in which the import is processed in accordance with one embodiment of the invention.

FIG. 41 is a flow diagram illustrating one manner in which the import is processed. The import specifications are generated 760, as described in connection with FIGS. 36 and 37. The import data file is viewed 762. In one embodiment this is performed by selecting the View Import Data File button 662 shown in FIGS. 36 and 39. A data check function is activated as indicated at operation 764, which, in one embodiment, is accomplished by selecting the Check Data button 754 on the View Import Text screen 750 shown in FIG. 40. Activation of the Check Data button 754 verifies that the import file information is in the correct import table format. If an error is discovered at decision operation 766, the errors are corrected 768, and the data check is again activated 764. This occurs until no more errors need correction, at which time the results can be viewed 770.

When errors have been corrected, an Import Data Checked screen 800 is displayed as shown in FIG. 42. The system field names (now identified as import field names) in the table are displayed in row 802 along with the data from the import file in its respective column. Fields that are not included in the import file appear blank. Data is displayed in the order of the import field names 645 of FIG. 39. The Previous Screen button 804 moves back to the previous screen, thereby canceling the import and allowing the user to either cancel the import completely or make modifications to the data before importing. The Field Help button 806 and Help button 808 operate analogously to those previously described. The "Landscape report of proposed import" button 810 allows the user to view the data in landscape mode, while the "Portrait report of proposed import" button 812 allows the user to view the data in portrait mode. In either case, the Update Table screen 820 shown in FIG. 43 is presented.

The import report is shown in preview mode on the Update Table screen 820 of FIG. 43. The first column 822 of the report indicates the action that will be taken with the import data, and in one embodiment, will indicate the action to be a "replace" action or an "add" action. The user may choose to print the import log by selecting the Print Log button 824, and may save the log to a file by selecting the Create Import Log button 826. The Field Help button 828 and the Help button 830 operate analogously to those previously described.

In one embodiment, the Update Table screen 820 is the last screen in which the user can cancel the import—if the import is not canceled on this screen, the system database table will be updated. To cancel the import, the Previous Screen button 834 is selected. To complete the import process, the Update Actual Data button 832 is selected. The Update Actual Data button 832 updates the import information into the system data table, and allows the user to view the entire contents of the table. Once the Update Actual Data button 832 is selected, the View Final Table screen 840 shown in FIG. 44 is presented. If any part of the import record exists in the system database table, then the action taken will be "replaced." If the import record is new and did not exist in the system database tables, the action taken will be "added."

The entire contents of the updated system table are displayed on the View Final Table screen 840 of FIG. 44. The import process is complete at this point, and the user can exit the system if desired. In one embodiment, a Verify Database button 842 is provided, which, upon its selection, validates the information in the tables. If there are errors in the database, a report will be displayed to the user, and the user may print the report to assist in the correction of the errors. If no errors were discovered in the database, a message will be displayed indicating that no database errors were found.

The verify database feature activated by the Verify Database button 842 may be run periodically to find errors in the database. This feature may also be run before building and sending any files. Examples of errors that may occur are when plans are not deleted correctly, by user data entry errors or by importing incorrect plan names.

The Previous Screen button 844 on the View Final Table screen 840 returns the user to the Update Table screen 820 shown in FIG. 43. However, selection of the Previous Screen button 844 does not cancel the import in this case. The Field Help button 846 and the Help button 848 operate analogously to those previously described. For example, the Field Help button 846 can be selected to display information to clarify any questions regarding the mapping of field names of the import file to corresponding system field names. Finally, the Exit Import System button 850 closes the import system program.

Figure 45:
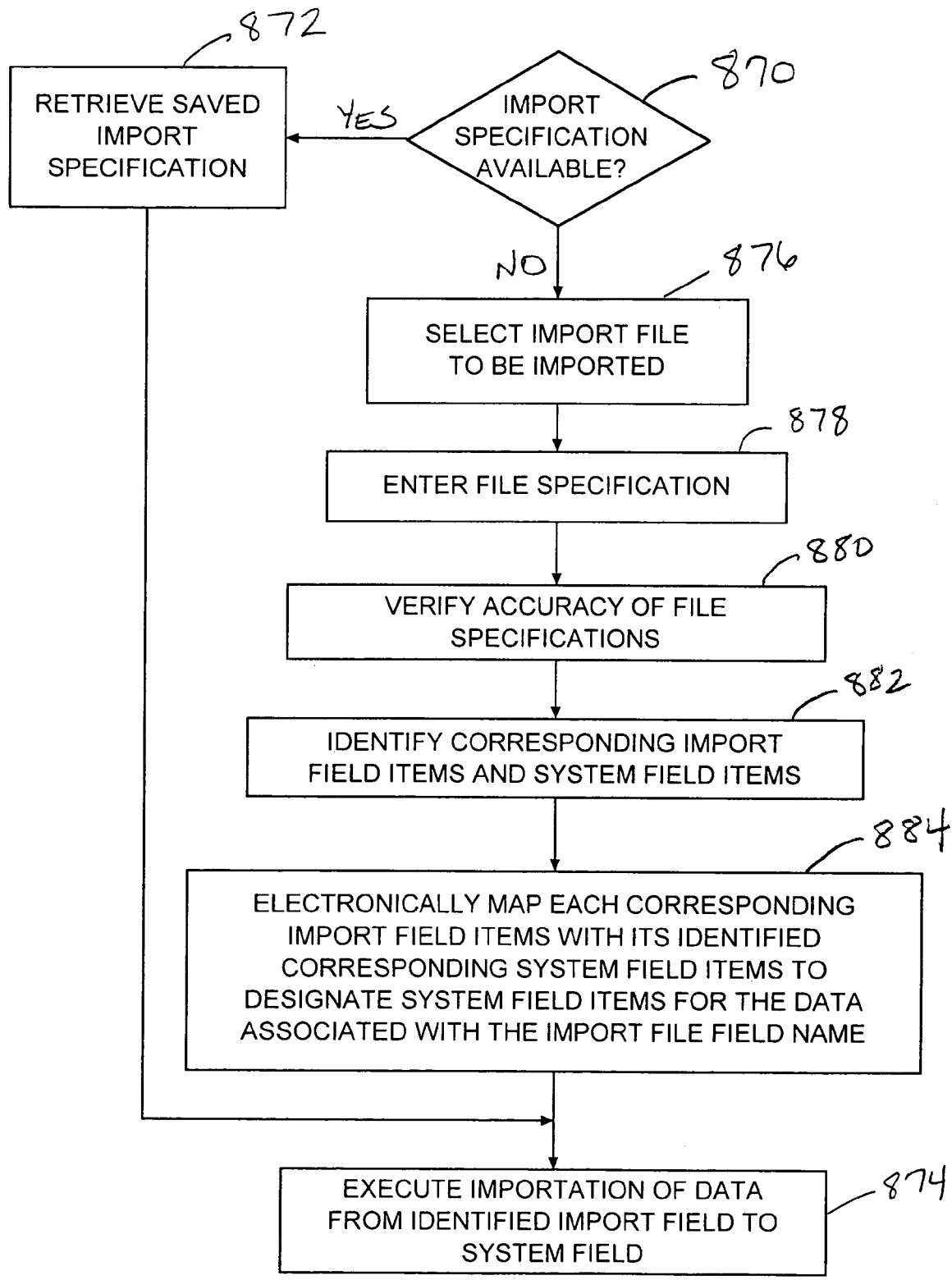
FIG. 45 is a flow diagram of one embodiment of the mapping of an external import file to system field names to bring the external file into the system.

The import function is thus designed to allow fields of an external import file to be mapped to system field names, to essentially bring the external file into the system. This is generally illustrated in the flow diagram of FIG. 45. If an import specification is already available as determined at decision operation 870, the saved import specification is retrieved 872, and the data importation from the identified import field to the system field can be executed 874. If no import specification is available, an import specification can be created. An import file to be imported is selected 876, and a file specification is entered 878 as previously described. The accuracy of the file specifications can be verified 880, as also was previously described. Corresponding import field items and system field items are identified 882, which can be accomplished by determining which of the system field names represents the category of data associated with a particular import field name. Each corresponding import field item is then electronically mapped 884 with its identified corresponding system field item to designate system field items for the data associated with the import file field name. This is performed to allow system field names to be designated for import field names of a pre-existing import file, thereby allowing data from virtually any file to be "mapped" into the predefined categories of the system. This facilitates commonality and consistency in data transfers, and provides for complete and accurate aggregate statistical analyses.

Utilities: Export Utility

The second tier menu item labeled "Export Utility" 602 shown in FIG. 35 can be selected to activate an export utility. The export utility gives users the ability to systematically draw data from the system to perform further analysis in software such as spreadsheets or databases, or for importing into customized risk models or other business models. Therefore, files can be exported from the system to other applications or formats.

In one embodiment of the invention, there is a primary user input screen associated with the export function. Selection of the Export Utility menu item 602 in FIG. 35 produces this export user interface, shown in FIG. 46 as the Export screen 900.

The Export screen 900 allows the user to define the export by either creating a new export specification or loading an existing specification. The user can define the export once and save the specification to use for future exports which eases the process of exporting.

An export specification file stores predetermined information necessary to ensure consistent export of data, including characteristics of the export file, location of the export file, export file fields, and the file name that the data is being exported into. The export system saves specification files in a predetermined default directory, unless otherwise directed. In one embodiment, all export specification files have a common filename extension (e.g., *.ini).

Figure 47:
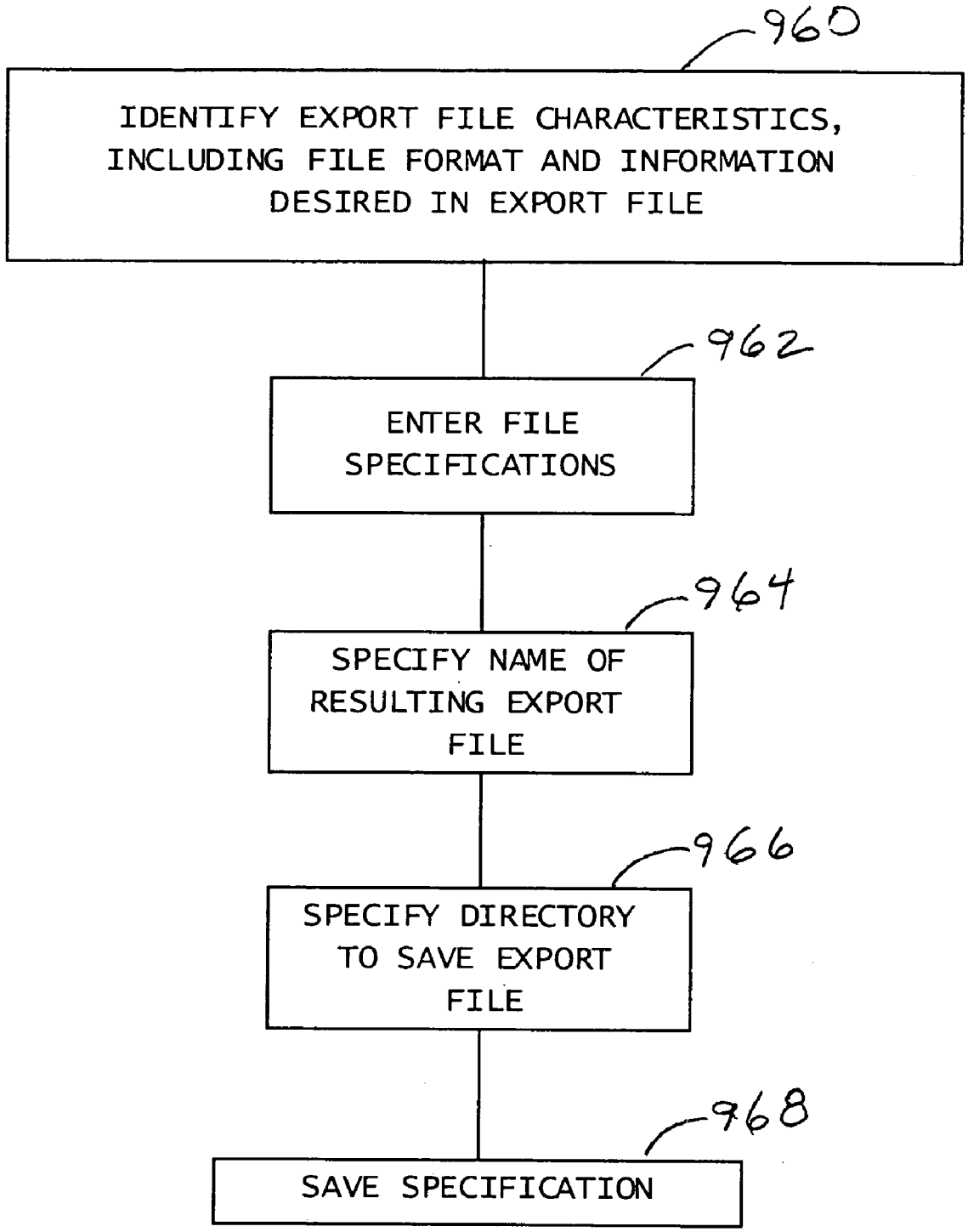
FIG. 47 is a flow diagram illustrating one embodiment of the creation of a new export specification.

FIG. 47 is a flow diagram illustrating one embodiment of the creation of a new export specification. File characteristics are first gathered as illustrated at operation 960. These file characteristics include information regarding the type of information that is desired for export, and the desired file format. The file specifications are then entered as seen at operation 962.

Text file specifications identify certain characteristics of the export file, such as whether the first row of the export file is to be a field name, whether the text strings to be imported are to be delimited with quotation marks, and what character is to separate the data in the exported file. In one embodiment of the invention, text file specifications are entered using the Text File Specifications box 902 shown in FIG. 46. The Text File Specifications box 902 allows the user to determine the format of the file that will be exported.

Figure 46:
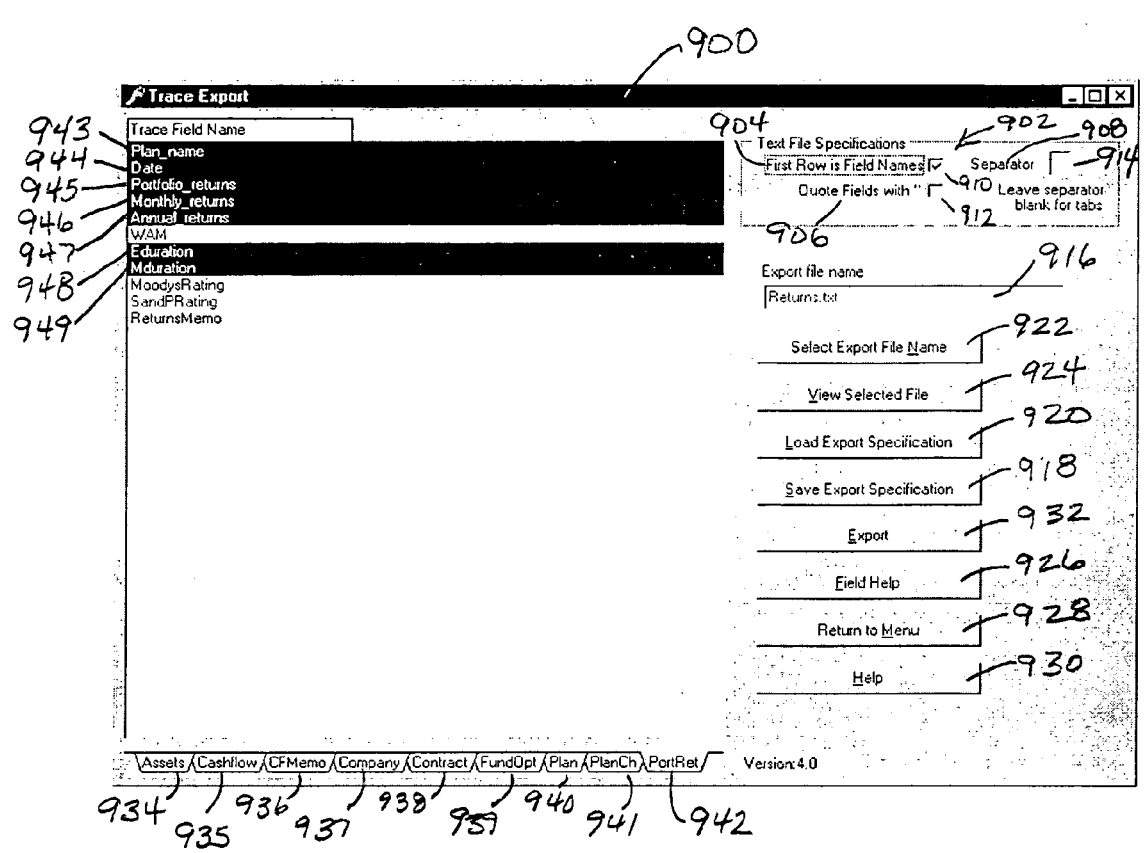
FIG. 46 illustrates an exemplary user interface screen from which the user can define the export characteristics to effect an export function in accordance with one embodiment of the invention.

In accordance with the embodiment illustrated in FIG. 46, the Text File Specifications box 902 includes three selection fields, shown as First Row is Field Names field 904, Quote Fields with " field 906 and the separator field 908. For the First Row is Field Names field 904, the box 910 is checked if the first row of the export file is to include field names—otherwise it is not selected (i.e., left "unchecked"). The Quote Fields with " field 906 is checked in box 912 if the text strings in the export file is to be delimited with quotation marks, and is otherwise not checked. A separator character is entered into the separator box 914 of the Separator field 908 depending on what character in the export file is to be used to separate the data (e.g., tabs, commas, semicolons, etc.).

After the file specifications have been entered, a name for the resulting export file is chosen, as seen at operation 964 of FIG. 47. In one embodiment, the export file name is entered in the export file name field 916 of FIG. 46. In one embodiment, the export file name is provided with a pre-defined file name extension, such as *.txt, to save the export file in a text format. Users may save the export file in a directory of their choice, as indicated at operation 966 of FIG. 47. In one embodiment, however, the export system saves the export file specification in a predetermined default directory. When all of this information has been entered, the export file specification may be saved at operation 968. Referring to FIG. 46, this is accomplished by selecting the Save Export Specification button 918.

Rather than creating a new export file specification, a previously saved export file specification may be used. In one embodiment, this is accomplished by selecting the Load Export Specification button 920 on the export screen 900 of FIG. 46. Selecting this button allows the user to browse through directories and files using a "file open" dialog box (not shown) to locate the export specification file that contains the desired export file settings. When this file is located, it is selected, and will be used in the export process.

Associated with the export screen 900 are a number of other function buttons. One button is the Select Export File Name button 922, which allows the user to overwrite existing export files, and also allows the user to change the save location. Selection of the View Selected File button 924 allows the user to view an existing export file and the information contained in the file. The file name and path that is viewed is located in the export file name field 916. In one embodiment, if the export file listed in the export file name field 916 does not exist and the View Selected File button 924 is selected, the user will receive a message that the file does not exist or that the file is empty. The Field Help button 926, Return to Menu button 928 and Help button 930 operate analogously to those previously described. The Export button 932 is described in further detail below.

The export function is designed to allow system field names to be mapped to the file fields of the export file. This is generally illustrated in the flow diagram of FIG. 48. A first category is selected as shown at operation 970. This category corresponds to a predetermined group of data. Referring to FIG. 46, the example export screen 900 includes nine such categories, identified by graphical tabs. These tabs are labeled Assets 934, Cashflow 935, CFMemo 936, Company 937, Contract 938, FundOpt 939, Plan 940, PlanCh 941 and PortRet 942. The example of FIG. 46 is shown with the PortRet 942 tab selected (i.e., highlighted).

Figure 48:
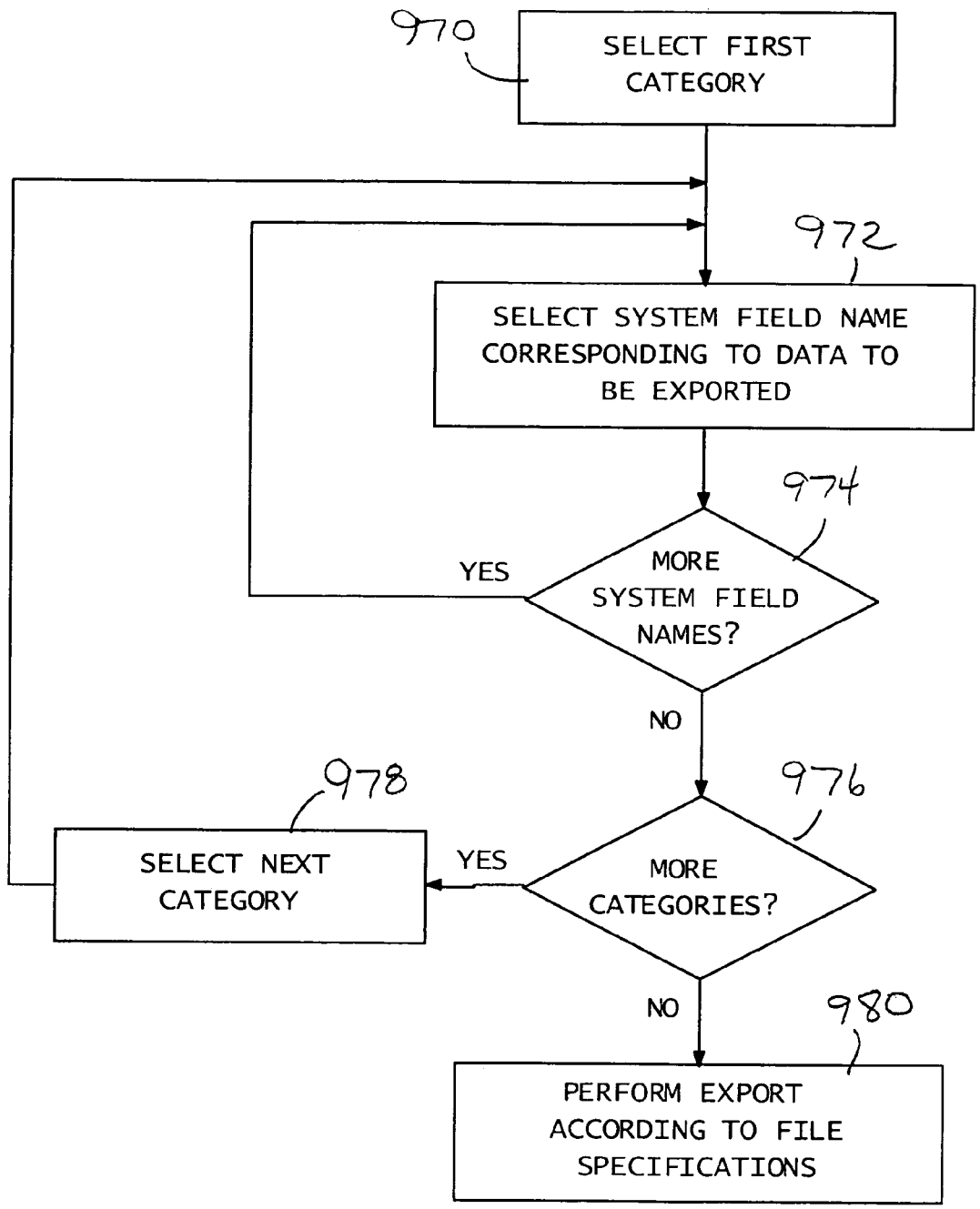
FIG. 48 is a flow diagram illustrating one embodiment for mapping the system field names to the file fields of the export file in accordance with one embodiment of the invention.

Referring to both FIGS. 46 and 48, a system field name is selected 972 that corresponds to data to be exported. Such system field name is shown in FIG. 46 as the Plan_name item 943. If there are more system field names desired as determined at decision operation 974, additional system field names are thus selected 972, such as the Date 944, Portfolio_returns 945, Monthly_returns 946, Annual_returns 947, Eduration 948 and Mduration 949 field names, all of which are shown as selected (highlighted).

When all of the system field names for a category are selected, it is determined 976 whether there are more categories in which data is to be exported. If so, the next category is selected 978, and the system field names associated with that category are selected in accordance with operations 972 and 974. In the example of FIG. 46, each of the categories labeled Assets 934, Cashflow 935, CFMemo 936, Company 937, Contract 938, FundOpt 939, Plan 940 and PlanCh 941 can be selected, so that associated system field names may be selected, and the corresponding data can be exported. When all system field names for all categories have been identified for export, the export is performed according to the previously-designated file specifications, as illustrated at operation 980. This may be accomplished by selecting the Export button 932 shown in FIG. 46.

Utilities: Table Transfer Utility

The second tier menu item labeled "Table Transfer" 604 shown in FIG. 35 can be selected to activate a table transfer utility. The table transfer utility gives users an efficient way to send their system data tables and associated indexes to a central database via e-mail. In one embodiment, the tables are compressed, encrypted, and split into multiple files if necessary to meet e-mail size restrictions.

Figure 49:
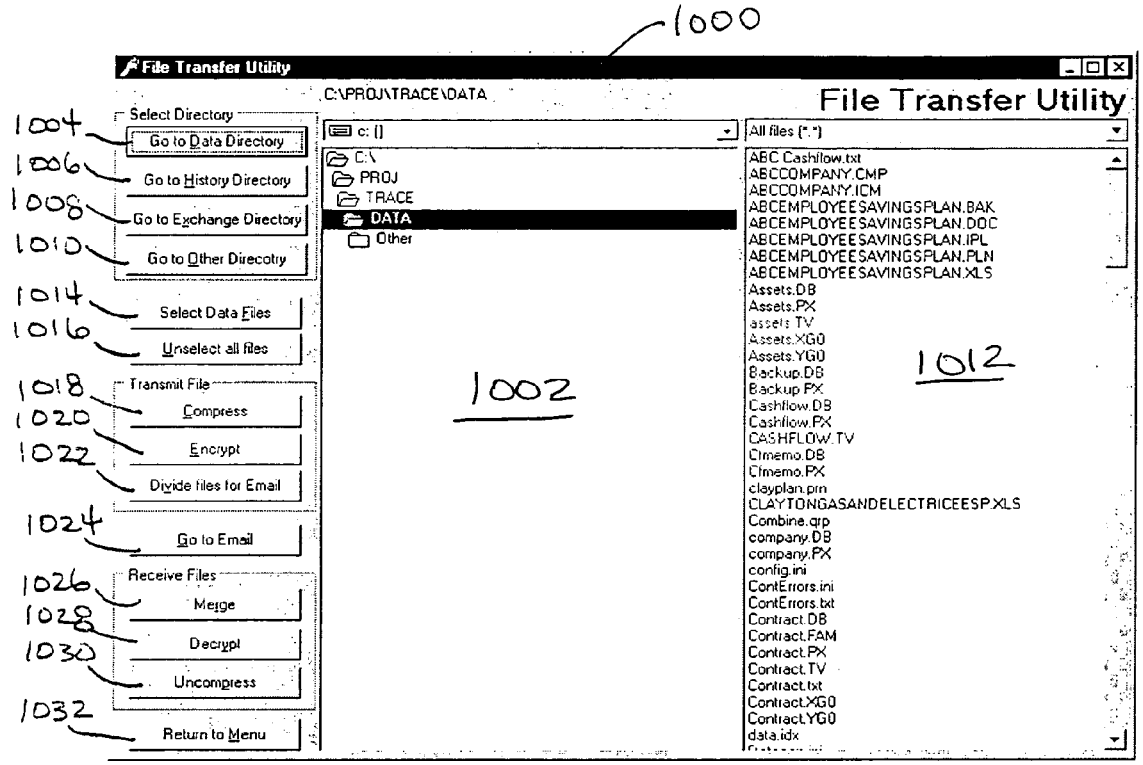
FIG. 49 illustrates an exemplary user interface screen to initiate a table transfer function that allows users to efficiently transmit their system data tables and associated index files to the central database in accordance with one embodiment of the invention.

Upon selecting the Table Transfer 604 menu item, the File Transfer Utility screen 1000 is provided as shown in FIG. 49. A directory tree is provided in the directory column 1002. Various data directories are available via the directory column 1002 which include data files associated with a user's system data tables. Directory selection buttons are provided, including the Go to Data Directory button 1004, Go to History Directory button 1006, Go to Exchange Directory button 1008 and Go to Other Directory button 1010. These buttons change the current directory in the directory column 1002 upon selection of the respective button. For example, selection of the Go to Data Directory button 1004 selects the path C:\PROJ\TRACE\DATA in the example of FIG. 49.

The file column 1012 lists the files resident in the selected directory. Selection of the Select Data Files button 1014 selects a predetermined set or subset of the files listed in the file column 1012. For example, selection of the Select Data Files button 1014 can select (e.g., highlight) all files in the file column 1012, or alternatively can select any predetermined subset, such as all files having a certain file extension. Alternatively, files can be individually selected by selecting (e.g., clicking on) specific files listed in the file column 1012. The Unselect all files button 1016 removes any file selection previously made.

Once files have been selected, the files may be compressed by selecting the Compress button 1018, and may be encrypted by selecting the Encrypt button 1020. Because of e-mail size limitations, it is often desirable to split the resulting compressed, encrypted file into multiple, smaller files prior to the file transfer. To accomplish this, the Divide files for E-mail button 1022 is selected, which provides a screen/window (not shown) allowing the user to select the size of each of the split portions of the file. Subsequent selection of the Go to Email button 1024 activates a resident e-mail application, thereby allowing the user to e-mail the file (or multiple split files) to the central database.

The table transfer function allows users to efficiently transmit their system data tables and associated index files to the central database, to ensure that the correct tables and all associated index files can be efficiently sent to the central database. Users may choose to transmit a file, multiple files, directories of files, etc. to the central database for a variety of reasons. Users who send data files to the central database can obtain assistance with an import, clean up data in the tables, and the like by obtaining assistance from support personnel having access to the central database. Further, where new releases of the programming code of the present system are released, tables may require restructuring, which can be accomplished by the support personnel. In these cases, a copy of the records in the their system tables are sent to the central database for assistance from the support personnel.

Files may be received by users in an analogous manner. The Merge button 1026 merges any split files so they can be decrypted through activation of the Decrypt button 1028 and uncompressed using the Uncompress button 1030. The Return to Menu button 1032 returns the user to the system main menu.

Data Transfer

The present invention includes an automated function that allows managers (i.e., buyers) to transmit plan information by issuer (i.e., seller) via a central repository (see central repository 20 of FIG. 1; central site 32 of FIG. 2). In one embodiment, the central repository serves in part as an FTP (file transfer protocol) site, which is a server with an address on the Internet that has been set up to use FTP to store and transfer files. It is an agreed-upon method for transferring files between managers/issuers and the central repository, whereby the managers and issuers can login to the central repository FTP site for the purposes of retrieving and/or sending files.

Figure 50:
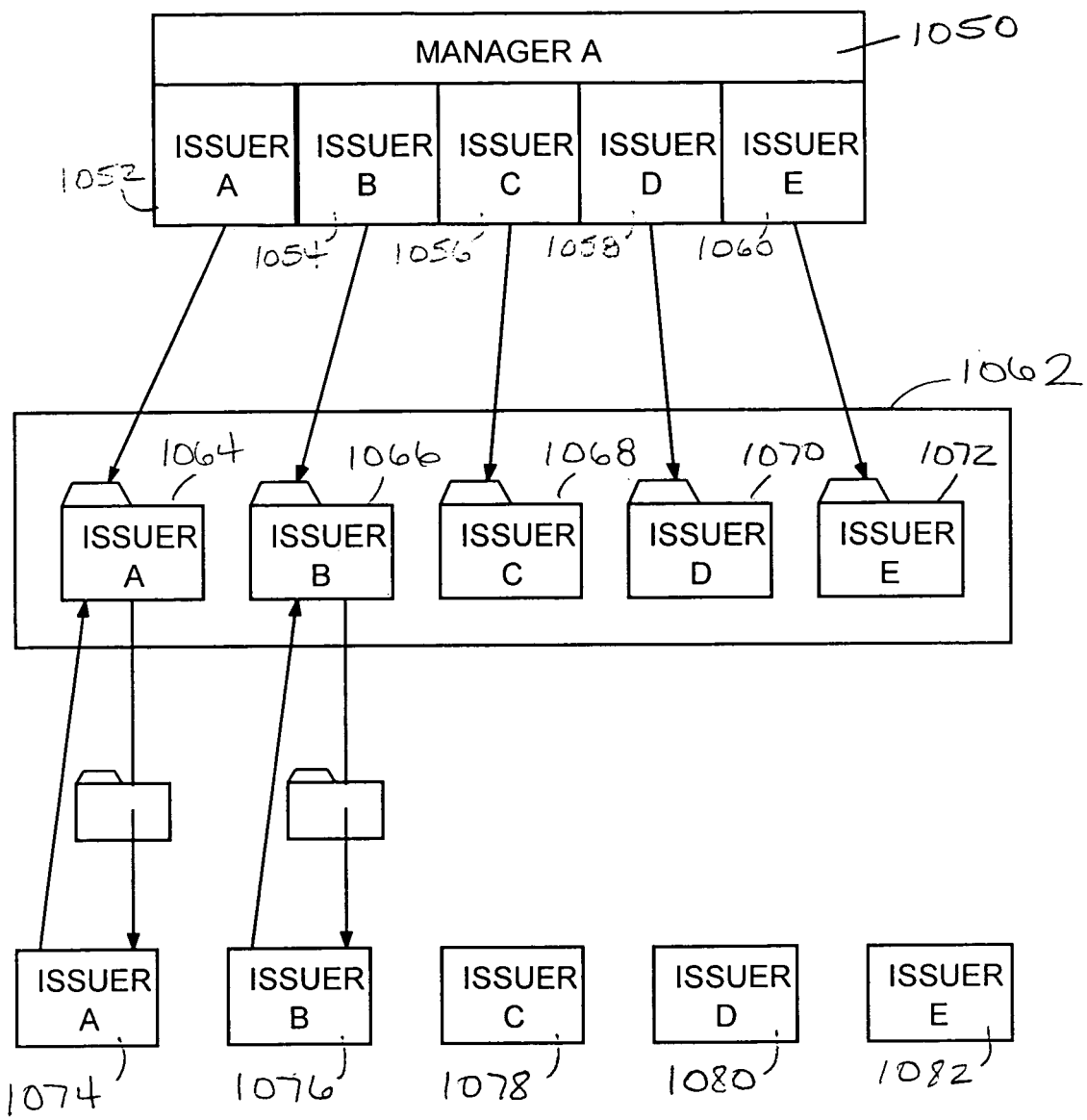
FIG. 50 is a block diagram illustrating one manner in which managers transfer plan information to issuers in accordance with one embodiment of the invention.

FIG. 50 is a block diagram illustrating one manner in which managers transfer plan information to issuers. A manager, labeled Manager A 1050 can transfer plan information to one or more of a plurality of identified issuers, labeled identified Issuer A 1052, identified Issuer B 1054, identified Issuer C 1056, identified Issuer D 1058, and identified Issuer E 1060. Managers can transmit the plan information to a central repository, such as FTP site 1062. In one embodiment, each file transferred is first encrypted and password-protected from unauthorized users.

At the FTP site 1062, transmitted files rest in a separate folder for each authorized user, such as the Issuer A Folder 1064, Issuer B Folder 1066, Issuer C Folder 1068, Issuer D Folder 1070, and Issuer E Folder 1072. Only issuers with authorized access will be able to download the plan information from their designated folder at the central repository. Each issuer, such as Issuer A 1074, Issuer B 1076, Issuer C 1078, Issuer D 1080, and Issuer E 1082, is provided with a unique access code that allows them to complete the data transmission process by uncompressing the decrypting the downloaded files. In this manner, managers determine for each plan which issuers are allowed to receive information for that plan. In the example of FIG. 50, issuers A 1074 and B 1076 have been targeted to receive information. In one embodiment, targeted issuers are designated via the plan screen 170 by selecting the issuers in the issuer list data field 262 associated with the Data Release tab 179 shown in FIG. 18. Issuers may be notified electronically when plan information is resident in their corresponding issuer folder, such as via e-mail or other electronic means. Alternatively, the issuers can monitor for information in their respective issuer folders. This system provides for the uniform collection, active monitoring, and systematic analysis of plan data by issuers.

Figures 51, 52:
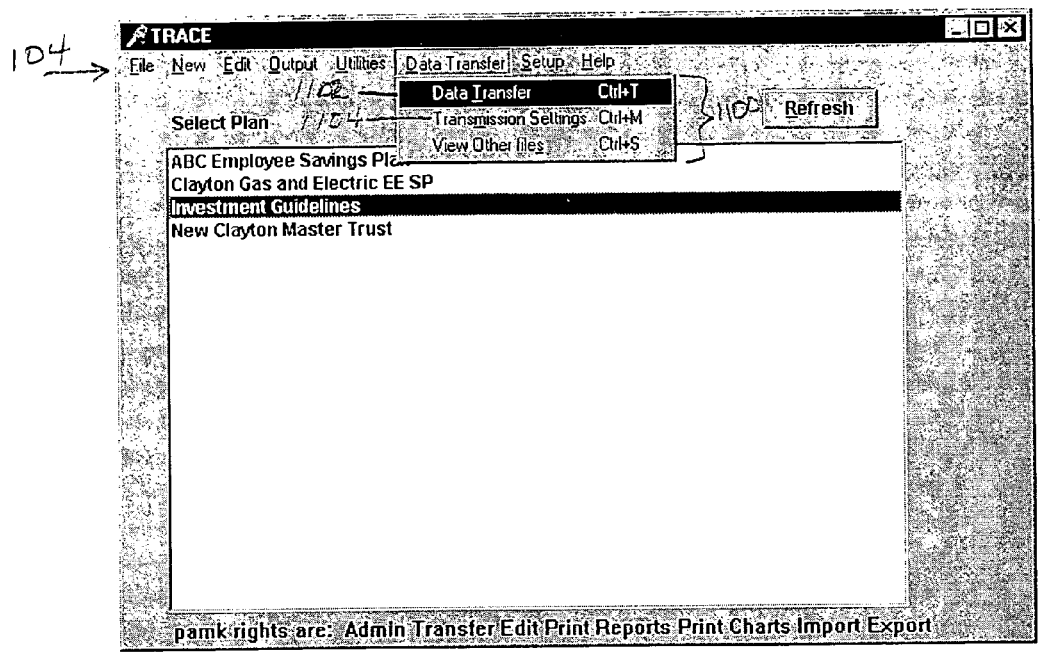
FIG. 51 illustrates an exemplary user interface screen from which a data transfer function is initiated in accordance with one embodiment of the invention.
FIG. 52 illustrates an exemplary user interface screen from which managers can build and transmit files corresponding to plan information in accordance with one embodiment of the invention.

The data transfer function is initiated by managers and issuers via a user interface. One of the first tier menu items shown in FIG. 51 is the "Data Transfer" menu item on the menu bar 104. Three second tier menu items 1100 are shown in FIG. 51, including "Data Transfer", "Transmission Settings", and "View Other files" menu items.

The second tier menu item "Data Transfer" is used by both managers (buyers) and issuers (sellers) to transfer data back and forth, preferably via the central repository (see central repository 20 of FIG. 1; central site 32 of FIG. 2). Upon selection of the Data Transfer menu item 1102 at the manager site, transfer menu screen 1120 is provided as shown in FIG. 52. In the illustrated embodiment of screen 1120, seven button selections are provided, including a Build Transfer Files button 1122, Transmit Files button 1124, Select History button 1126, Change Report button 1128, Save History button 1130, Return to Main Menu button 1132 and Help button 1134. Operation upon selection of the Return to Main Menu button 1132 and Help button 1134 are analogous to those previously described.

Figures 53, 54:
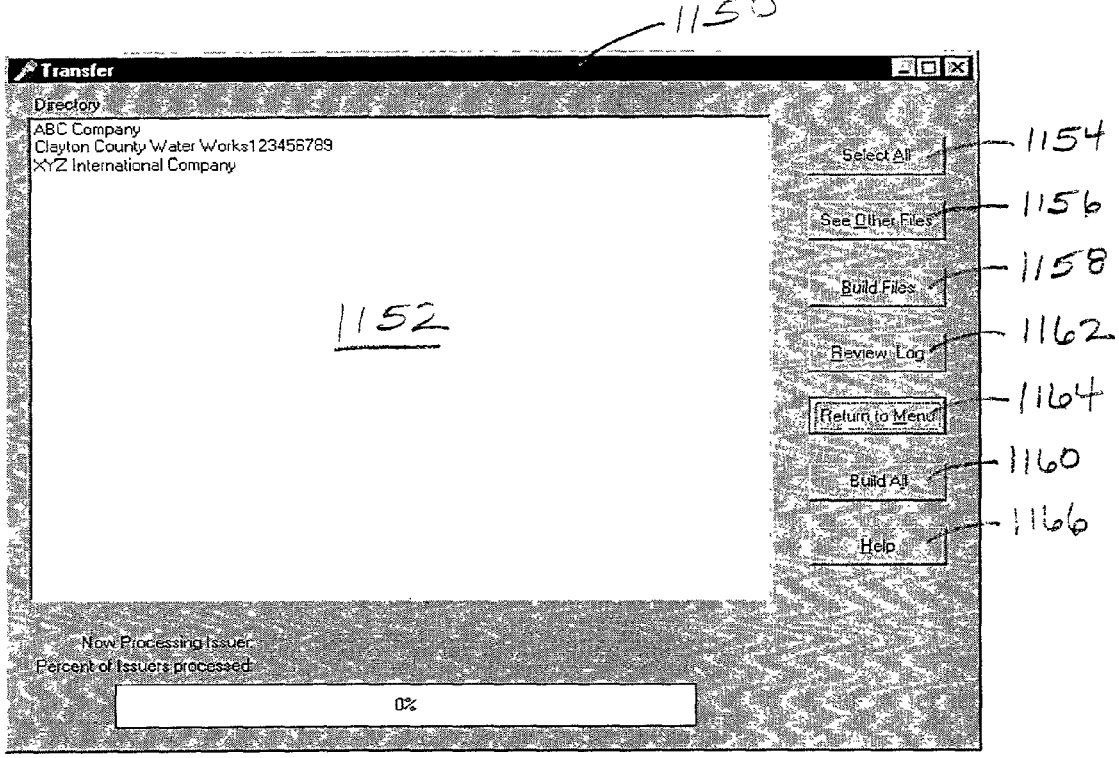
FIG. 53 illustrates an exemplary user interface screen from which the user selects which companies will be included in the build process in accordance with one embodiment of the invention.
FIG. 54 illustrates an exemplary user interface screen which allows users to view file lists for verification that certain files are current in accordance with one embodiment of the invention.

Selection of the Build Transfer Files button 1122 brings the user to the Transfer screen 1150 shown in FIG. 53. On the Transfer screen 1150, the user selects which companies will be included in the build process from the company selection field 1152. Any one or more of the companies listed on the company selection field 1152 can be directly selected to designate its corresponding plan information for transfer. Alternatively, the Select All button 1154 can be selected which automatically selects all plans for the companies listed in the company selection field 1152.

The See Other Files button 1156 allows the user to view a list of files located in a predetermined directory to verify the files located in the "Other" folder are current. Selection of the See Other Files button 1156 presents the user with the Show Other Files screen 1180, shown in FIG. 54. The files located in the predetermined directory are listed in the other files field 1182, and lists other files to be included in the transfer. The Return to Menu button 1184 returns the user to the transfer screen 1150.

Returning to FIG. 53, files are "built" from the plan information entered for the particular company. The plan information is appropriately gathered and organized into a transferable file, and in one embodiment are encrypted and compressed. The Build Files button 1158 builds a file for all of the plans selected, and takes into account the companies selected, data release privileges, and transmission settings. To expedite the build process, managers may simply select the Build All button 1160 upon opening the transfer screen 1150. In this case, all plans will be included in the file sent to every active issuer, regardless of how the plan is marked in the issuer list data field 262 associated with the Data Release tab 179 in the plan screen 170 shown in FIG. 18, and regardless of transmission settings selected. Transmission settings are discussed more fully below in connection with FIG. 59.

Figure 55:
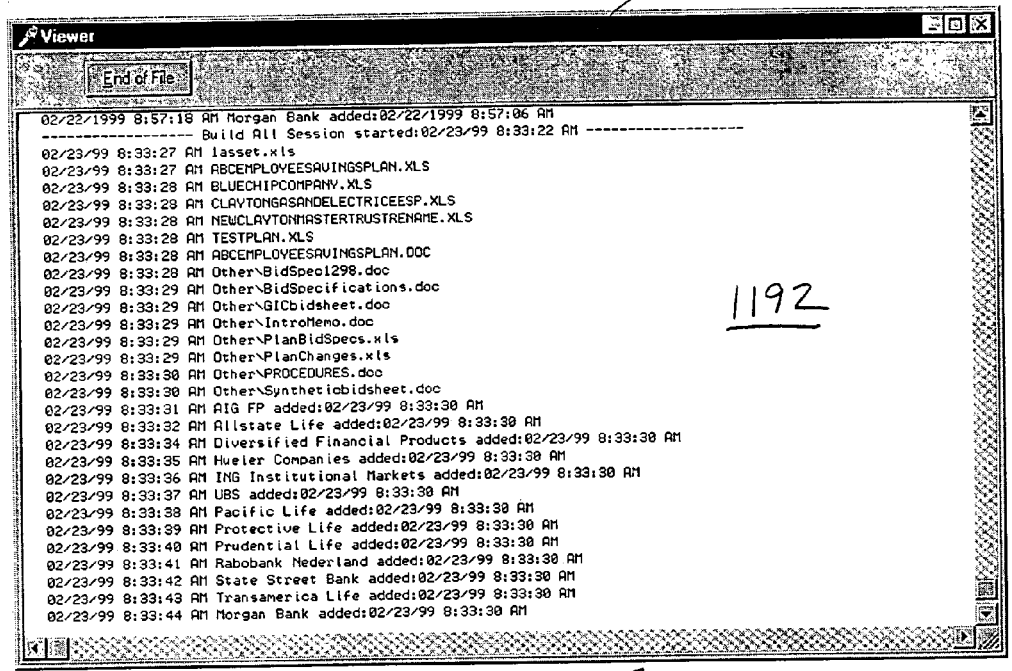
FIG. 55 illustrates an exemplary user interface screen that displays a log file containing the information for all the files that are built in accordance with one embodiment of the invention.

Before transmitting data, managers are given the opportunity to preview a log of plans assigned to each individual issuer's folder. This is accomplished by selection of the Review Log button 1162, which, upon selection thereof, reveals a log file that contains the information for all the files that are built. Such a log file is illustrated in FIG. 55 on the viewer screen 1190, where the log entries are shown in log field 1192. This can be used to verify that a plan was included in a file, whether or not a file was built for an issuer, and to generally ensure that the appropriate plans will be sent to the correct issuer before transmission.

After files are built and log entries confirmed, encrypted files can be transmitted electronically, such as via the Internet, or by diskette or other electronic storage medium. The Return to Menu button 1164 returns the user to the transfer menu screen 1120, and the Help button 1166 operates as previously described, i.e., providing help screens to assist the user.

Figure 56:
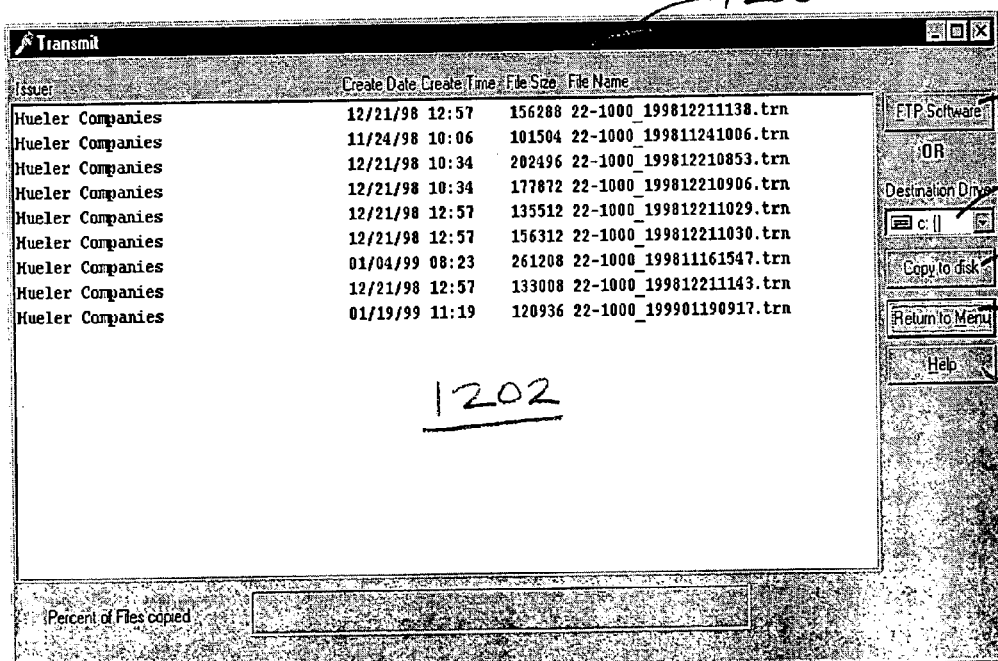
FIG. 56 illustrates an exemplary user interface screen from which a user can initiate the process of depositing the files into the correct issuer folder in accordance with one embodiment of the invention.

Returning now to FIG. 52, selection of the Transmit Files button 1124 brings the user to the Transmit screen 1200 shown in FIG. 56. The user interface screen 1200 allows the user to initiate the process of depositing the files into the correct issuer folder. The transfer information screen 1202 lists information such as the issuer, file creation date/time, file size and file name. The FTP software button 1204 brings the user to the FTP software, which is how the user can access the software needed to distribute the files. The Copy to disk button 1206 allows the user to copy the encrypted file to a local storage medium, which is assigned in the destination field 1208. The Return to Menu button 1210 returns the user to the transfer menu screen 1120, and the Help button 1212 operates as previously described, i.e., providing help screens to assist the user.

Figure 57:
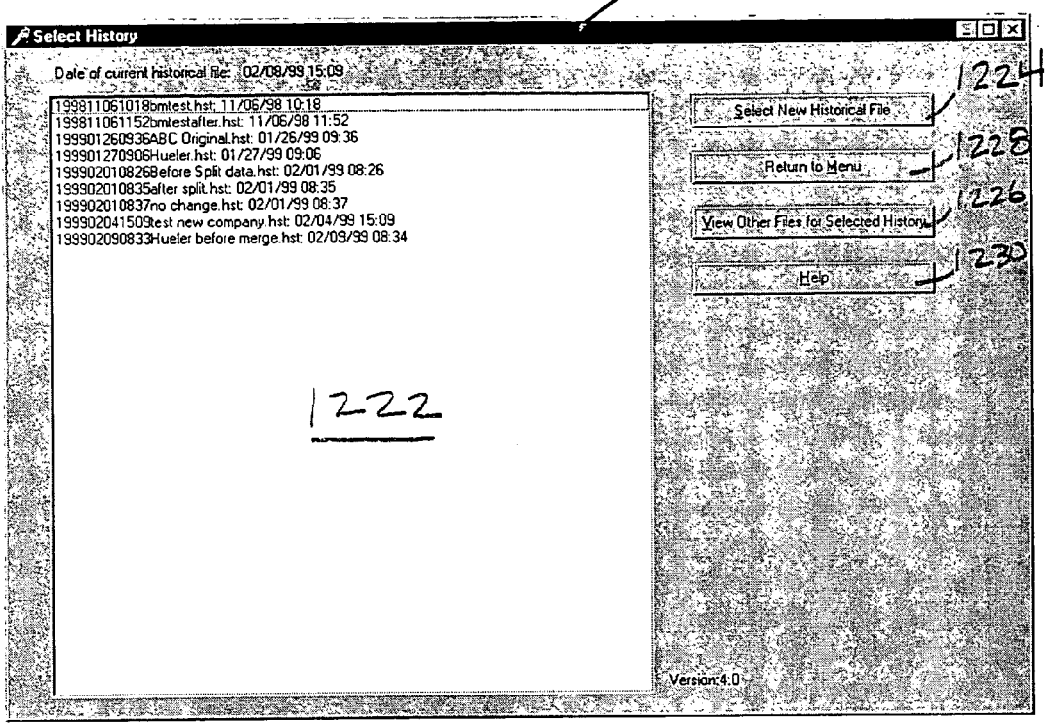
FIG. 57 illustrates an exemplary user interface screen which displays all of the saved histories that can be used for the change reports in accordance with one embodiment of the invention.

The Select History button 1126 on the transfer menu screen 1120 of FIG. 52 brings the user to the Select History screen 1220 shown in FIG. 57. This user interface screen 1220 lists all of the saved histories in the history field 1222 that can be used for the "change reports" discussed below. The Select New Historical File button 1224 on the Select History screen 1220 allows the user to select the file to be used in the change report process. The View Other Files for Selected History button 1226 brings the user to the other files that were associated with the selected history file. The Return to Menu button 1228 and Help button 1230 operate analogously to that previously described.

Figure 58:
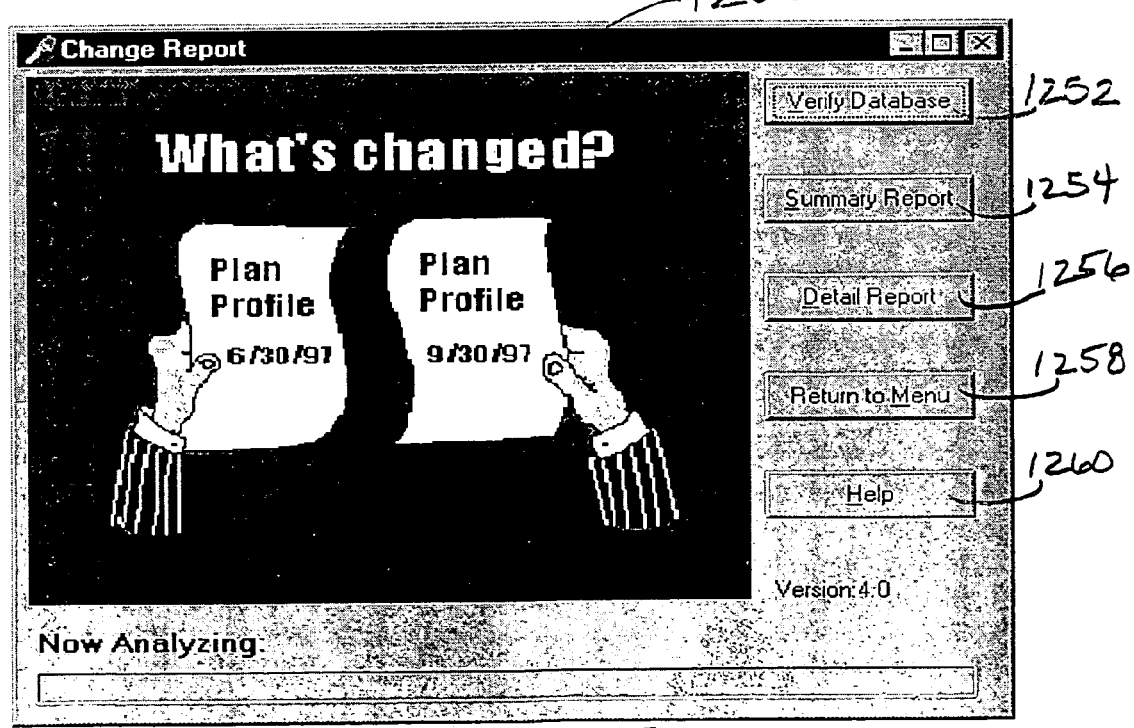
FIG. 58 illustrates an exemplary user interface screen from which the change reports function may be initiated in accordance with one embodiment of the invention.

Returning again to FIG. 52, the Change Report button 1128 brings the user to the Change Report screen 1250 shown in FIG. 58. The purpose of the report is to keep an audit trail of changes and updates made to the data. The central repository maintains two copies of user data at the site. A first is the current working or "active" database, another copy is a snapshot or "history" of the data at a certain point in time. For example, a snapshot or copy of the data files may be captured and saved at month-end or at quarter-end by saving the history at that time. The "active" database includes any manager updates retrieved during the period since the last history save. After retrieving and merging a manager update, the system enables for a comparison of these two databases via a "change report." The change report displays comparison results of the active and historical databases, using a selectable history file. Thus, using the change report user interface, the user can verify the database, and run the summary and detail change report.

On the Change Report screen 1250, five function buttons are provided, including the Verify Database button 1252, Summary Report button 1254, Detail Report button 1256, Return to Menu button 1258 and Help button 1260. Selection of the Verify Database button 1252 allows the database to be verified by analyzing the database and seeking data records that may potentially cause the Change Report to function improperly. This feature will notify users of errors in the database tables. If there are errors in the database, a report will be shown to the user that can be printed to help correct the errors. If no errors exist in the database, a message will be displayed indicating so.

Selection of the Summary Report button 1254 compares the current database information to the information in the history file that was selected via the history field 1222 of the Select History screen 1220 shown in FIG. 57. The summary report is a summary of the changes. Selection of the Detail Report button 1256 starts the process of comparing the current database information to the information in the history file that was selected via the history field 1222 of the Select History screen 1220 shown in FIG. 57. Users select the plans to be included in the process via a plan selection screen (not shown), and the resulting report is a detailed report of all of the changes between the two sets of information. The Return to Menu button 1258 and Help button 1260 operate analogously to that previously described.

Returning to FIG. 52, the Save History button 1130 takes a snapshot of the tables in their current state to be used in the comparison on the change reports. The Return to Menu button 1132 and Help button 1134 operate analogously to that previously described.

Figure 59:
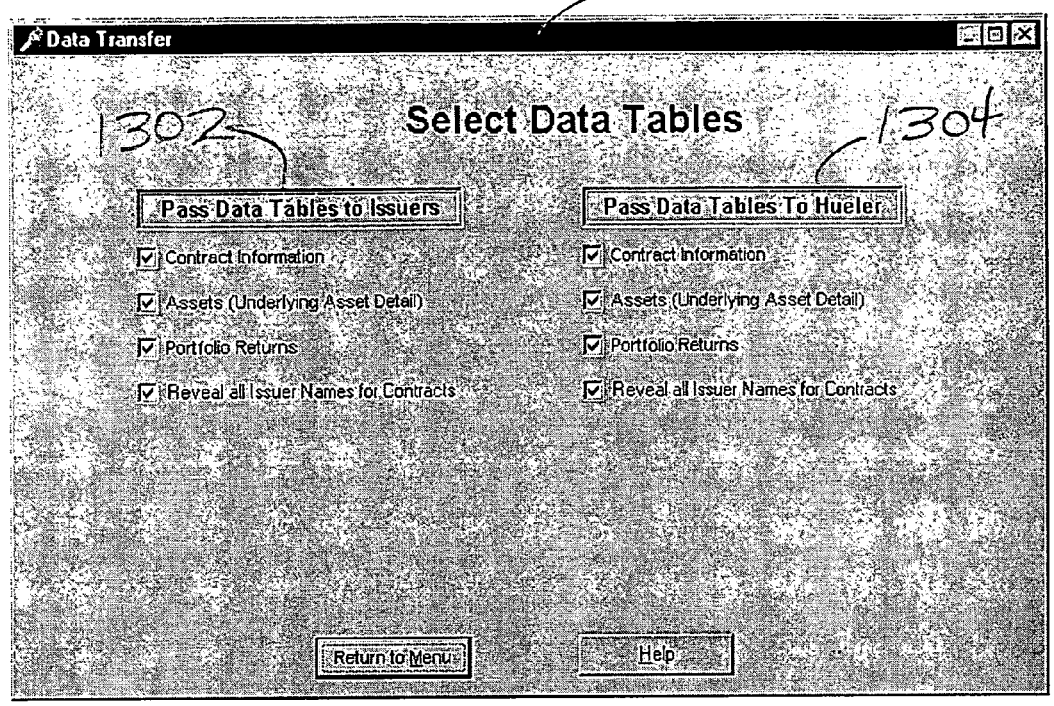
FIG. 59 illustrates an exemplary user interface screen for displaying a selectable list of table exclusion options to exclude certain information from being transmitted in accordance with one embodiment of the invention.

Transmission settings for the data transfer can be initiated by selecting the second tier menu item "Transmission Settings" 1104 from the second tier menu items 1100 shown in FIG. 51. Selection of the Transmission Settings 1104 menu item brings the user to a Select Data Tables Data Transfer screen 1300. Managers may exclude tables that include predefined content, such as contract data, underlying asset detail and/or portfolio return data from the files that are built for issuers. From user interface screen 1300, these options may be selected. In one embodiment, two separate file exclusion fields are provided, shown as field 1302 and 1304. In the embodiment of FIG. 59, field 1302 represents table exclusion options for passing data tables to the issuer, where field 1304 represents table exclusion options for passing data tables to the central repository. As previously indicated, selection of the Build All button 1160 on the Transfer screen 1150 of FIG. 53 overrides selections made on user interface screen 1300.

On a periodic basis or upon notification from a manager, issuers will be responsible for retrieving files from their respective information folders (e.g., issuer folders 1064,

1066, 1068, 1070, 1072 at the FTP site 1062 shown in FIG. 50). Using an FTP program, issuers can electronically connect to retrieve their encrypted data files. In one embodiment, each file has a unique file name ensuring that files already at the site are not overwritten. After retrieving files from the FTP site, the files are merged into the issuer's existing database. Updated information will replace old data, and new plans as well as contracts, cash flows, etc. will be added to the existing system. After merging the newly retrieved files into the system database, issuers are able to run change reports (summary or detail reports) to review plan modifications made to the plans currently held in their "active" database.

Figure 60:
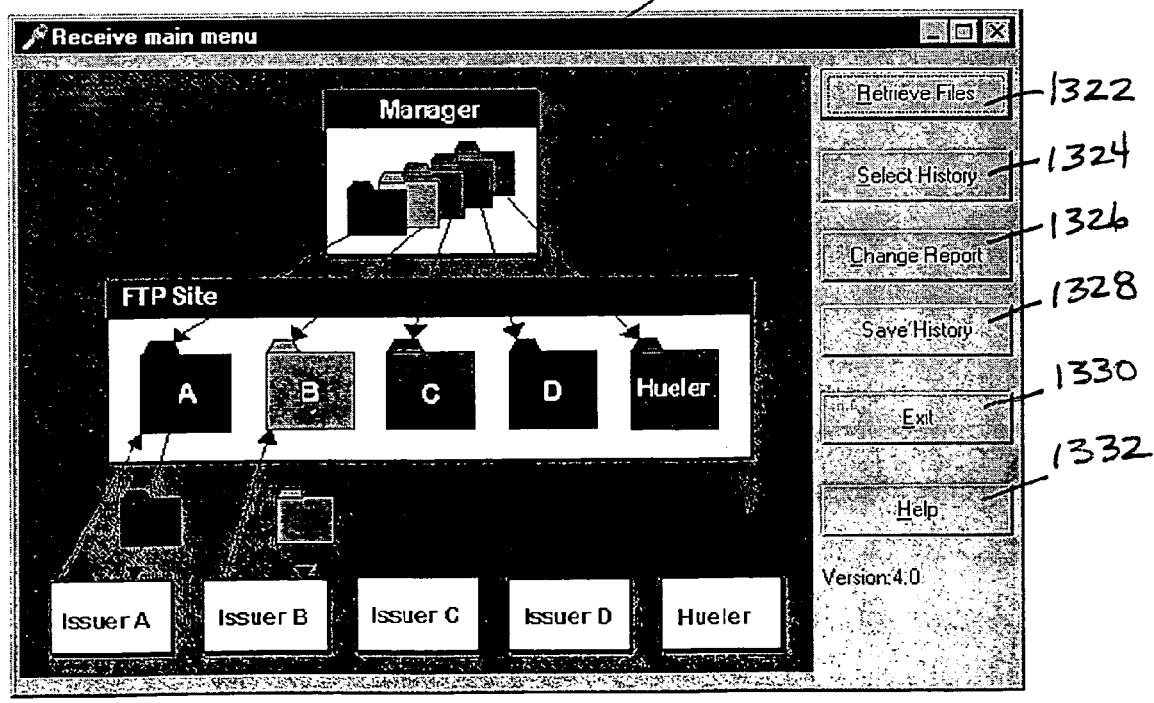
FIG. 60 illustrates an exemplary user interface screen from which issuers can initiate file retrieval in accordance with one embodiment of the invention.

To carry out the file retrieval system by issuers, issuers access a "Receive main menu" screen 1320 as seen in FIG. 60. In the illustrated embodiment of FIG. 60, six different buttons are provided on user interface screen 1320, including "Retrieve Files" 1322, "Select History" 1324, "Change Report" 1326, "Save History" 1328, "Exit" 1330 and "Help" 1332.

Figure 61:
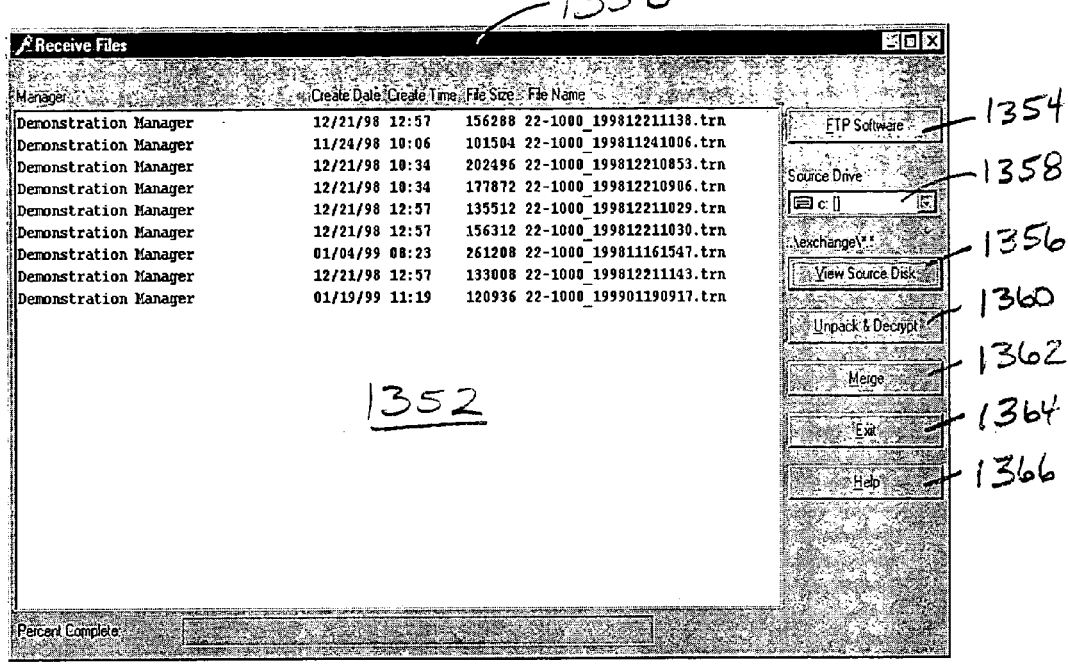
FIG. 61 illustrates an exemplary user interface screen whereby the user can select the file(s) in which to merge and subsequently carry out the merge process in accordance with one embodiment of the invention.
Figure 62:
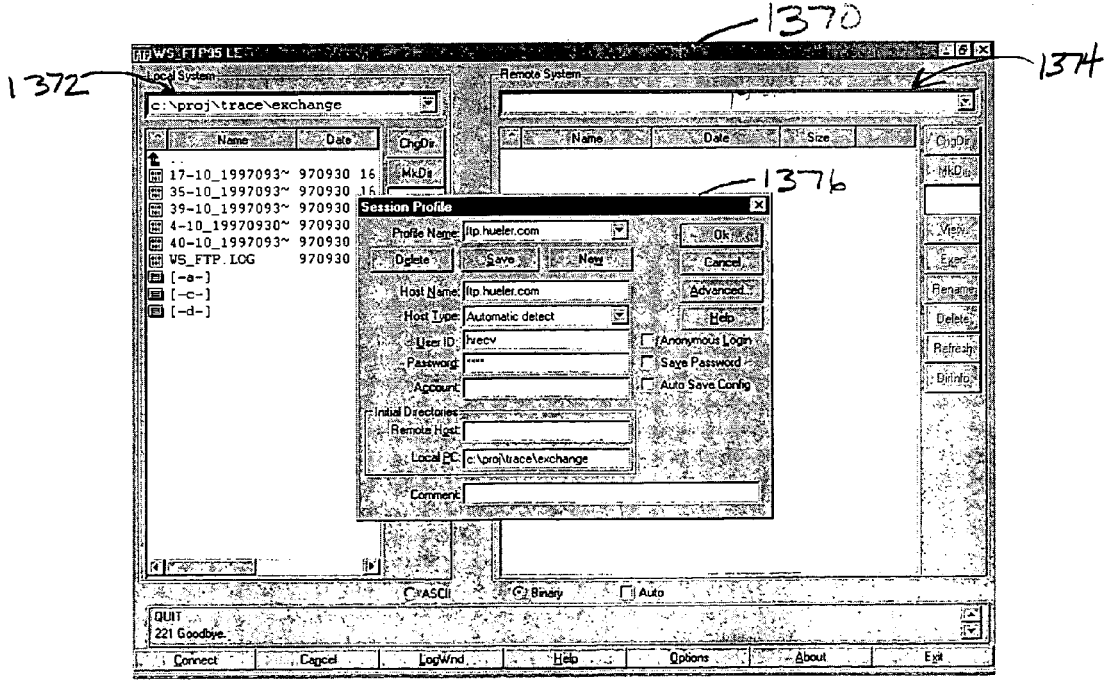
FIG. 62 illustrates an exemplary user interface screen which facilitates data transmission between the issuer site and the central site in accordance with one embodiment of the invention.

Selection of the Retrieve Files button 1322 brings the user to the Receive File screen 1350 shown in FIG. 61. From screen 1350, the user can select the file(s) in which to merge and subsequently carry out the merge process. The file list field 1352 displays at least each particular manager who has submitted a plan for the issuer, as well as the file creation date/time, file size and file name. Selection of the FTP Software button 1354 brings the user to the FTP software screen 1370 shown in FIG. 62. This screen 1370 facilitates data transmission between the issuer site (i.e., local system 1372) and the central site (i.e., remote system 1374). A session profile screen 1376 is provided to include necessary information to effect the data transfer. Once properly connected, the appropriate files may be downloaded by the issuer.

Returning to FIG. 61, the View Source Disk button 1356 allows the user to change the location of the import file, such as from a disk identified in the Source Drive field 1358. Selection of the Unpack & Decrypt button 1360 prepares the file to be merged into the existing database information. Files are then merged upon selection of the Merge button 1362. Selection of the Exit button 1364 returns the user to the Receive main menu screen 1320, and the Help button 1366 provides descriptive assistance information upon demand.

Returning now to FIG. 60, selection of the Select History 1324, Change Report 1326 and Save History 1328 buttons operate analogously to that described in connection with the Transfer menu screen 1120 of FIG. 52. Selection of the Exit button 1330 returns the user to the system main menu (e.g., screen 100 of FIG. 4), and the Help button 1332 provides descriptive assistance information upon its selection.

The process of transferring data between managers and issuers via the central repository beneficially allows a wide variety of aggregate statistics to be collected and thus the creation of industry-wide statistics can be produced. Without the uniform format, storage facility and the continuous update abilities of the import utility, a wide sampling of accurate aggregate data would be virtually impossible to compile.

The central repository/site retains a folder at the FTP site whereby a complete copy of all of the data distributed to any issuer is collected. Thus, just as issuers are each assigned a folder(s) at the FTP site 1062 of FIG. 50, the central site is also equipped with one or more folders to assist in an aggregation of data to generate statistical information. In this manner, data collection and generation of statistics can be performed while maintaining confidentiality between any other parties associated with the transaction (e.g., managers and issuers). By implementing high data security measures and facilitating the collective, centralized receipt of this otherwise generally confidential information at the central site, creation and dissemination of industry statistical reports is possible.

In one embodiment of the invention, numerous aggregate reports are generated covering a variety of key market statistics and plan characteristics. Such market statistics and plan characteristics include performance, maturity, quality, variability of return, cash flow, fund size, investment option allocation, asset class distribution, withdrawal methodology, transfer frequency and restriction provisions. Furthermore, standard composites may be created for regular market availability, and custom composites can be generated upon request. Aggregate reports can also be generated profiling purchase activity, and may highlight periodic placement volume, contract type allocations and maturity selections.

Setup Configurations

Figures 63, 64:
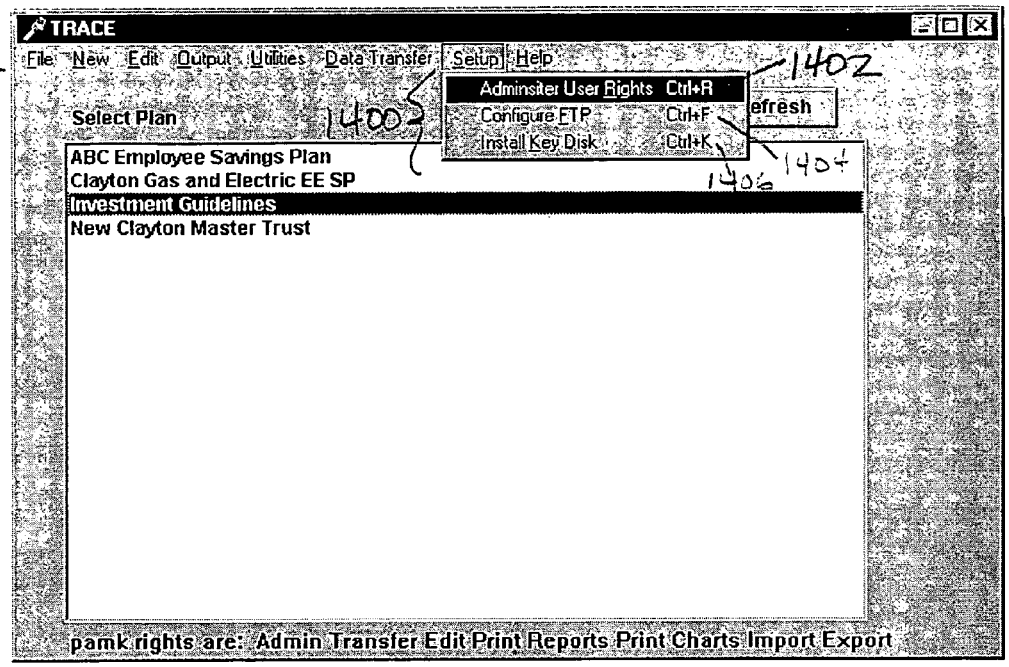
FIG. 63 illustrates an exemplary user interface screen from which users can initiate setup functions in accordance with one embodiment of the invention.
FIG. 64 illustrates an exemplary user interface screen from which user rights can be assigned in accordance with one embodiment of the invention.

Another first tier menu item is shown in FIG. 63 as the "Setup" menu item on the menu bar 104. Three second tier menu items 1400 are shown in FIG. 63, including "Administer User Rights" 1402, "Configure FTP" 1404, and "Install Key Disk" 1406 menu items.

Selection of the second tier menu item "Administer User Rights" 1402 allows an administrator to assign access rights via the User Access Rights screen 1420 shown in FIG. 64. The user's username login ID is entered into the UserName column 1422 of the user access field 1423. Users may be given one or more access rights. Examples of such user rights are illustrated in FIG. 64, and include administrator rights shown in column 1424 which allows the user to set up user accounts for the systems, and to edit data within the system. Column 1426 is the Data Transfer column, which allows the user to perform all data transfer functions, such as build and transmit files (in the case of a manager) or retrieve and merge files (in the case of an issuer), save history, and run change reports. The Edit column 1428 allows the user to make modifications to any data on any screen within the system. The PrintReports column 1430 and the PrintCharts column 1432 allows the user to print reports and charts respectively. The Import column 1434 allows users to import information into the system database tables, and the Export column 1436 allows users to export information contained in the system database tables. In one embodiment, an "x" is placed in each individual field of the user access field 1423 in which authority or access is granted, and these individual fields can be changed by a user having administrator rights. For example, each individual field can be changed by adding or removing the "x", users can be added by selecting the "+" button 1438, and users can be deleted by selecting the "−" button 1440. Field movement buttons 1442 are also provided to move to the appropriate user in the user access field 1423. The Return to Menu button 1444 and the Help button 1446 operate analogously to that previously described.

Figure 65:
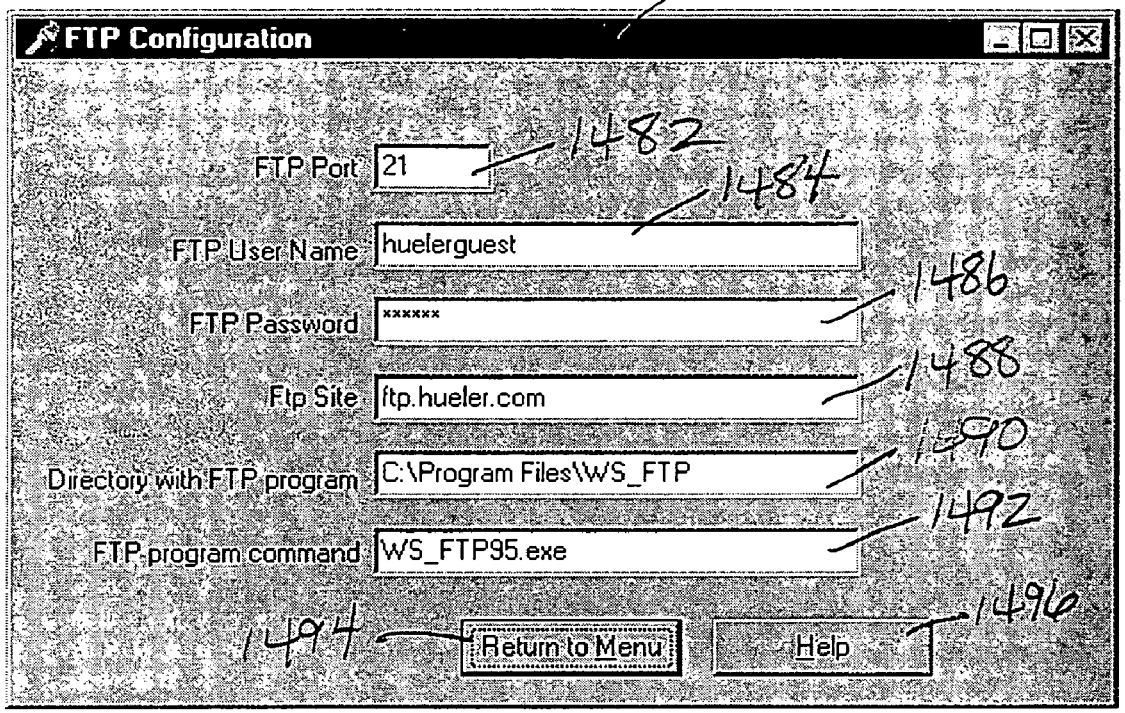
FIG. 65 illustrates an exemplary user interface screen which allows the user to configure their system to access the central database in accordance with one embodiment of the invention.

Selection of the second tier menu item "Configure FTP" 1404 as shown in FIG. 63 brings the user to the FTP Configuration screen 1480 shown in FIG. 65. Configuration screen 1480 allows the user to configure their system to access the central database. An FTP Port field 1482 identifies the appropriate FTP port to access the central repository. A provided user name and password are entered into the FTP User Name 1484 and FTP Password 1486 fields respectively. The FTP Site field 1488 identifies the target FTP site.

The Directory with FTP program field 1490 identifies the directory in which the user's FTP program files are located, and the FTP program command field 1492 provides the appropriate executable file for the FTP transfer. The Return to Menu button 1494 and the Help button 1496 operate analogously to that previously described.

Figure 66:
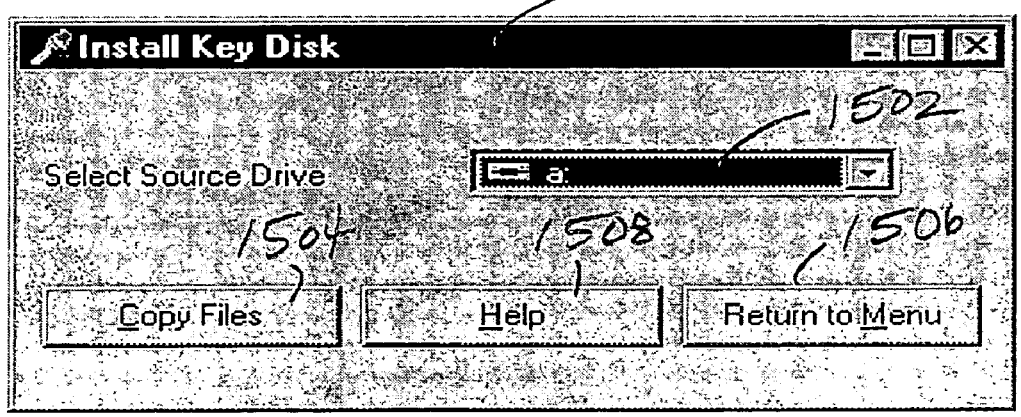
FIG. 66 illustrates an exemplary user interface screen to initiate how security key files are copied onto a user's system in accordance with one embodiment of the invention.

Selection of the second tier menu item "Install Key Disk" 1406 as shown in FIG. 63 brings the user to the Install Key Disk screen 1500 shown in FIG. 66. Data security and confidentiality may be maintained through a password key disk security system where managers and issuers each receive a single, unique password key disk. The key file on the disk is installed on each user's system. Managers are provided a key disk that contains a set of passwords unique to each issuer, and likewise, each issuer is provided a password for communication with each manager.

In order to provide high security, the system of the present invention utilizes a password generation scheme that is described in connection with Table 1 below:

TABLE 1

|         | Issuer 1 | Issuer 2 | Issuer 3 | Issuer 4 | Issuer 5 | Issuer 6 |
|---------|----------|----------|----------|----------|----------|----------|
| Mgr. 1  |          | I2/M1    |          |          |          |          |
| Mgr. 2  |          | I2/M2    |          |          |          |          |
| Mgr. 3  |          | I2/M3    |          |          |          |          |
| Mgr. 4  | I1/M4    | I2/M4    | I3/M4    | I4/M4    | I5/M4    | I6/M4    |
| Mgr. 5  |          | I2/M5    |          |          |          |          |
| Mgr. 6  |          | I2/M6    |          |          |          |          |
| Mgr. 7  |          | I2/M7    |          |          |          |          |
| Mgr. 8  |          | I2/M8    |          |          |          |          |

A string of random numbers is generated and divided into units. One unit fills each cell. In one embodiment, six passwords (one for each issuer) and eight passwords (one for each manager) fill the table with 48 passwords. The actual number of fields in the table depends on the number of issuers and managers requiring passwords. A unique password represents each issuer/manager pairing. For example, as seen from Table 1 above, Manager 4 receives a key disk with six issuer passwords, and Issuer 2 receives a key disk with eight manager passwords. Manager 4 and Issuer 2 have only one password (I2/M4) in common, and that is the password they use for communication.

The key disk is entered into the source drive identified in the Select Source Drive field 1502. The Copy Files button 1504 is then selected to copy the files located in the selected drive to the current database location. The Return to Menu button 1506 and the Help button 1508 operate analogously to that previously described.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

We claim:

1. An electronic communication method for facilitating financial transactions between buyers and sellers of investment contracts, comprising:

defining via a buyer computing arrangement an import specification identifying database format characteristics of investment plan information stored in a first database;

mapping, via the buyer computing arrangement, data fields from the first database to data fields in a second database to create a data import map, wherein the data fields in the second database are predefined data fields;

importing, via the buyer computing arrangement, the investment plan information into the predefined data fields of the second database according to the import specification and data import map;

electronically transferring the investment plan information of the second database via the buyer computing arrangement to a central database accessible by the investment contract sellers;

storing the investment plan information at the central database in a plurality of secure database locations each respectively accessible to the investment contract sellers authorized by the investment contract buyers to receive the investment plan information;

electronically transferring the investment plan information from the secure database locations of the central database to seller computing arrangements of the authorized investment contract sellers upon initiation by the authorized investment contract sellers via the seller computing arrangements; and creating, via the seller computing arrangements, respective proposed investment contracts from the investment plan information received via the central database.

2. The method of claim 1, further comprising electronically transferring via the buyer computing arrangement a seller authorization code identifying the investment contract sellers who are to be authorized by the investment contract buyers.

3. The method of claim 2, wherein storing the investment plan information at the central database in a plurality of secure database locations comprises creating via the buyer computing arrangement particular database folders for each potential one of the investment contract sellers, and allowing the investment contract sellers corresponding to the authorization code to electronically receive the investment plan information from their respective database folders via the seller computing arrangements.

4. The method of claim 1, further comprising transmitting via the seller computing arrangements the proposed investment contract to the investment contract buyer who transferred the investment plan information.

5. The method of claim 1, further comprising notifying, via a central computing arrangement or the buyer computing arrangement, the investment contract sellers of their respective authorizations to receive the investment plan information from the central database.

6. The method of claim 1, further comprising:

defining, via at least one of the seller computing arrangements, an export specification identifying database format characteristics of an export file;

mapping, via the at least one seller computing arrangement, data fields from the investment plan information received by the investment contract sellers to a third database to create a data export map; and exporting, via the at least one seller computing arrangement, the investment plan information received by the investment contract sellers to the data fields of the export file according to the export specification and data export map.

7. The method of claim 1, further comprising transferring system data tables via the buyer computing arrangement to the central database accessible by a central site administrator and inaccessible to the seller computing arrangements of the investment contract sellers.

8. A transaction processing system for facilitating financial transactions between buyers and sellers of investment contracts, comprising:
- (a) a central database accessible by the investment contract buyers and the investment contract sellers;
- (b) at least one computing device having storage, and a user interface to interface to the computing device, wherein the user interface includes at least a display and means for entering data, and wherein the computing device comprises:
  - (1) import definition means for defining an import specification identifying database format characteristics of investment plan information stored in a first database accessible by the computing device;
  - (2) data mapping means for mapping data fields from the first database to data fields in a second database accessible by the computing device to create a data import map, wherein the data fields in the second database are predefined data fields;
  - (3) data importation means for importing the investment plan information into the predefined data fields of the second database according to the import specification and data import map;
  - (4) first data transfer means for transferring the investment plan information to the central database;
  - (5) seller identification means for identifying the investment contract sellers who are authorized by the investment contract buyers to receive the investment plan information; and
- (c) wherein the central database comprises means for releasing the investment plan information to only the investment contract sellers identified by the investment contract buyers as authorized to receive the investment plan information.

9. The transaction processing system as in claim 8, further comprising a second computing device having a storage, and a user interface to interface to the second computing device, wherein the user interface includes at least a display and means for entering data, and wherein the second computing device comprises:
- second data transfer means for transferring the investment plan information from the central database to the authorized investment contract sellers upon initiation by the authorized investment contract sellers and upon release of the investment plan information; and
- means for viewing the investment plan information received via the central database by the investment contract sellers.

10. A computer-readable medium having computer-executable instructions for facilitating financial transactions between buyers and sellers of investment contracts, the computer-executable instructions performing steps comprising:
- defining an import specification identifying database format characteristics of investment plan information stored in a first database;
- mapping data fields from the first database to data fields in a second database to create a data import map, wherein the data fields in the second database are predefined data fields;
- importing the investment plan information into the predefined data fields of the second database according to the import specification and data import map;
- designating the investment contract sellers who are authorized by the investment contract buyers to receive the investment plan information;
- transferring the investment plan information to a central database; and
- releasing the investment plan information to the investment contract sellers identified by the investment contract buyers as being authorized to receive the investment plan information.

* * * * *